United States Patent [19]
Oishi et al.

[11] Patent Number: 5,907,946
[45] Date of Patent: Jun. 1, 1999

[54] METHOD AND APPARATUS FOR REPACKING A PHOTOSENSITIVE TABULAR PRINTING PLATE

[75] Inventors: Hirohiko Oishi; Seiichiro Kuretoko, both of Haibara-gun, Japan

[73] Assignee: Fuji Photo Film Co., Ltd., Kanagawa, Japan

[21] Appl. No.: 08/988,223

[22] Filed: Dec. 10, 1997

[30] Foreign Application Priority Data

Dec. 11, 1996 [JP] Japan ................................. 8-331165
Feb. 14, 1997 [JP] Japan ................................. 9-030962

[51] Int. Cl.⁶ ................................................. B65B 69/00
[52] U.S. Cl. ................ 53/471; 53/492; 53/381.2; 53/281; 53/284.4; 53/471; 53/473; 414/412
[58] Field of Search ................... 53/492, 381.2, 53/381.3, 281, 284.4, 471, 473; 414/412; 378/172, 171

[56] References Cited

U.S. PATENT DOCUMENTS

| | | | |
|---|---|---|---|
| 3,675,014 | 7/1972 | Perl | 378/166 |
| 3,912,932 | 10/1975 | Matsumoto et al. | 378/173 |
| 3,934,150 | 1/1976 | Matsumoto et al. | 378/173 |
| 4,160,352 | 7/1979 | Neff | 53/281 |
| 4,480,423 | 11/1984 | Muller | 53/284.4 |
| 4,586,311 | 5/1986 | Becherer et al. | 414/412 |
| 4,730,206 | 3/1988 | Sawada et al. | 355/3 |
| 4,785,179 | 11/1988 | Iwasaki | 378/173 |
| 4,921,388 | 5/1990 | Nelson | 414/412 |
| 4,926,729 | 5/1990 | Igarashi | 414/412 |
| 4,992,815 | 2/1991 | Kudo . | |
| 5,055,869 | 10/1991 | Dipetro . | |
| 5,379,571 | 1/1995 | Gottfreid | 53/471 |

FOREIGN PATENT DOCUMENTS 0 113 680   7/1984   European Pat. Off. .

*Primary Examiner*—Stephen F. Gerrity
*Assistant Examiner*—Eric J. Weierstall
*Attorney, Agent, or Firm*—Sughrue, Mion, Zinn, Macpeak & Seas, PLLC

[57] ABSTRACT

An opening part cuts a periphery of a package which contains a bundle of PS (photosensitive) plates. Then, a lifter separates a top piece of the package from the bundle of the PS plates, and a cartridge body, which has been transferred by the lifter, is put on the bundle of the PS plates from which the top piece of the package has been separated. An inverter inverts the top and bottom faces of the bundle of the PS plates covered with the cartridge body, and then, the lifter separates the bottom piece of the package from the bundle of the PS plates. A cartridge lid, which is transferred by the lifter, is put on the bundle of the PS plates from which the bottom piece of the package has been separated.

3 Claims, 38 Drawing Sheets

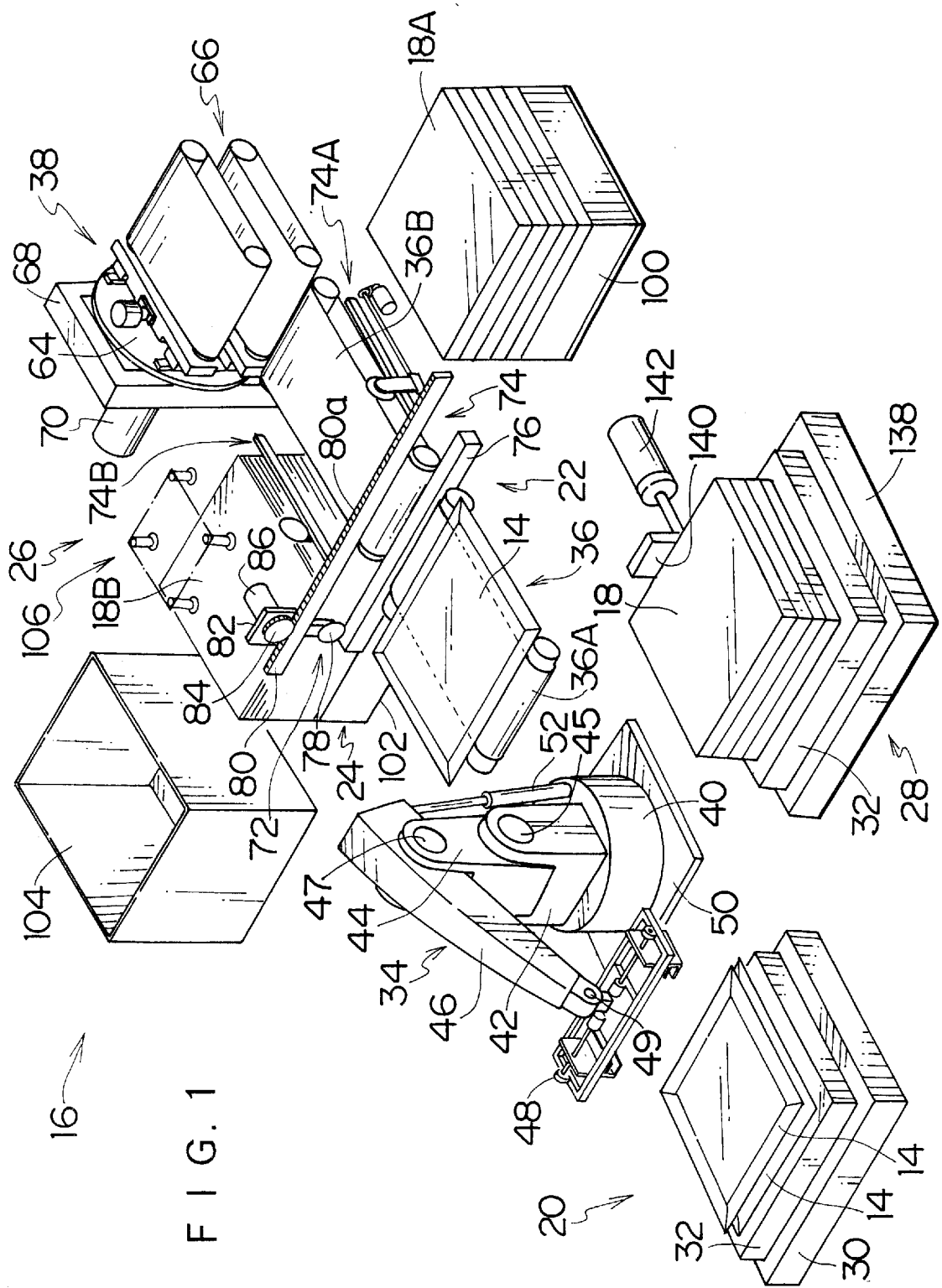
F I G. 1

F I G. 8 (a)
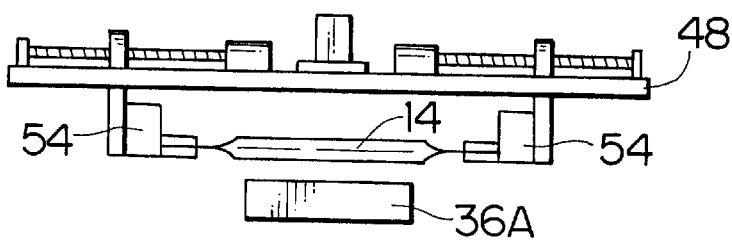
F I G. 8 (b)
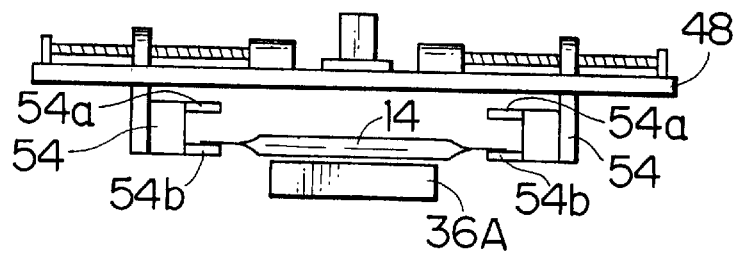
F I G. 8 (c)
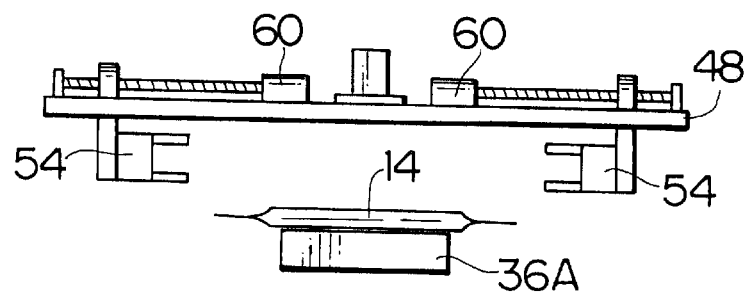

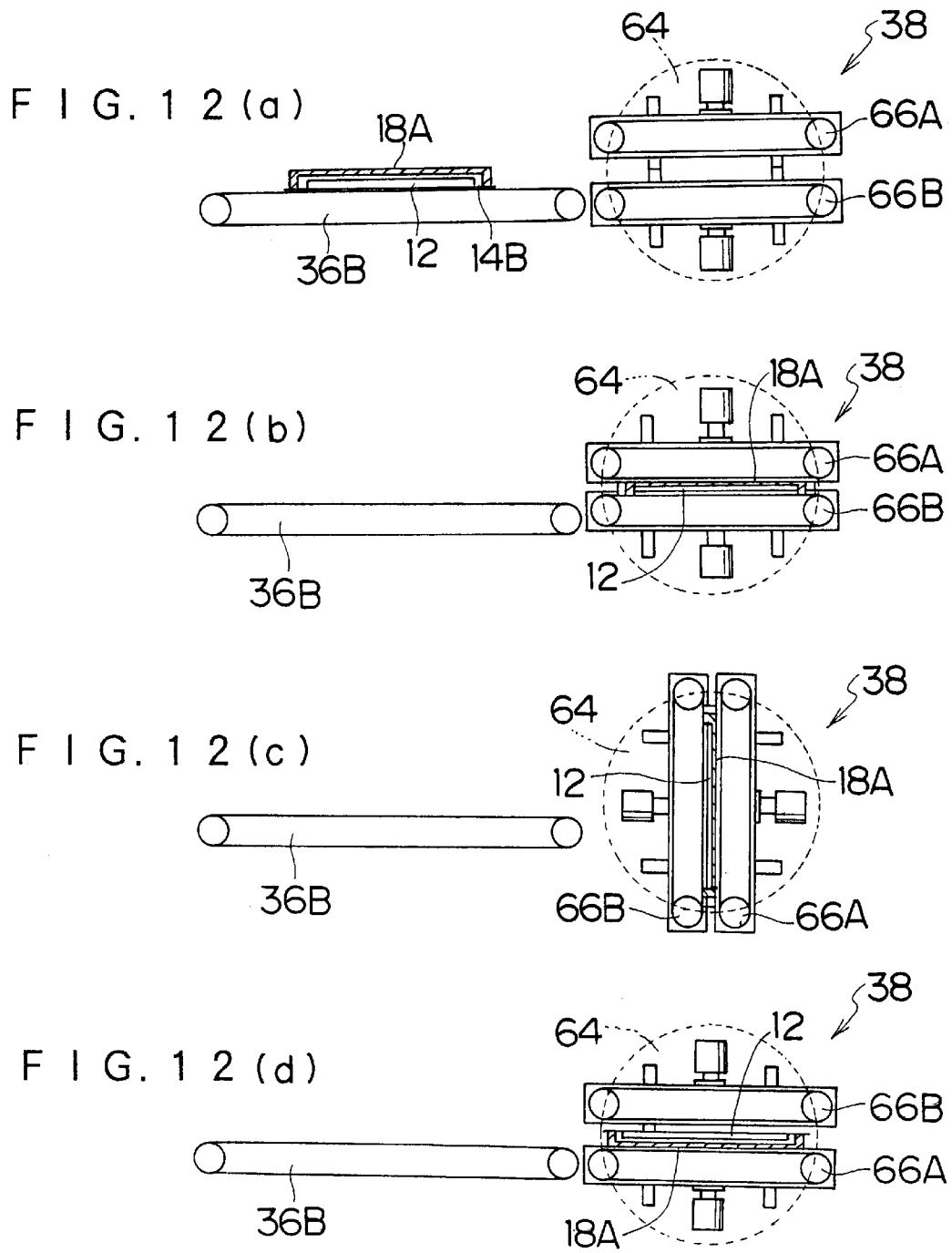

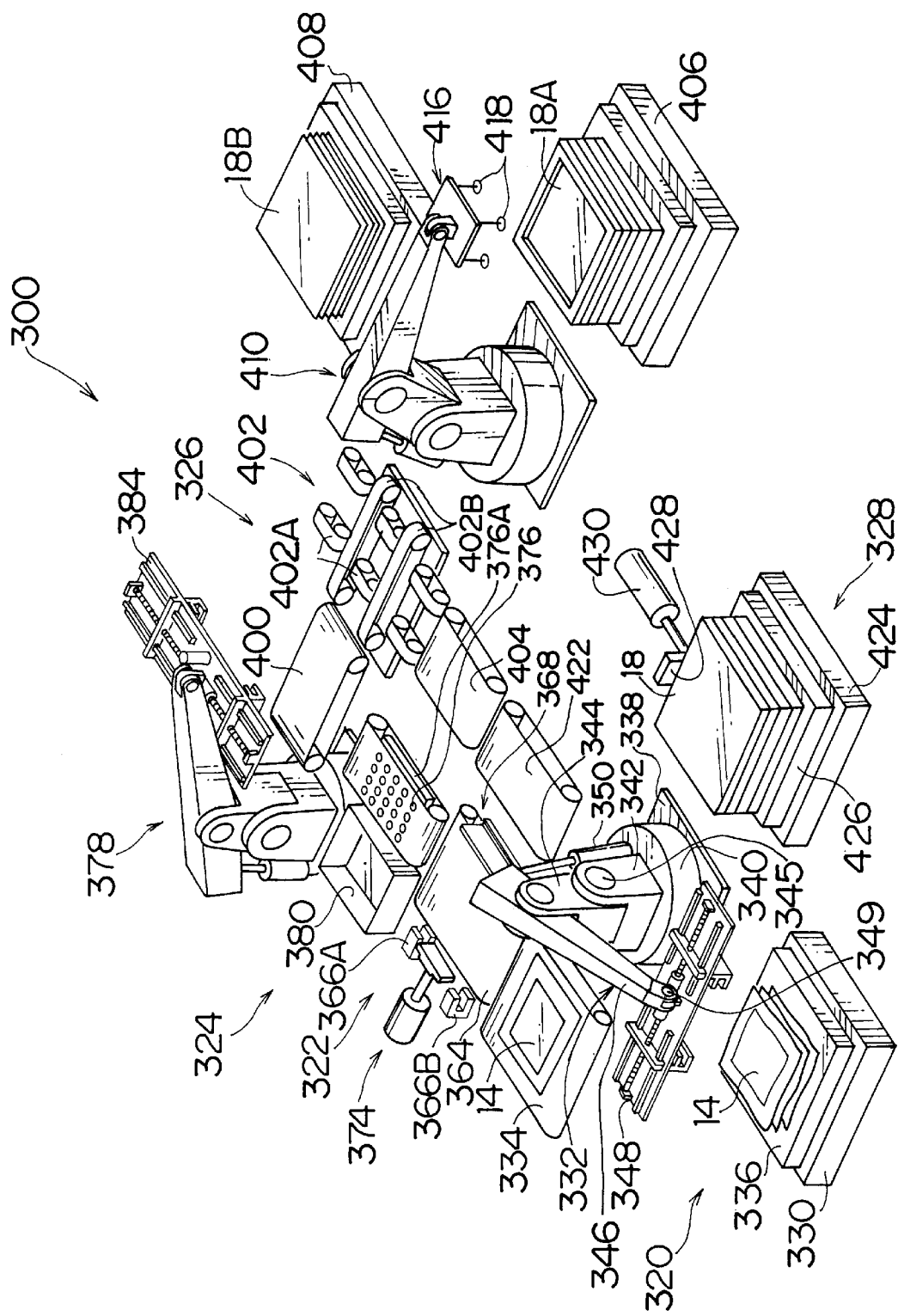

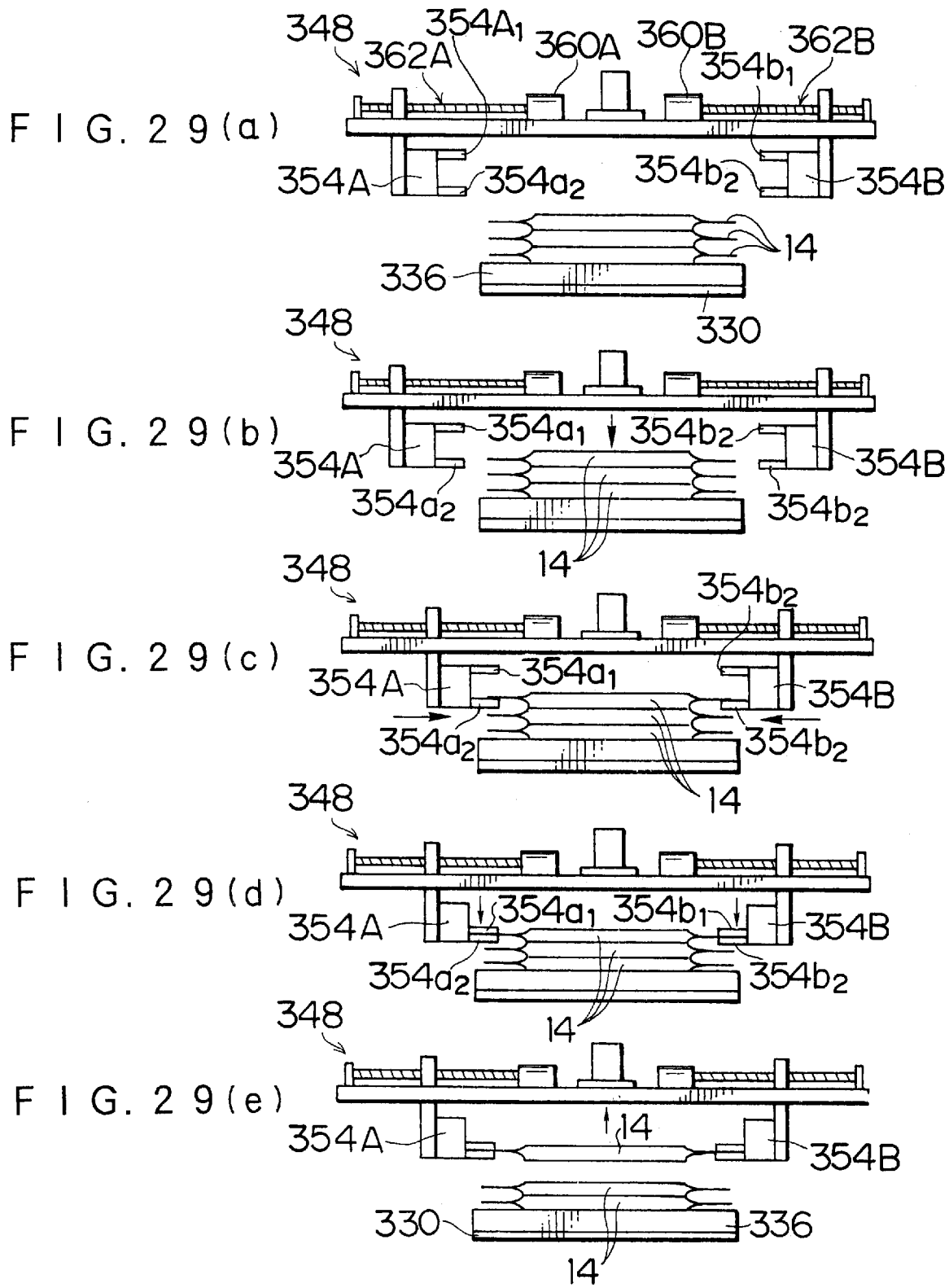

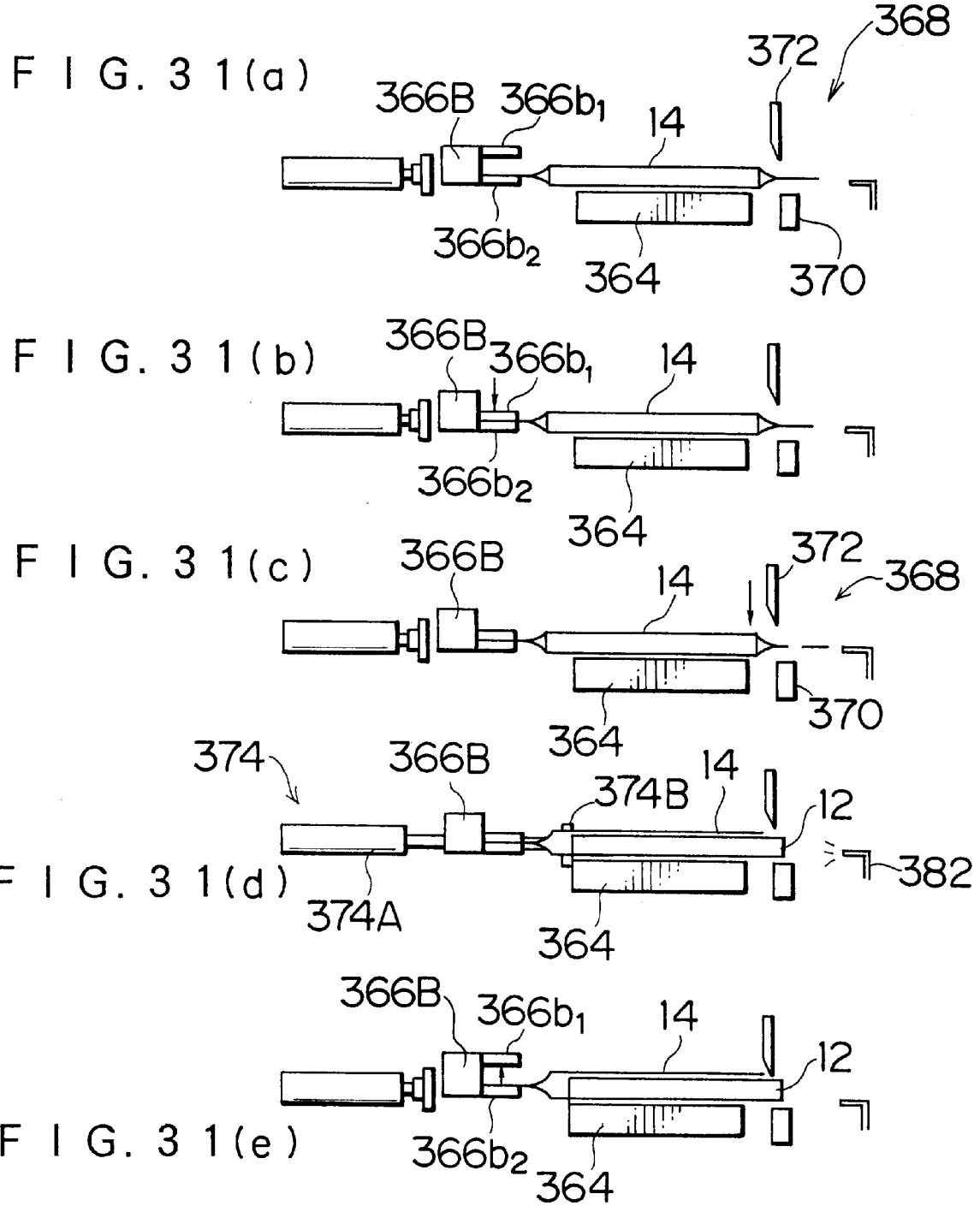

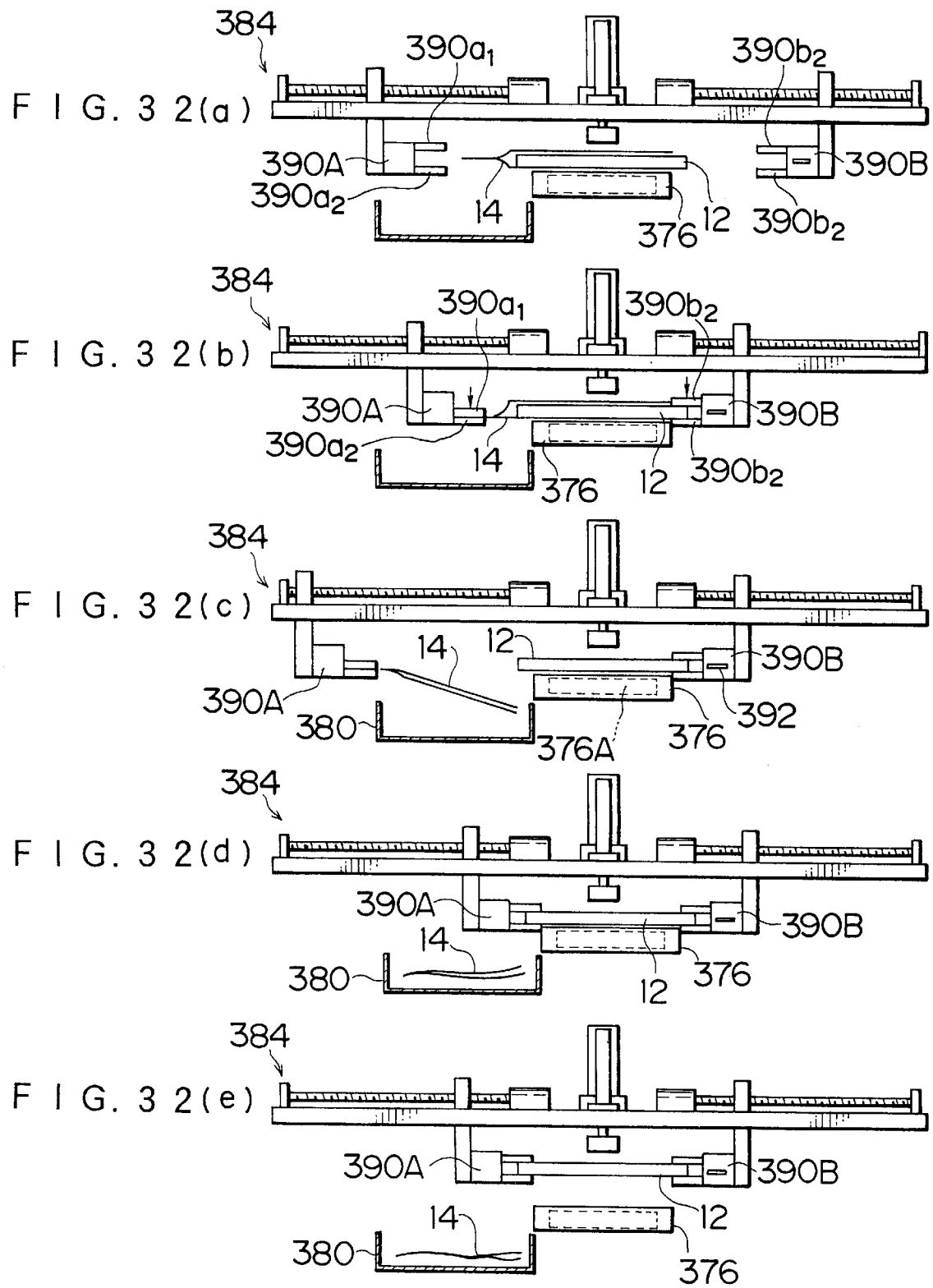

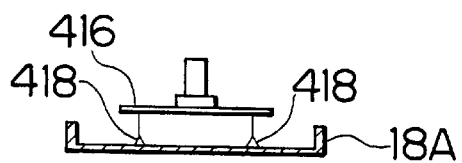
F I G. 3 3 (a)
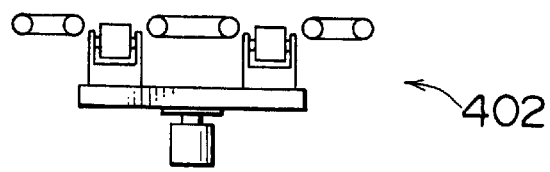
F I G. 3 3 (b)
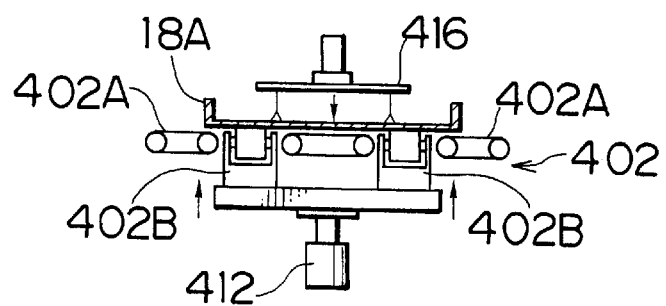
F I G. 3 3 (c)
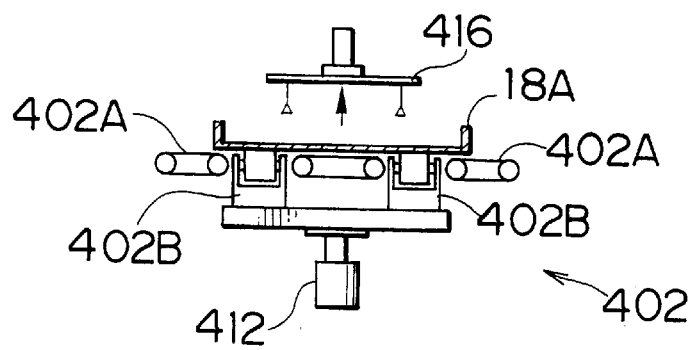

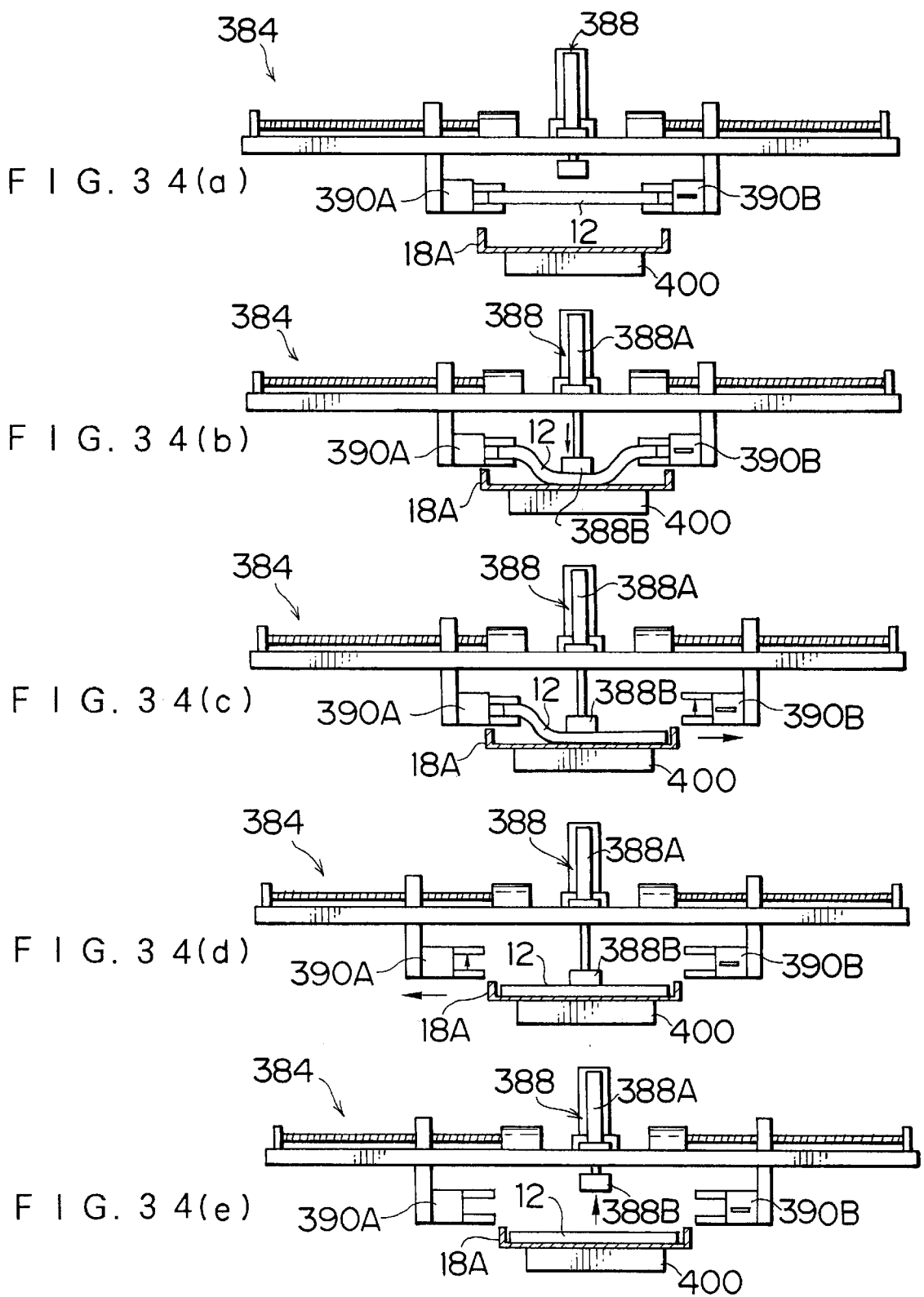

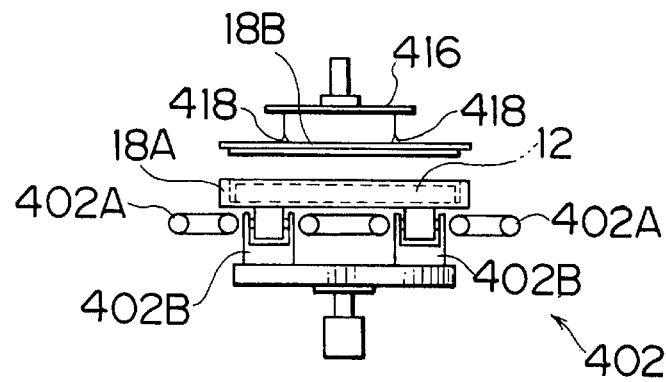
F I G. 3 5 (a)
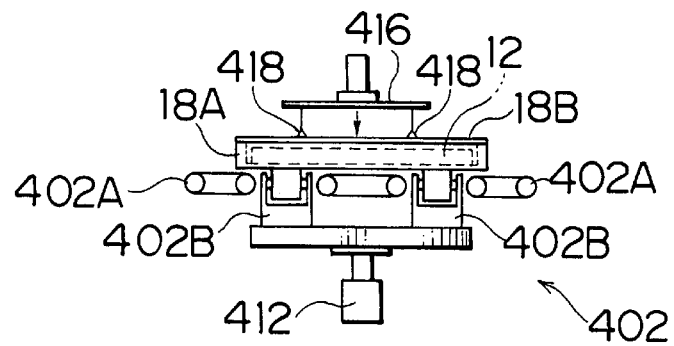
F I G. 3 5 (b)
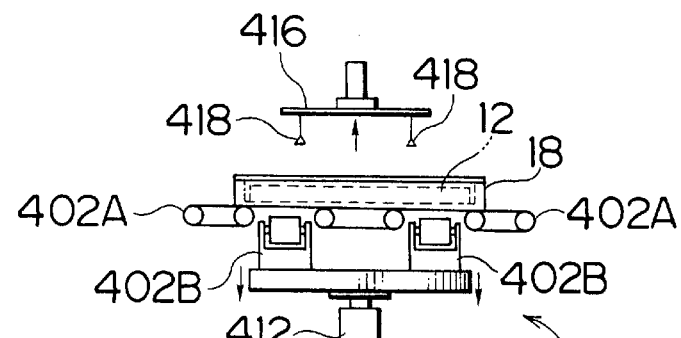
F I G. 3 5 (c)
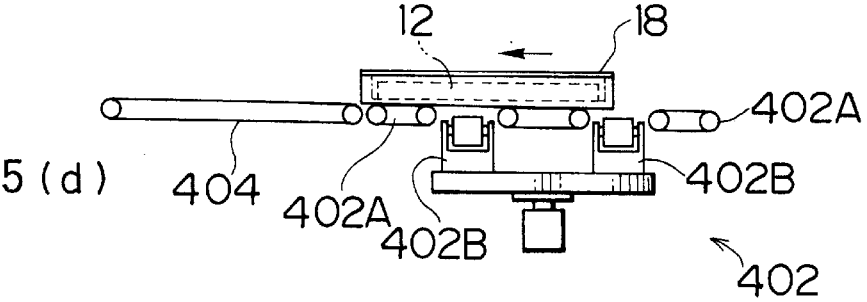
F I G. 3 5 (d)

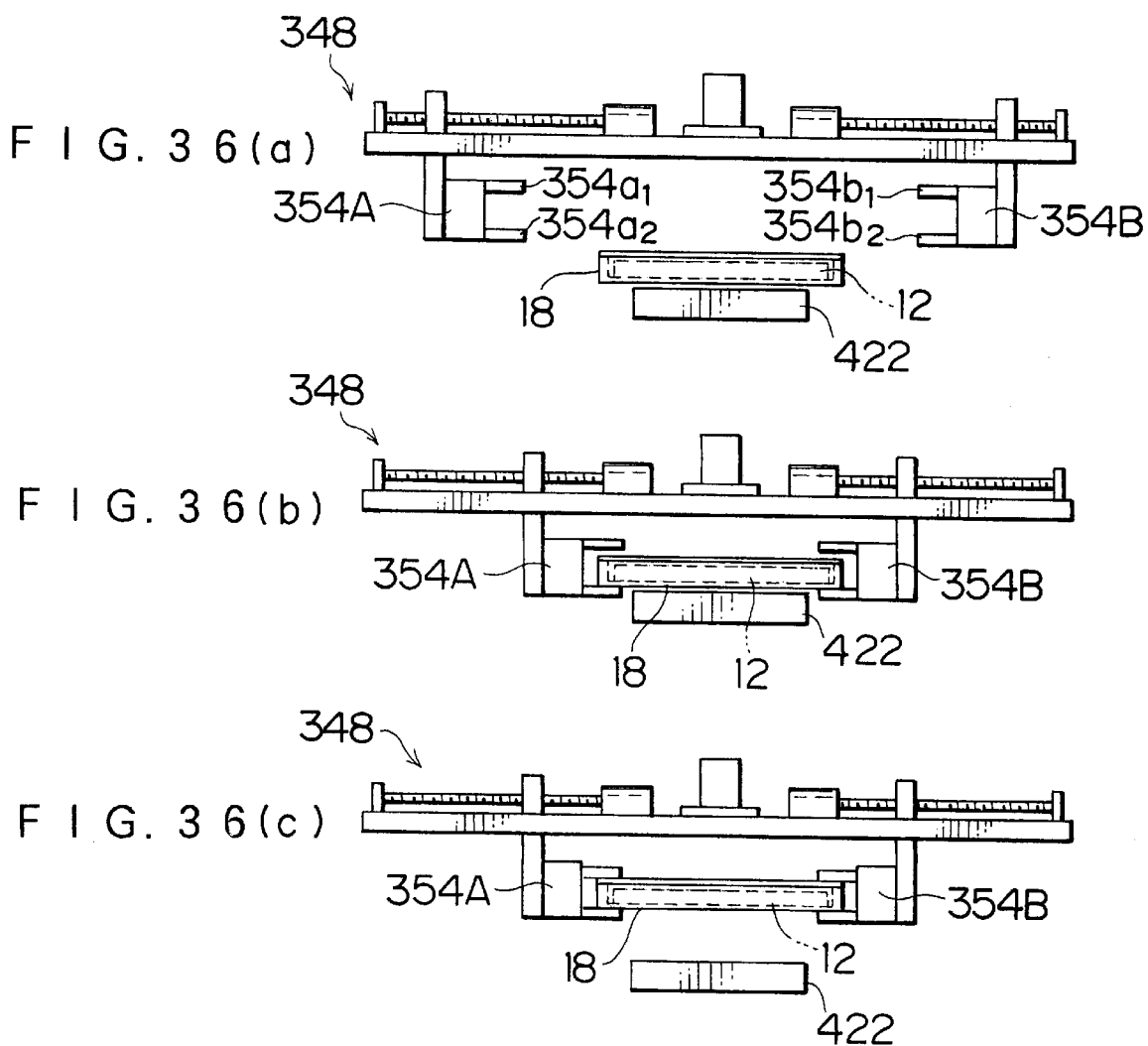

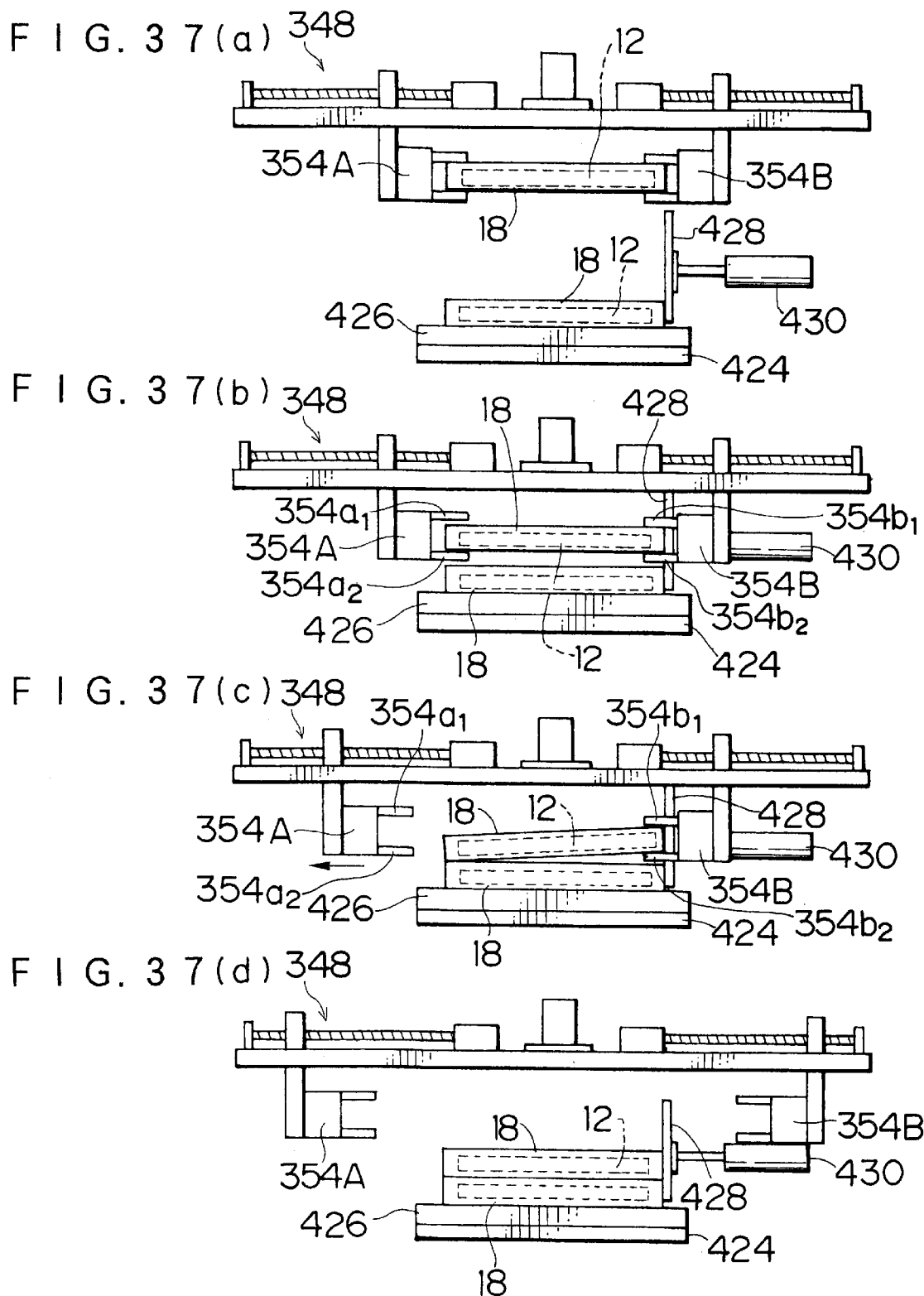

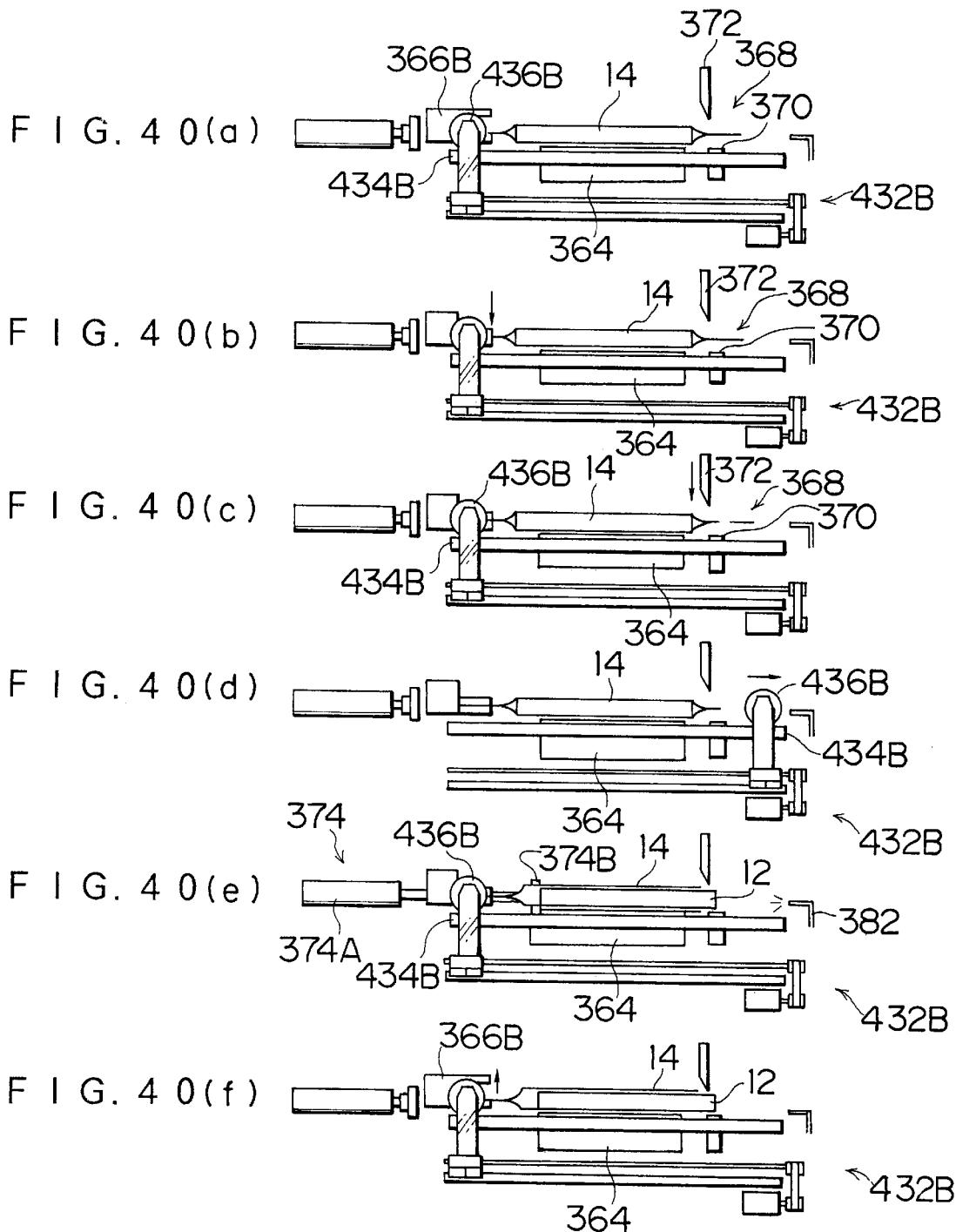

METHOD AND APPARATUS FOR REPACKING A PHOTOSENSITIVE TABULAR PRINTING PLATE

BACKGROUND OF THE INVENTION

1. Field of the Invention

The present invention relates generally to a method and apparatus for repacking a photosensitive tabular printing plate, and more particularly to a method and apparatus for repacking, in a darkroom, a photosensitive tabular printing plate from a package into a cartridge composed of a body and a lid.

2. Description of Related Art

A photosensitive tabular printing plate (PS plate: presensitized lithographic plate) in the market uses an aluminum plate as a support thereof, and it is widely used. A user of photoengraving machines performs printing by means of the PS plate which is manufactured by a manufacturer of printing materials. The PS plates supplied from the manufacturer are usually packed in a package so as not to expose themselves. The user usually repacks, in a darkroom, the packed PS plates from the package into a cartridge adopted to a supply part of a photoengraving machine to be used.

If, however, the user repacks the PS plates from the package into the cartridge whenever the user is supplied with the PS plates from the manufacturer, it is inconvenient and inefficient. Moreover, since the PS plates must be repacked in the darkroom, there is a problem concerning safety.

In order to eliminate the above-stated disadvantages, there is a method in that the manufacturer packs the PS plates in a special cartridge adopted to the photoengraving machine which is to be used by the user, and then the PS plates are supplied to the user. In this case, the special cartridge is expensive and it is difficult to recycle the cartridge, and because of this there is increased cost.

SUMMARY OF THE INVENTION

The present invention has been developed in view of the above-described circumstances, and has as its object the provision of a method and apparatus for automatically repacking a photosensitive tabular printing plate from a package into a cartridge.

To achieve the above-mentioned object, a method of the present invention of repacking, in a darkroom, a photosensitive tabular printing plate from a package into a cartridge composed of a body and a lid, the method comprises the steps of: cutting a periphery of the package to divide the package into a top piece and a bottom piece; holding and separating the top piece of the package from the photosensitive tabular printing plate; putting the cartridge body on the photosensitive tabular printing plate; inverting top and bottom faces of the photosensitive tabular printing plate covered with the cartridge body; holding and separating the bottom piece of the package from the inverted photosensitive tabular printing plate; and putting the cartridge lid on the cartridge body containing the photosensitive tabular printing plate.

According to the present invention, the periphery of the package of the photosensitive tabular printing plate is cut so that the package can be divided into the top and bottom pieces. Next, the top piece of the package is separated from the photosensitive tabular printing plate. Then, the cartridge body is put on the photosensitive tabular printing plate from which the top piece of the package has been separated. The top and bottom faces of the photosensitive tabular printing plate covered with the cartridge body are inverted, and the bottom piece of the package is separated from the inverted photosensitive tabular printing plate. Then, the cartridge lid is put on the photosensitive tabular printing plate from which the bottom piece has been separated. Thus, the repacking is completed.

To achieve the above-mentioned object, another method of the present invention of repacking, in a darkroom, a photosensitive tabular printing plate from a package into a cartridge composed of a body and a lid, the method comprises the steps of: cutting a periphery of the package to divide the package into a top piece and a bottom piece; holding and separating the top piece of the package from the photosensitive tabular printing plate; transferring the photosensitive tabular printing plate to the cartridge body, and housing the photosensitive tabular printing plate into the cartridge body while separating the bottom piece of the package from the photosensitive tabular printing plate; and putting the cartridge lid on the cartridge body which contains the photosensitive tabular printing plate.

According to the present invention, the periphery of the package of the photosensitive tabular printing plate is cut so that the package can be divided into the top and bottom pieces. Next, the top piece of the package is separated from the photosensitive tabular printing plate. Then, the photosensitive tabular printing plate is transferred and housed in the cartridge body while the bottom piece of the package being separated. The cartridge lid is put on the cartridge body which contains the photosensitive tabular printing plate. Thus, the repacking is completed.

To achieve the above-mentioned object, another method of the present invention of repacking, in a darkroom, a photosensitive tabular printing plate from a package into a cartridge composed of a body and a lid, the method comprises the steps of: opening at least one side of the package; taking out the photosensitive tabular printing plate from the package; and housing the photosensitive tabular printing plate into the cartridge.

According to the present invention, at least one side of the package is cut first. Then, the photosensitive tabular printing plate is taken out through the opened side of the package, and it is housed in the cartridge.

To achieve the above-mentioned object, a repacking apparatus of the present invention for repacking, in a darkroom, a photosensitive tabular printing plate from a package into a cartridge composed of a body and a lid, the repacking apparatus comprising: a opening means for opening at least one side of the package; a taking-out means for taking out the photosensitive tabular printing plate from the package; and a housing means for housing the photosensitive tabular printing plate into the cartridge.

According to the present invention, the opening means opens at least one side of the package first. Then, the taking-out means takes out the photosensitive tabular printing plate from the opened side, and the housing means houses the photosensitive tabular printing plate in the cartridge.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a perspective view illustrating the entire construction of the repacking apparatus according to the first embodiment;

FIGS. 8(a), 8(b) and 8(c) are views of assistance in explaining a process of transferring the package onto a first conveyor;

FIGS. 12(a), 12(b), 12(c) and 12(d) are views of assistance in explaining a process of inverting a bundle of PS plates;

FIG. 22 is a perspective view illustrating the entire construction of the repacking apparatus according to the third embodiment;

FIGS. 29(a), 29(b), 29(c), 29(d) and 29(e) are views of assistance in explaining a step of taking out the package from a package supply base;

FIGS. 31(a), 31(b), 31(c), 31(d) and 31(e) are views of assistance in explaining a step of opening the package and a step of pushing out the bundle of PS plates from the package;

FIGS. 32(a), 32(b), 32(c), 32(d) and 32(e) are views of assistance in explaining a step of taking out the bundle of PS plates from the package;

FIGS. 33(a), 33(b) and 33(c) are views of assistance in explaining a step of transferring the cartridge body onto a fifth conveyor;

FIGS. 34(a), 34(b), 34(c), 34(d) and 34(e) are views of assistance in explaining a step of housing the bundle of PS plates in the cartridge body;

FIGS. 35(a), 35(b), 35(c) and 35(d) are views of assistance in explaining a step of putting the cartridge lid on the cartridge body;

FIGS. 36(a), 36(b) and 36(c) are views of assistance in explaining a step of taking out the cartridge from a seventh conveyor;

FIGS. 37(a), 37(b), 37(c) and 37(d) are views of assistance in explaining a step of stacking the cartridges on a collecting base;

FIGS. 40(a), 40(b), 40(c), 40(d), 40(e) and 40(f) are views of assistance in explaining a step of opening the package and a step of pushing out the bundle of PS plates from the package according to another embodiment of the opening part.

DETAILED DESCRIPTION OF THE PREFERRED EMBODIMENTS

This invention will be explained by way of example with reference to the accompanying drawings.

First, a description will be given of a photosensitive tabular printing plate (PS plate) which is repacked by a repacking apparatus according to the present invention.

Figure 6:
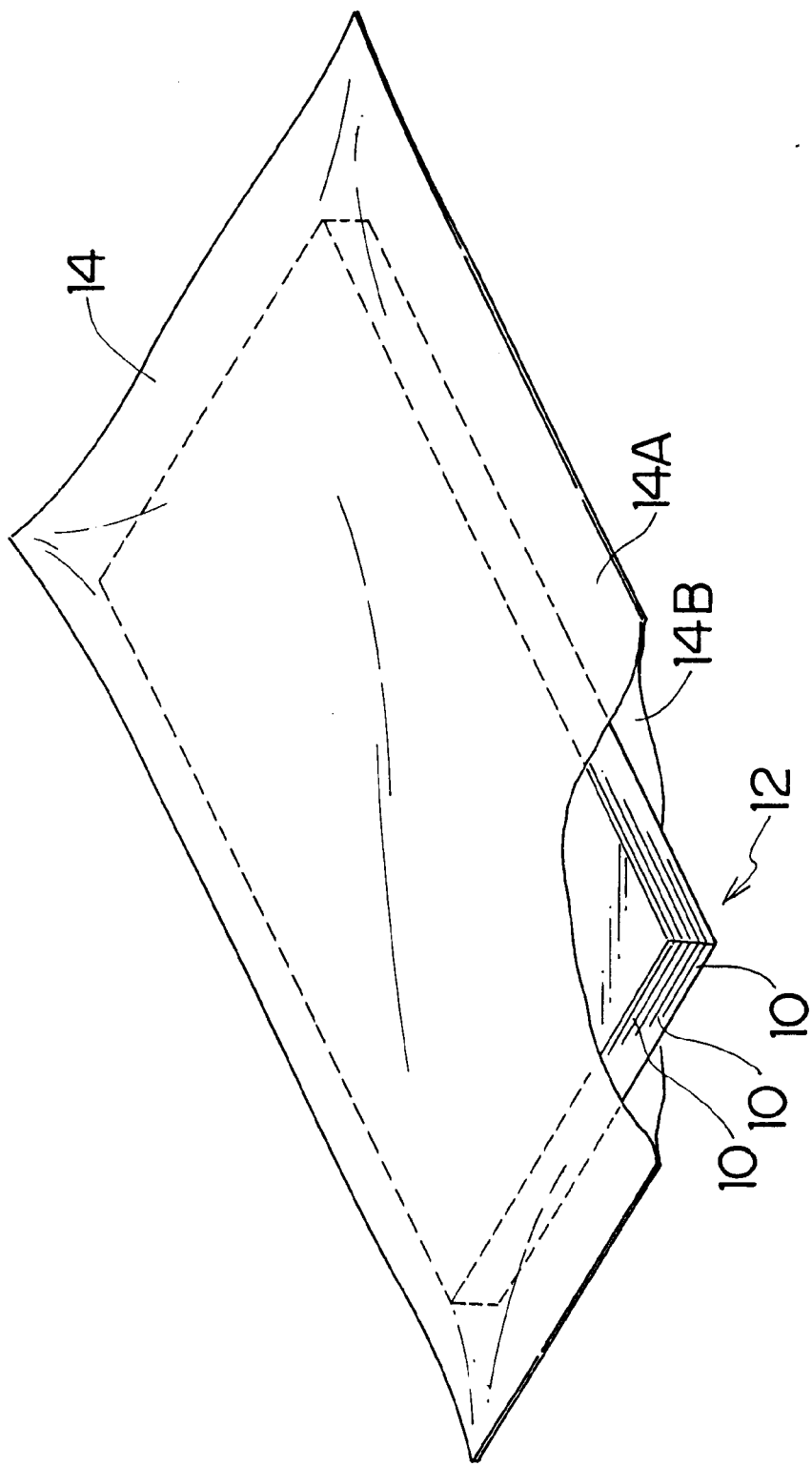
FIG. 6 is a perspective view illustrating the construction of a package.
Figure 7:
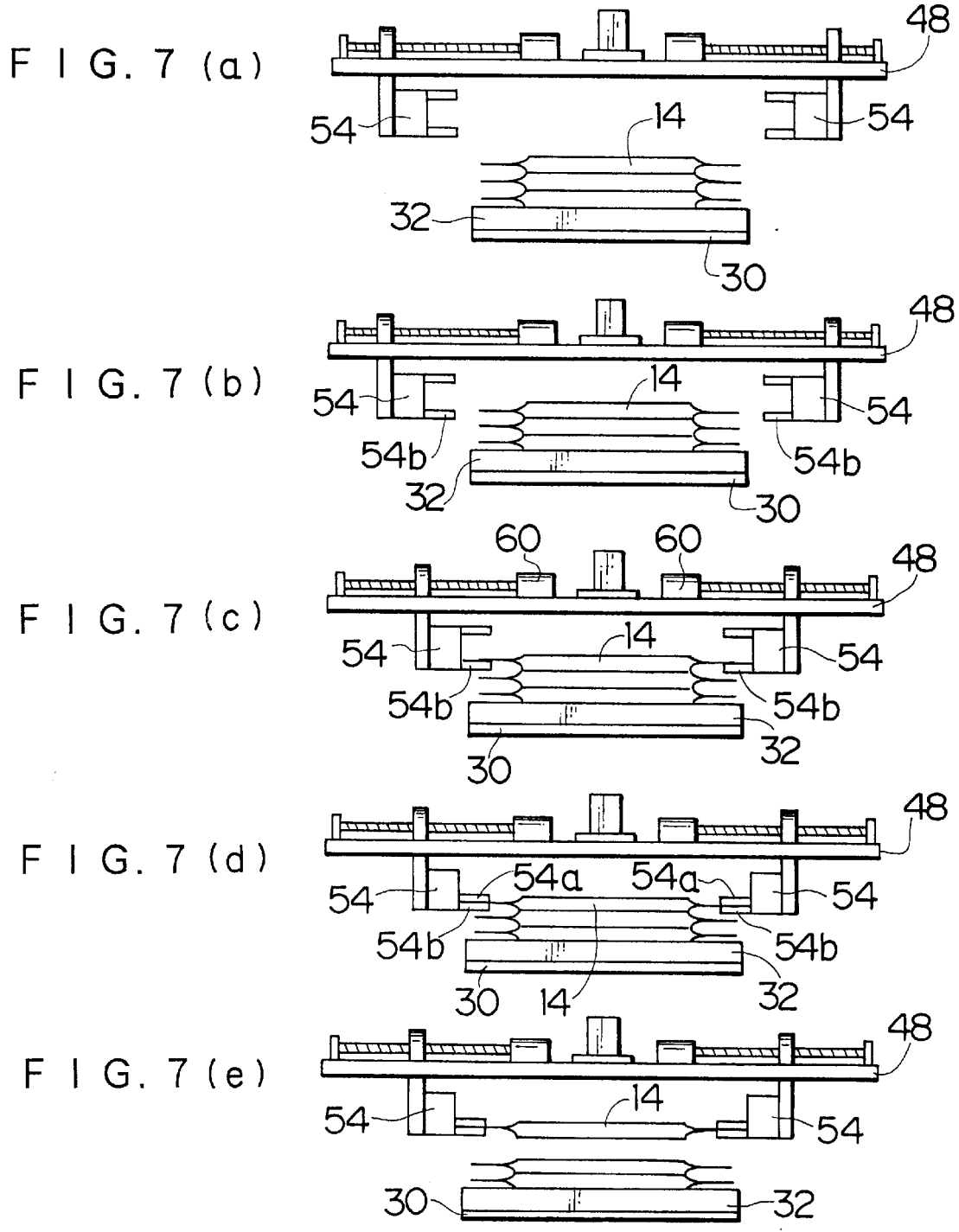
FIGS. 7(a), 7(b), 7(c), 7(d) and 7(e) are views of assistance in explaining a process of transferring the package from a supply base.

The PS plate is made of a sheet or coil-like aluminum plate. A surface of the aluminum plate is treated with such as graining, anodizing and hydrophilizing, thereafter the plate is coated with photosensitive solution. Then, the plate is dried and cut into a desired size. Thus the PS plate is manufactured. As shown in FIG. 6, the manufactured PS plates 10 are packed in a bundle (a bundle of the PS plates 10 will hereinafter be referred to as a "bundle 12") in a package 14 so as not to expose the PS plates 10, and the PS plates 10 are supplied to a user of photoengraving machines.

The user who is supplied with the PS plates 10 opens the package 14 and repacks the bundle 12 into a cartridge which fits a supply part of the photoengraving machine used by the particular user.

The package 14 is made of a sheet of a single material such as a synthetic resin (polyethylene, nylon, urethane rubber, polypropylene, polystyrene, etc.), aluminum foil and paper, or a composite material of them, and the sheet is formed into a bag. The cartridge 18 is shaped like a box in accordance with the shape of the PS plate, and it is composed of a cartridge body and a cartridge lid.

The repacking apparatus of the present invention automatically repacks the bundle 12 from the package 14 into the cartridge 18. A description will hereunder be given of the construction of the repacking apparatus.

FIG. 1 is a perspective view illustrating the entire construction of the repacking apparatus for the first embodiment. As shown in FIG. 1, the repacking apparatus 16 consists of a supply part 20 for supplying the package 14, a transfer part 22 for transferring the package 14 and the cartridge 18, an opening part for opening the package 14, a repacking part 26 for repacking the PS plates, and a collecting part 28 for collecting filled cartridges 18 which have been packed with the PS plates. The repacking apparatus 16 is placed in a darkroom.

The construction of the supply part 20 will be explained. As described previously, the supply part 20 supplies the package 14. The supply part 20 has a supply base 30, and a pallet 32 which is stacked with the packages 14 is placed on the supply base 30.

The construction of the transfer part 22 will be explained. The transfer part 22 transfers the package 14 and the cartridge 18. The transfer part 22 consists of a transfer robot 34, a conveyor 36 and an inverter 38, which are arranged in a straight line.

The transfer robot 34 transfers an unopened package 14 from the supply part 20 to the conveyer 36, and transfers the filled cartridge 18 from the conveyer 36 to the collecting part 28. The transfer robot 34 is comprised mainly of a rotary frame 40, a column 42, a first arm 44, a second arm 46 and a transfer head 48. The rotary frame 40 is rotatably supported on a base 50, and is rotated by a motor (not shown). The column 42 erects on the rotary frame 40. The first arm 44 is connected to the end of the column 42 by a shaft 45, and it is driven by a hydraulic cylinder (not shown) so as to rotate around the shaft 45. The second arm 46 is connected to the end of the first arm 44 by a shaft 47, and it is driven by a hydraulic cylinder 52 so as to rotate around the shaft 47. The transfer head 48 is connected to the end of the second arm 46 by a shaft 49, and it is driven by a hydraulic cylinder (not shown) so as to rotate around the shaft 49.

According to the above-described construction, the transfer head 48 of the transfer robot 34 is able to freely rotate and move upward, downward, forward and backward. The package 14 and the cartridge 18 are transferred onto the conveyor 36 or the collecting part 28 in a state of being held by the transfer head 48.

Figure 2:
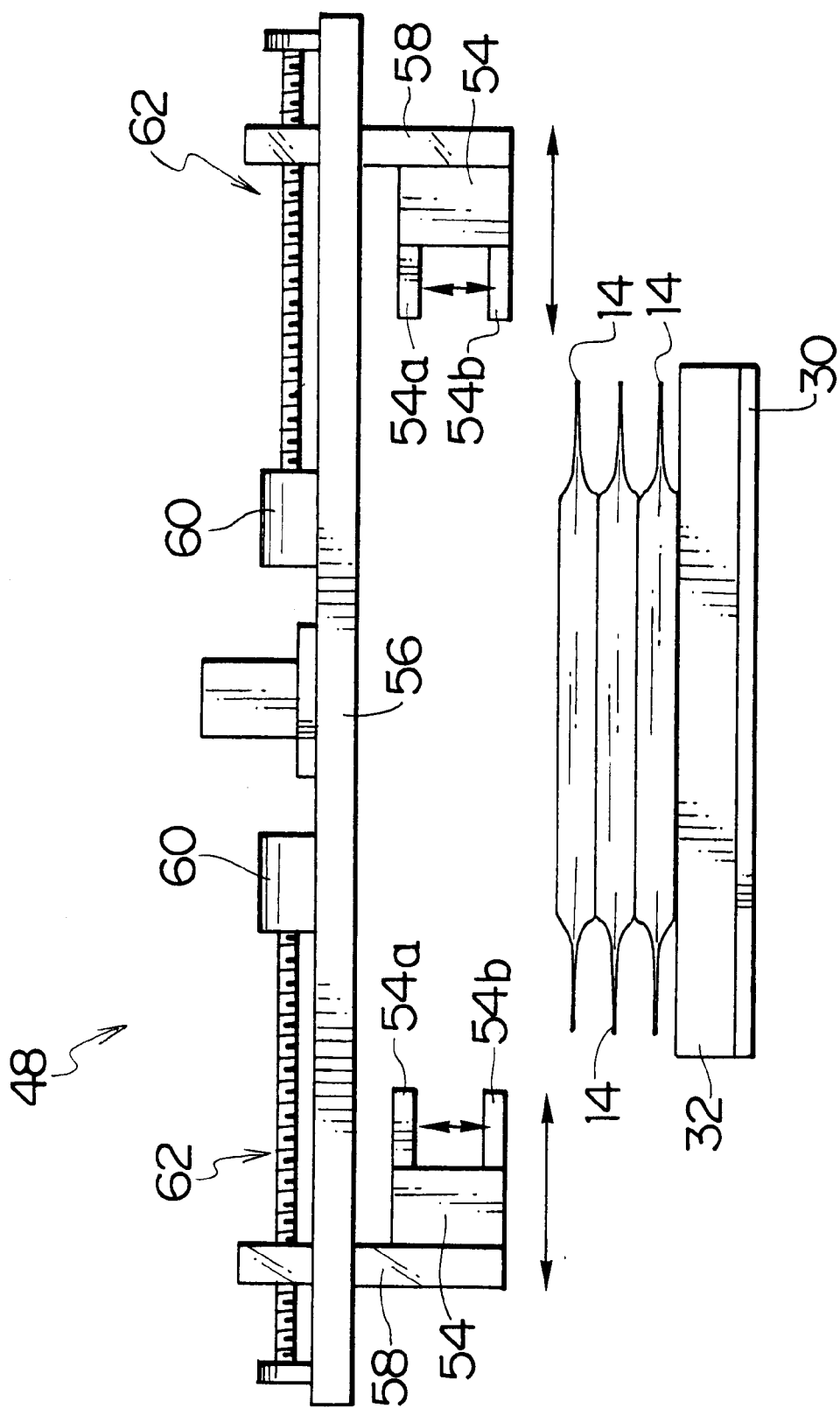
FIG. 2 is a front view illustrating the construction of a transfer head.

FIG. 2 illustrates the construction of the transfer head 48. As shown in FIG. 2, the transfer head 48 has a pair of chucks 54, and each chuck 54 has a pair of jaws 54a, 54b. The jaw 54a is vertically moved by a driving means (not shown). The chucks 54 pinch the sides of the package 14 or the cartridge 18 by moving the jaws 54a toward the jaws 54b, so that the package 14 or the cartridge 18 is held by the transfer head 48. The chucks 54 are attached on sliders 58, which are slidably supported by a LM guide (not shown) provided at a body frame 56 of the transfer head 48. The sliders 58 are driven by feed screw mechanisms 62, which are driven by motors 60. Thus, a distance between the pair of chucks 54 can be changed.

Figure 3:
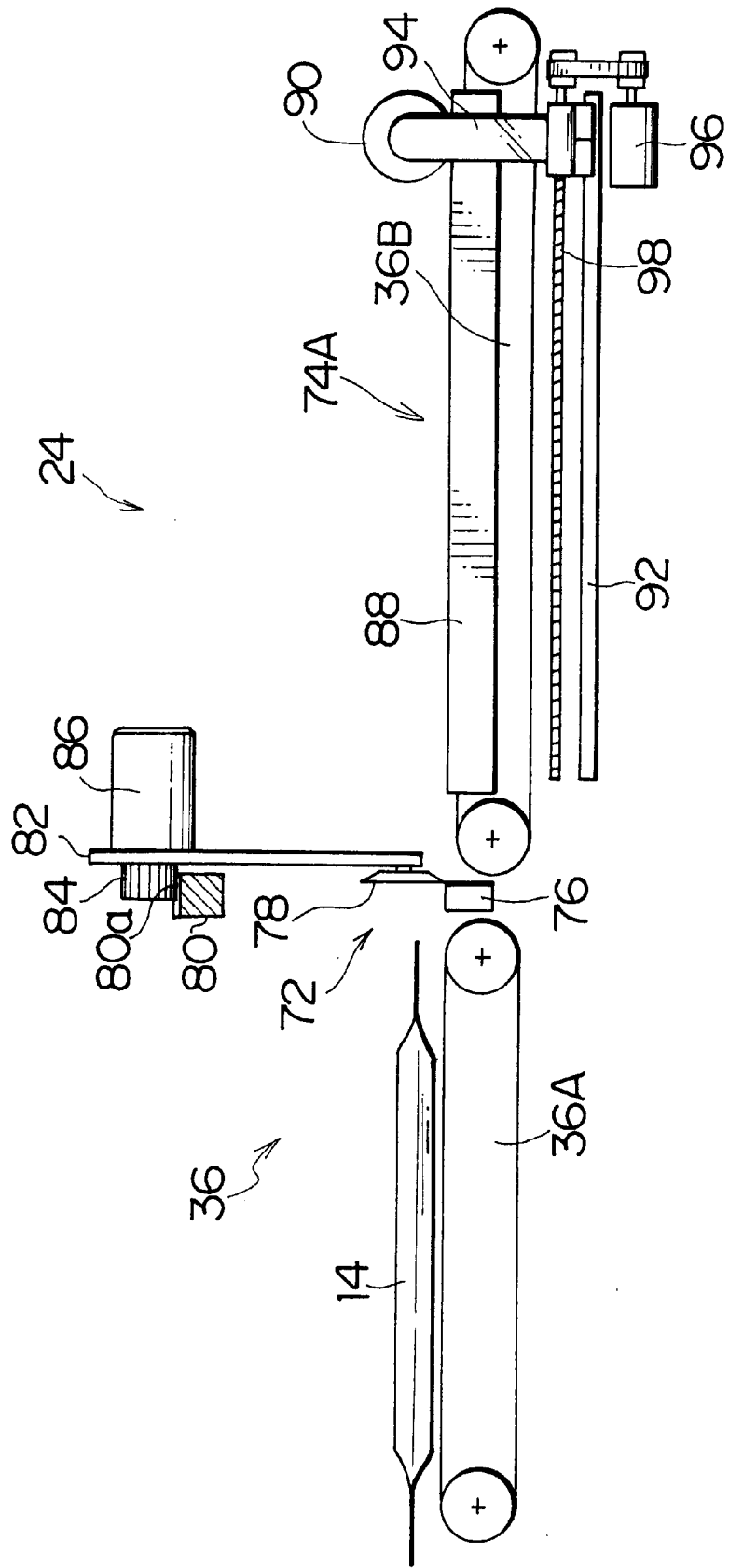
FIG. 3 is a side view illustrating the construction of a conveyor and an opening part.

The conveyor 36 transfers the package 14 and the cartridge 18, and functions as a workbench during repacking. The conveyor 36 consists of a first conveyor 36A and a second conveyor 36B as shown in FIG. 3, and they are moved back and forth by motors (not shown) which are able to rotate forward and backward.

Figure 4:
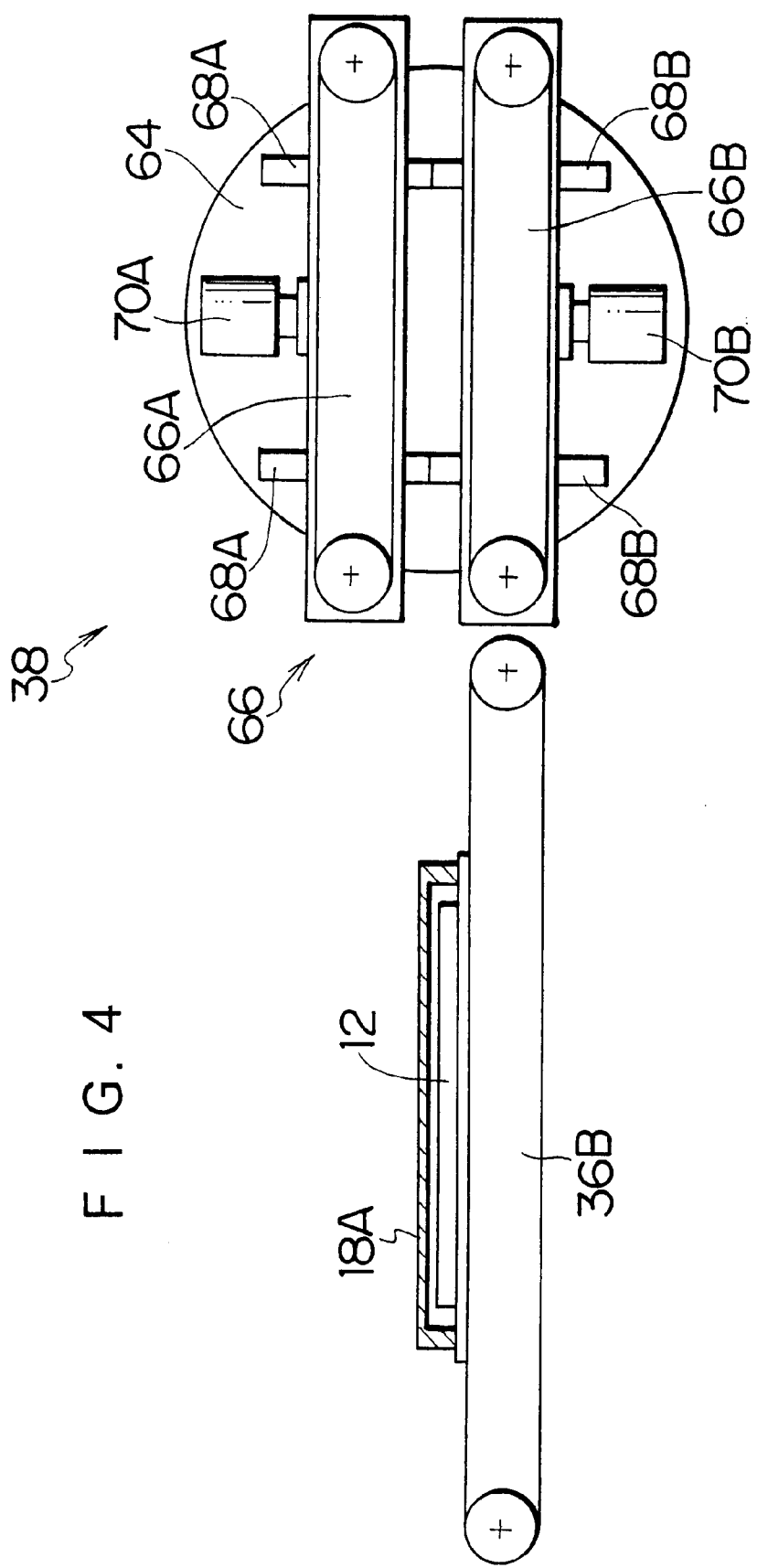
FIG. 4 is a side view illustrating the construction of a conveyor and an inverter.

The inverter 38 inverts the top and bottom faces of the bundle 12 of the PS plates 10 which has been transferred by the conveyor 36 (as described later, the bundle 12 is covered with a cartridge body 18A if the bundle 12 has been transferred to the inverter 38.) The inverter 36 is comprised mainly of a rotary body 64 and a holding conveyer 66 which is provided at the rotary body 64. The rotary body 64 is rotatably mounted on a column 68 which is provided vertically, and is rotated by driving a motor 70 which is connected to an axis thereof. The holding conveyor 66 is composed of an upper conveyor 66A and a lower conveyor 66B as shown in FIG. 4. The upper conveyor 66A and the lower conveyor 66B are slidably supported by a pair of LM guides 68A, 68B which are provided on the rotary body 64. By driving hydraulic cylinders 70A, 70B which connect to the top face of the upper conveyor 66A and the bottom face of the lower conveyor 66B, respectively, the upper conveyor 66A and the lower conveyor 66B move to become closer to one another and pinch the bundle 12 therebetween.

The inverter 38, which is constructed in the above-mentioned manner, pinches the bundle 12 which has been transferred by the conveyor 36, with the holding conveyor 66, which is composed of the upper conveyor 66A and the lower conveyor 66B. In this state, the rotary body 64 rotates 180°, thereby inverting the top and bottom faces of the bundle 12.

A description will be given of the construction of an opening part 24 for opening the package 14. The opening part 24 consists of a first slitter 72 for cutting the sides of the package 14 which are perpendicular to a transfer direction of the package 14 and a second slitter for cutting the sides of the package 14 which are parallel with the transfer direction.

As shown in FIGS. 1 and 3, the first slitter 72 consists of a rod-shaped lower edge 76 and a disk-shaped upper edge 78, which moves along the lower edge 76. The lower edge 76 is arranged between the first conveyor 36A and the second conveyor 36B, and is arranged perpendicular to the transfer direction of the package 14. Above the lower edge 76, a guide rail 80 is arranged along the lower edge 76. A slider 82 is slidably supported by the guide rail 80. The upper edge 78 is rotatably provided at the end of the slider 82, and the upper edge 78 is moved along the lower edge 76 by moving the slider 82. The slider 82 is moved by a rack 80a, which is formed at the top of the guide rail 80, and a pinion 84, which is provided at the upper section of the slider 82. By driving the pinion 84 by a motor 86, the slider 82 is moved along the guide rail 80.

When the first slitter 72, which is constructed in the above-mentioned manner, cuts the side of the package 14 which is perpendicular to the transfer direction of the package 14, the side of the package 14 is positioned on the lower edge 76, and the upper edge 78 moves along the lower edge 76.

As shown in FIGS. 1 and 3, the second slitter 74 consists of a pair of side slitters 74A, 74B which are arranged at both sides of the second conveyor 36B. The side slitter 74A consists of a rod-shaped lower edge 88 and a disk-shaped upper edge 90, which moves along the lower edge 88 as is the case with the first slitter 72. The lower edge 88 is arranged close to the side of the second conveyor 36, and is arranged parallel to the transfer direction of the package 14. Below the lower edge 88, a guide rail 92 is arranged along the lower edge 88. A slider 94 is slidably supported by the guide rail 92. The upper edge 90 is rotatably supported at the end of the slider 94, and the upper edge 90 is moved along the lower edge 88 by moving the slider 94. The slider 94 is moved by a feed screw mechanism 98 which is driven by a motor 96. By driving the feed screw mechanism 98 by the motor 96, the slider 94 is moved along the guide rail 92. The side slitters 74A, 74B are constructed in the same manner.

When the second slitter 74, which is constructed in the above-mentioned manner, cuts the sides of the package 14 which are parallel with the transfer direction of the package 14, the sides of the package 14 are positioned on the lower edges 88 of the side slitters 74A, 74B, and the upper edges 90 move along the lower edges 88.

The first slitter 72 and the second slitter 74 cut four sides of the package 14, thereby opening the package 14 in such a way that the package 14 is divided into a top piece 14A and a bottom piece 14B.

Figure 5:
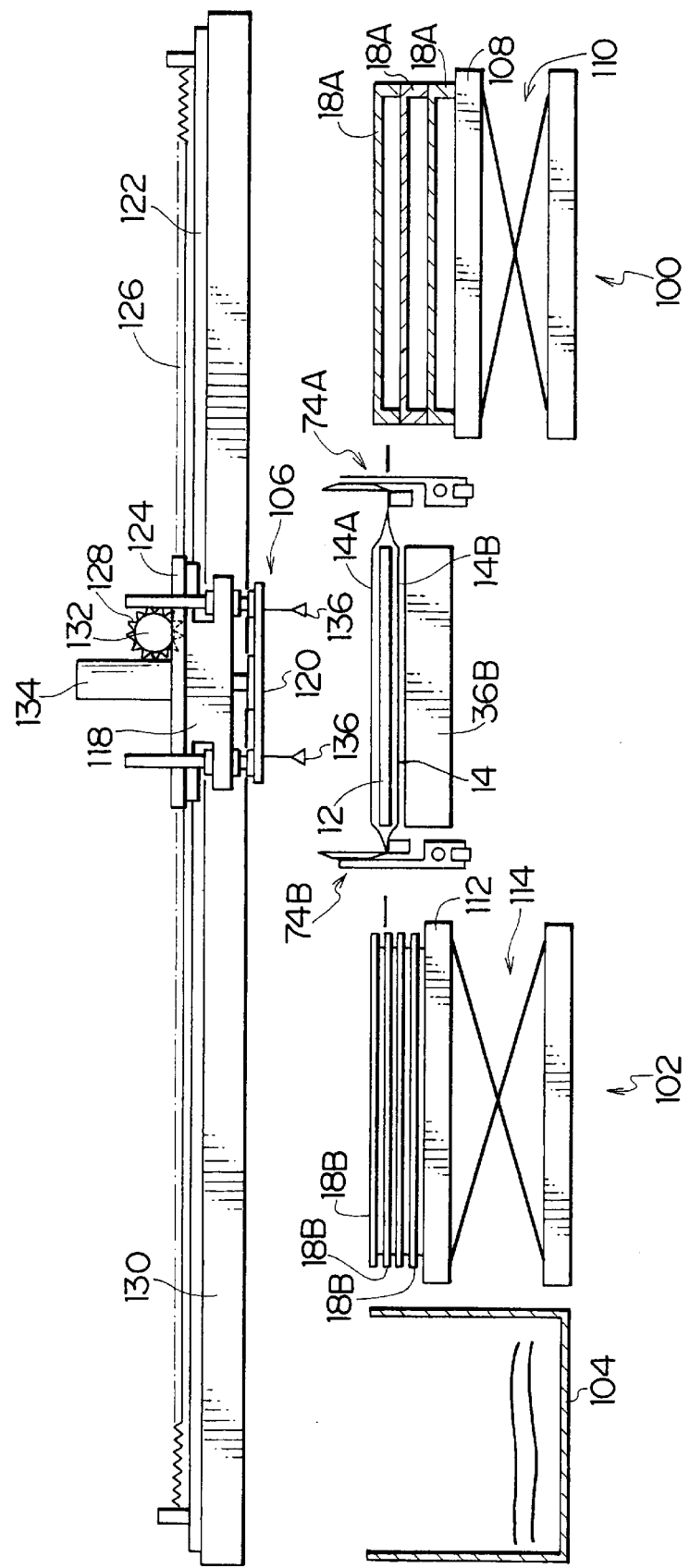
FIG. 5 is a front view illustrating the construction of a repacking part.

A description will be given of the construction of the repacking part 26. The repacking part 26 repacks the bundle 12 of the PS plates from the package 14 into the cartridge 18. As shown in FIGS. 1 and 5, the repacking part 26 consists of a body supply unit 100 for supplying the cartridge body 18A, a lid supply unit 102 for supplying the cartridge lid 18B, a wastebasket 104, into which the top piece 14A and the bottom piece 14B of the package 14, which are cut by the opening part 24, are put, and a lifter 106 for transferring the cartridge body 18A, etc. between the units of the repacking part 26. The above-mentioned units are arranged in a straight line which is perpendicular to the transfer direction of the package 14 across the second conveyor 36B.

As shown in FIG. 5, the body supply unit 100 is provided at the right side of the second conveyor 36B. The body supply unit 100 has a body stack table 108, which is stacked with the cartridge bodies 18A. The body stack table 108 is moved vertically by a pantographical lifting mechanism 110, which is driven by a hydraulic cylinder (not shown).

On the other hand, the lid supply unit 102 is provided at the left side of the second conveyor 36B. The lid supply unit 102 has a lid stack table 112, which is stacked with the cartridge lids 18B. The lid stack table 112 is moved vertically by a pantographical lifting mechanism 114, which is driven by a hydraulic cylinder (not shown), as is the case with the body supply unit 100.

The wastebasket 104 is provided at the left side of the lid supply unit 102. The top piece 14A and the bottom piece 14B of the package 14, which have been separated at the opening part 24, are put into the wastebasket 104.

The lifter 106 moves between the units of the repacking part 26 to transfer the cartridge body 18A, the cartridge lid 18B, and the top piece 14A and the bottom piece 14B of the package 14. The lifter 106 consists of a lifter body 118 and a holding unit 120, which is provided on the lifter body 118.

The lifter body 118 is mounted on a slider 124, and the slider 124 is slidably supported by a guide rail 122, which is provided on a support frame 130 above the units of the repacking part 26. The slider 124 is moved by a rack 126, which is formed at the top of the support frame 130 along the guide rail 122, and a pinion 128, which is provided at the top of the slider 124. When a motor 132 drives the pinion 128, the slider 124 moves along the guide rail 122, and thereby the lifter body 118 moves between the units.

The holding unit 120 is provided on the lifter body 118, and when a hydraulic cylinder 134 is driven, the holding unit 120 moves vertically. The holding unit 120 is provided with four holding pads 136, which are driven by a vacuum pump (not shown) so as to hold the cartridge body 18A, the cartridge lid 18B and the top piece 14A and the bottom piece 14B of the package 14.

The repacking part 26 is constructed in the above-mentioned manner, and a repacking method thereof will be described later.

The construction of the collecting part 28 will be explained. The collecting part 28 collects the filled cartridge 18 which has been packed with the PS plates. The collecting part 28 has a collecting base 138, on which a pallet 32 to be stacked with the filled cartridges 18 is placed.

The filled cartridges 18 are transferred onto the pallet 32 by the transfer robot 34 of the transfer part 22. A stopper plate 140 is provided in proximity to the collecting base 138 so that the collected cartridges 18 can be stacked without shifting. When the cartridge 18 is stacked, the side of the cartridge 18 is abutted against the stopper plate 140 so as to prevent the cartridge 18 from shifting. The stopper plate 140 is connected to a hydraulic cylinder 142 in a manner that is movable forward and backward. When the pallet 32 is carried out, the stopper plate 140 retracts.

A description will hereunder be given about the operation of the repacking apparatus 16 in the first embodiment, which is constructed in the above-mentioned manner.

The user of the photoengraving machine who has been supplied with the PS plates 10 packed in the packages 14 from a manufacturer of printing materials, stacks a predetermined number of the packages 14 on the pallet 32. Then, the user transfers the pallet 32 which is stacked with the packages 14 to the repacking apparatus 16, and places the pallet 32 on the supply base 30 of the supply part 20.

At the same time, the user divides the cartridges 18 into the cartridge bodies 18A and the cartridge lids 18B. As shown in FIG. 5, the cartridge bodies 18A are stacked on the body stack table 108 of the body supply unit 100 so that the bottom of the cartridge bodies 18A can face up, and the cartridge lids 18B are stacked on the lid stack table 112 of the lid supply unit 102.

After the above-described preparations are completed, the repacking apparatus 16 is activated.

First, the package 14 which is on the top of the packages 14 stacked on the supply base 30 is transferred onto the first conveyor 36A by the transfer robot 34. FIGS. 7(a)–8(c) show a sequence of steps for the transfer robot 34 to transfer the package 14 from the supply base 30 onto the first conveyor 36A.

As shown in FIG. 7(a), the transfer head 48 of the transfer robot 34 is positioned at a predetermined package receiving position. The package receiving position is set at a predetermined height from the center of the supply base 30. When the transfer head 48 reaches the package receiving position, the center of the transfer head 48 corresponds to that of the supply base 30.

Then, the transfer head 48 moves down by a predetermined length from the package receiving position toward the package 14 which is placed on the supply base 30. Thereby, as shown in FIG. 7(b), the lower jaws 54b of the pair of chucks 54 provided at the transfer head 48 are positioned between the package 14 on the top of the packages 14 stacked on the supply base 30 and the package 14 at the next to the top.

When the jaws 54b are positioned between the package 14 on the top and the package 14 at the next to the top, the pair of chucks 54 move inward by a predetermined length. Thereby, as shown in FIG. 7(c), the jaws 54b enter a space between the top package 14 and the next package 14.

When the jaws 54b enter the space between the top package 14 and the next package 14, the upper jaws 54a of the chucks 54 move toward the lower jaws 54b. Thereby, as shown in FIG. 7(d), the sides of the top package 14 are pinched between the upper jaws 54a and the lower jaws 54b.

Thus, the package 14 which is placed on the supply base 30 is held by the transfer head 48. Thereafter, the transfer head 48 moves up to the package receiving position while holding the package 14 as shown in FIG. 7(e). Then, the transfer head 48 rotates 180° to a predetermined delivering position as shown in FIG. 8(a). The delivering position is set at a predetermined height from the first conveyor 36A. When the transfer head 48 reaches the delivering position, the center of the transfer head 48 corresponds to that of the first conveyor 36A.

Then, the transfer head 48 moves down by a predetermined length from the delivering position toward the first conveyor 36A. Thereby, the package 14 which is held by the transfer head 48 is placed on the first conveyor 36A.

When the package 14 is placed on the first conveyor 36A, the chucks 54 release the package 14 as shown in FIG. 8(b). That is, the upper jaws 54a of the chucks 54 move upward, and the jaws 54a, 54b release the package 14.

Thereafter, the package 14 is transferred by the first conveyor 36A, and the process goes on to the next. On the other hand, the chucks 54 of the transfer head 48, which release the package 14, move outward by a predetermined length, and the transfer head 48 moves up to the delivering position.

In a sequence of the above-mentioned steps, the package 14 which was stacked on the supply base 30 is transferred onto the first conveyor 36A. Then, the package 14 which is placed on the first conveyor 36A is transferred by the first conveyor 36A to the opening part 24, and the package 14 is opened. That is, the first slitter 72 and the second slitter 74 of the opening part 24 cut the sides of the package 14, so that the package 14 can be divided into the top piece 14A and the bottom piece 14B. FIGS. 9(a)–9(f) illustrate a sequence of steps for opening the package 14.

Figure 9:
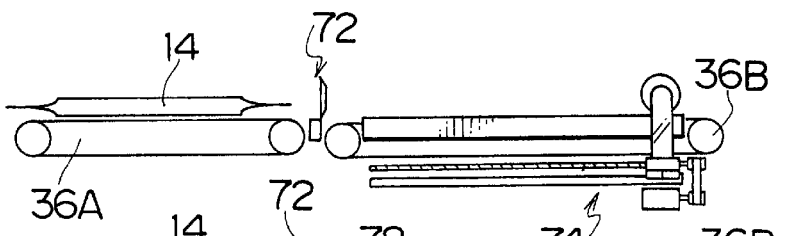
FIGS. 9(a), 9(b), 9(c), 9(d), 9(e) and 9(f) are views of assistance in explaining a process of opening the package.
Figure 9:
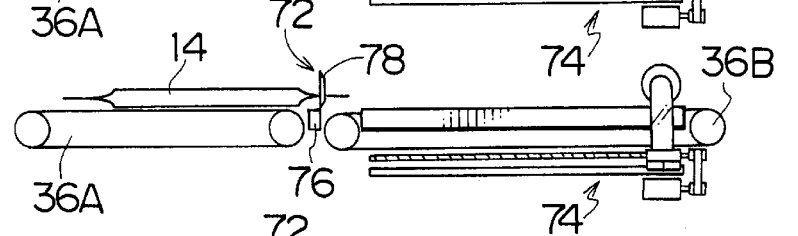
Figure 9:
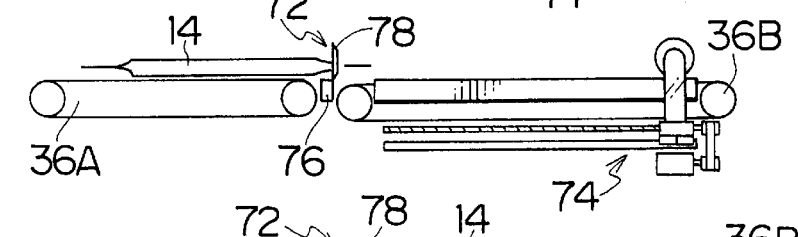
Figure 9:
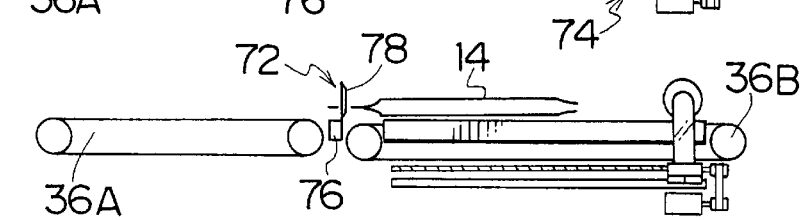
Figure 9:
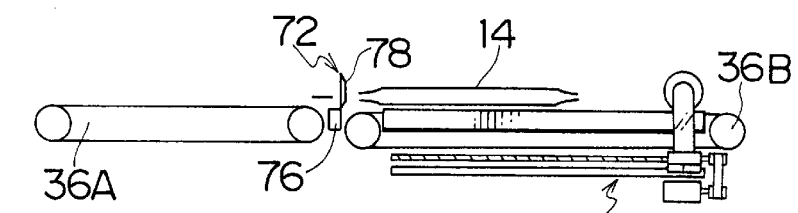
Figure 9:
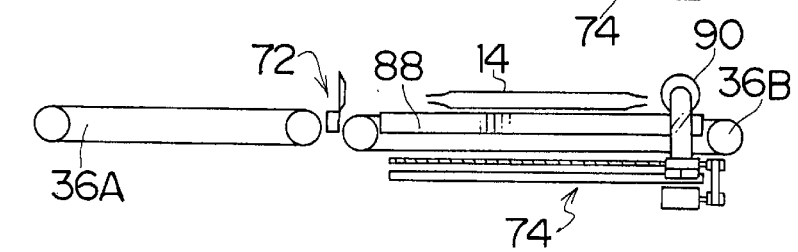

The opening steps will be explained with reference to FIGS. 9(a)–9(f). As shown in FIG. 9(a), when the package 14 is placed on the first conveyor 36A, the first conveyor 36A transfers the package 14 to the right. Then, as shown in FIG. 9(b), when a front side (a right side in the drawing) of the package 14 is positioned above the lower edge 76 of the first slitter 72, the first conveyor 36A and the package 14 stop.

When the front side of the package 14 stops above the lower edge 76 of the first slitter 72, the upper edge 78 of the first slitter 72 moves along the lower edge 76 as shown in FIG. 9(c) (see FIG. 1), thereby cutting the front side of the package 14.

When the front side of the package 14 is cut, the first conveyor 36A moves again to transfer the package 14 to the right. The second conveyor 36B also moves at the same time, and the package 14 is delivered from the first conveyor 36A to the second conveyor 36B. As shown in FIG. 9(d), when a rear side (a left side in the drawing) of the package 14 is positioned above the lower edge 76 of the first slitter 72, the first and second conveyors 36A and 36B and the package 14 stop.

When the rear side of the package 14 stops above the lower edge 76 of the first slitter 72, the upper edge 78 of the first slitter 72 moves along the lower edge 76 as shown in FIG. 9(e), thereby cutting the rear side of the package 14.

When cutting the rear side of the package 14, the upper edge 78 moves in a direction reverse to the direction cut the front side of the package 14. That is, the upper edge 78 cuts the front side of the package 14 by moving forward, and cuts the rear side of the package 14 by moving backward. Thus, the upper edge 78 moves forward and backward to cut the front and rear sides of the package 14, and returns to the original position.

After the rear side of the package 14 is cut, the second conveyor 36B moves the package 14 to the right. As shown in FIG. 9(f), when the package 14 reaches substantially the center of the second conveyor 36B, the second conveyor 36 and the package 14 stop.

When the package 14 reaches substantially the center of the second conveyor 36B, the other sides of the package 14, which are perpendicular to the cut sides, are positioned above the lower edges 88 of the side slitters 74A, 74B of the second slitter 74. In this state, the upper edges 90 of the side slitters 74A, 74B move along the lower edges 88, thereby cutting the sides of the package 14.

In the above-mentioned steps, four sides of the package 14 are cut, and the package 14 is opened and divided into the top piece 14A and the bottom piece 14B.

When the package 14 is divided into the top piece 14A and the bottom piece 14B, the repacking part 26 repacks the bundle 12 of the PS plates packed in the package 14 into the cartridge 18. FIGS. 10(a)–13(d) illustrate a sequence of steps for repacking the bundle 12 of the PS plates from the package 14 into the cartridge 18.

Figure 10A:
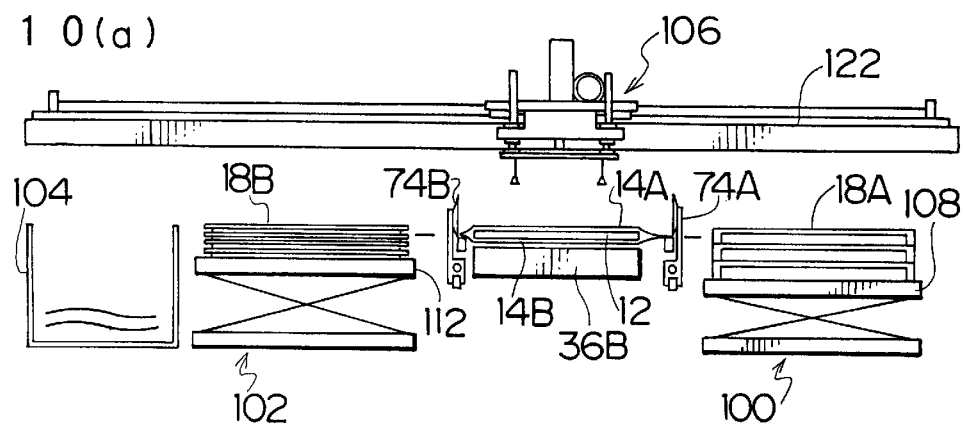
FIGS. 10(a), 10(b) and 10(c) are views of assistance in explaining a process of throwing out a top piece of the package into a wastebasket.

The repacking process will be described with reference to FIGS. 10(a)–13(d). As shown in FIG. 10(a), the lifter 106 is waiting above the opened package 14.

Figure 10B:
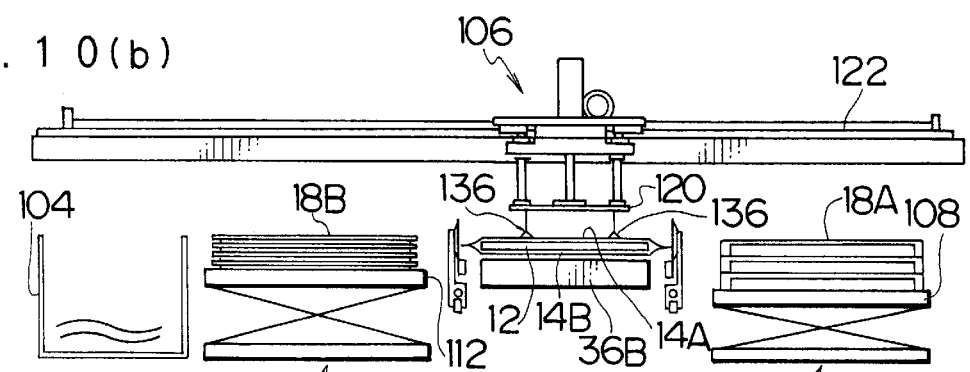

After the package 14 is opened, the holding unit 120 of the lifter 106 moves down by a predetermined length toward the package 14 as shown in FIG. 10(b). Thereby, the holding pads 136 of the holding unit 120 come in contact with the top piece 14A of the package 14. Then, the holding pads 136 are driven, and the holding pads 136 hold the top piece 14A of the package 14.

Figure 10C:
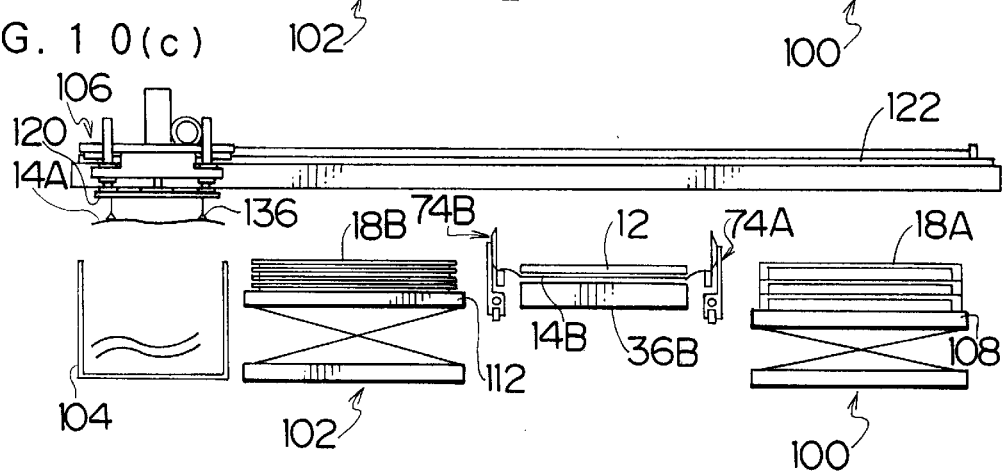

When the holding pads 136 hold the top piece 14A of the package 14, the holding unit 120 moves upward while holding the top piece 14A. When the holding unit 120 reaches a predetermined height, the lifter 106 moves to the left and stops above the wastebasket 104 as shown in FIG. 10(c).

When the lifter 106 stops above the wastebasket 104, the driving of the holding pads 136 is stopped. Thereby, the top piece 14A of the package 14 is released from the holding pads 136 and falls into the wastebasket 104.

Thus, the top piece 14A of the package 14 is separated from the opened package 14, and the separated top piece 14A is put into the wastebasket 104.

Figure 11A:
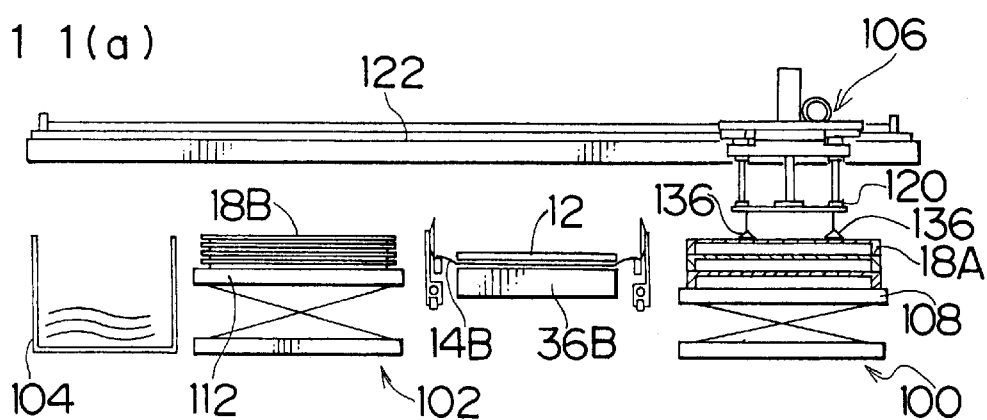
FIGS. 11(a), 11(b) and 11(c) are views of assistance in explaining a process of putting a body of a cartridge.

After the lifter 106 puts the top piece 14A of the package 14 into the wastebasket 104, the lifter 106 moves to the right and stops above the body supply unit 100 as shown in FIG. 11(a).

When the lifter 106 stops above the body supply unit 100, the holding unit 120 of the lifter 106 moves down by a predetermined length. Thereby, the holding pads 136 of the holding unit 120 come in contact with the cartridge body 18A stacked on the body stack table 108 of the body supply unit 100. Then, the holding pads 136 are driven, and the holding pads 136 hold the cartridge body 18A.

When the holding pads 136 hold the cartridge body 18A, the holding unit 120 moves upward while holding the cartridge body 18A. When the holding unit 120 reaches a predetermined height, the lifter 106 moves to the left and stops above the second conveyor 36B.

Figure 11B:
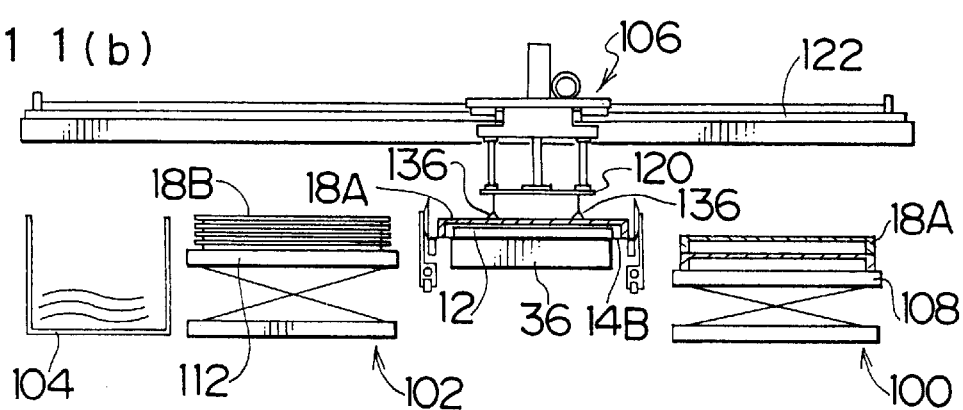

When the lifter 106 stops above the second conveyor 36B, the holding unit 120 moves down by a predetermined length as shown in FIG. 11(b). Thereby, the bundle 12 of the PS plates on the second conveyor 36B is covered with the cartridge body 18A held by the holding unit 120.

Figure 11C:
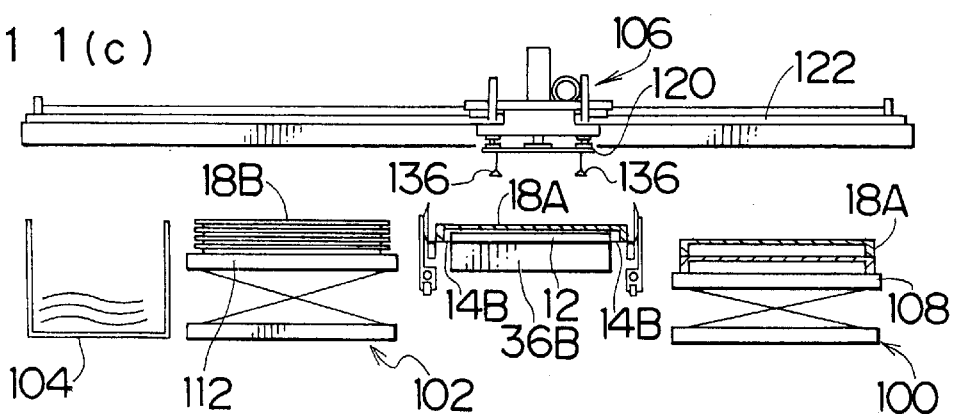

Then, the driving of the holding pads 136 is stopped, thereby releasing the cartridge body 18A, and the holding unit 120 moves up by a predetermined length as shown in FIG. 11(c).

When the bundle 12 is covered with the cartridge body 18A, the second conveyor 36B and the lower conveyor 66B of the inverter 38 move to transfer the bundle 12 to the right as shown in FIG. 12(a). When the bundle 12 reaches the center of the lower conveyor 66B of the inverter 38, the second conveyor 36B and the lower conveyor 66B stop, and the bundle 12 stops.

When the bundle 12 stops on the lower conveyor 66B, the lower conveyor 66B and the upper conveyor 66A of the inverter 38 move closer to one another as shown in FIG. 12(b). Thus, the bundle 12 is held between the upper conveyor 66A and the lower conveyor 66B.

When the bundle 12 is held between the upper conveyor 66A and the lower conveyor 66B, the rotary body 64 of the inverter 38 rotates 180° (see FIGS. 12(c) and 12(d)), and thereby the top and bottom faces of the bundle 12 are reversed.

As shown in FIG. 12(d), the bundle 12 is put into the cartridge body 18A in the state that the top and bottom faces thereof are reversed. After the bundle 12 is reversed, the lower conveyor 66B and the upper conveyor 66A of the inverter 38 move in a direction to separate from one another, thereby releasing the bundle 12.

When the bundle 12 is released, the second conveyor 36B and the upper conveyor 66A (the upper conveyor 66A is placed below the lower conveyor 66B after the rotating 180°) move to transfer the bundle 12 to the left. When the bundle 12 reaches the center of the second conveyor 36B, the second conveyor 36B and the upper conveyor 66A stop, and the bundle 12 stops.

Figure 13A:
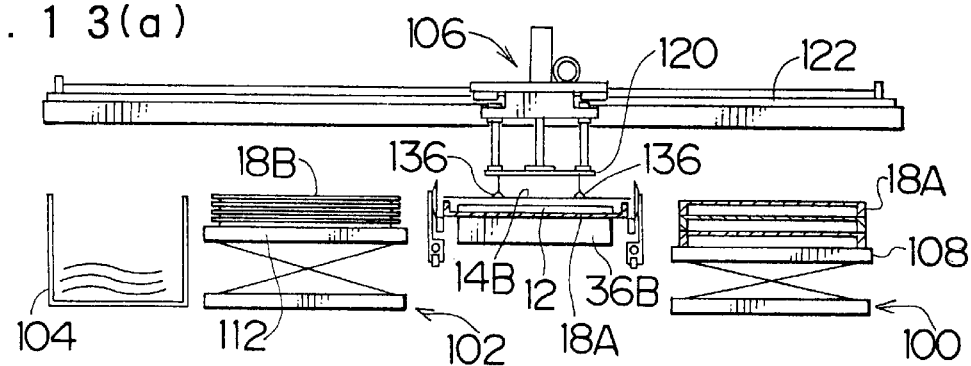
FIGS. 13(a), 13(b), 13(c) and 13(d) are views of assistance in explaining a process of putting a cartridge lid.

When the bundle 12 is positioned at the center of the second conveyor 36B, the lifter 106 is waiting above the bundle 12. Then, the holding unit 120 of the lifter 106 moves down by a predetermined length toward the bundle 12 as shown in FIG. 13(a). Thereby, the holding pads 136 of the holding unit 120 come in contact with the bottom piece 14B of the package 14 which is placed on the top of the bundle 12. Then, the holding pads 136 are driven, and the holding pads 136 hold the bottom piece 14B of the package 14.

Figure 13B:
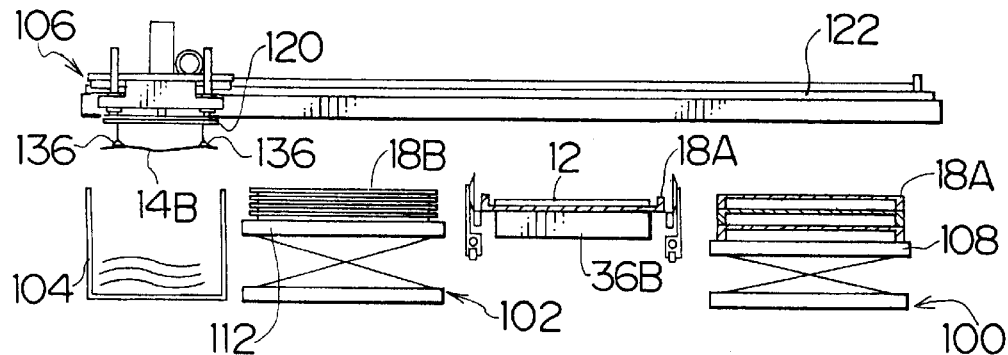

When the holding pads 136 hold the bottom piece 14B of the package 14, the holding unit 120 moves upward while holding the bottom piece 14B. When the holding unit 120 reaches a predetermined height, the lifter 106 moves to the left and stops above the wastebasket 104 as shown in FIG. 13(b).

When the lifter 106 stops above the wastebasket 104, the driving of the holding pads 136 is stopped. Thereby, the bottom piece 14B of the package 14 is released from the holding pads 136 and falls into the wastebasket 104.

Thus, the bottom piece 14B of the package 14 placed on the bundle 12 is separated from the bundle 12, and the separated bottom piece 14B is put into the wastebasket 104.

After the lifter 106 puts the bottom piece 14B of the package 14 into the wastebasket 104, the lifter 106 moves to the right and stops above the lid supply unit 102.

When the lifter 106 stops above the lid supply unit 102, the holding unit 120 moves down by a predetermined length. Thereby, the holding pads 136 of the holding unit 120 come in contact with the cartridge lid 18B stacked on the lid stack table 112 of the lid supply unit 102. Then, the holding pads 136 are driven, and the holding pads 136 hold the cartridge lid 18B.

Figure 13C:
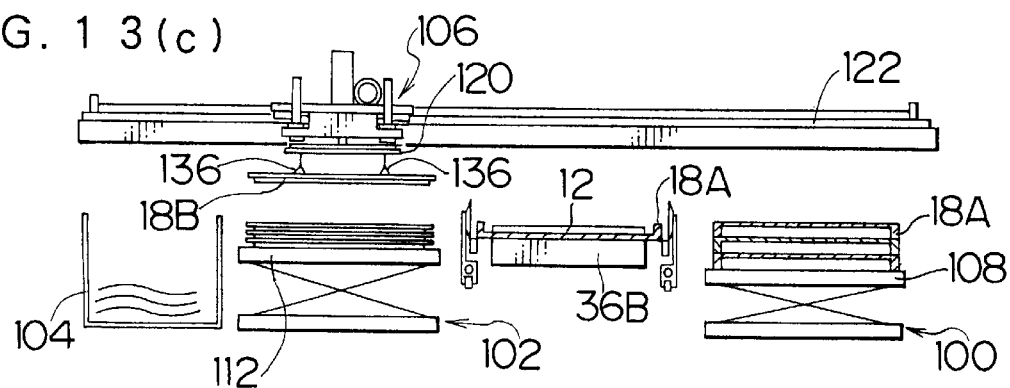

When the holding pads 136 hold the cartridge lid 18B, the holding unit 120 moves upward while holding the cartridge lid 18B as shown in FIG. 13(c). When the holding unit 120 reaches a predetermined height, the lifter 106 moves to the right and stops above the second conveyor 36B.

Figure 13D:
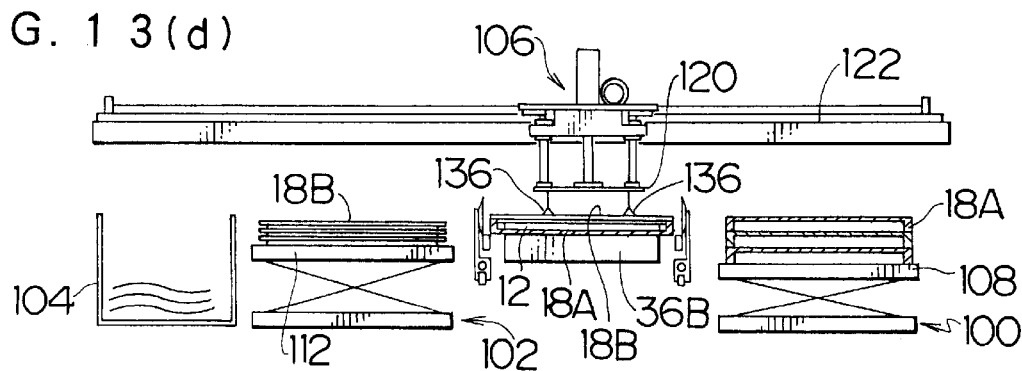

When the lifter 106 stops above the second conveyor 36B, the holding unit 120 moves down by a predetermined length as shown in FIG. 13(d). Thereby, the cartridge body 18A which contains the bundle 12 of the PS plates is covered with the cartridge lid 18B held by the holding unit 120.

Thus, the bundle 12 of the PS plates is housed in the cartridge 18, and the repacking operation is completed. Thereafter, the driving of the holding pads 136 is stopped, thereby releasing the cartridge lid 18B, and the holding unit 120 moves up by a predetermined length.

After the packing, the cartridge 18 is transferred to the center of the first conveyor 36A by the second conveyor 36B and the first conveyor 36A. The transfer head 48 of the transfer robot 34 is waiting above the first conveyor 36A, and the transfer robot 34 stacks the cartridge 18 on the pallet 32 on the collecting base 138.

Figure 14A:
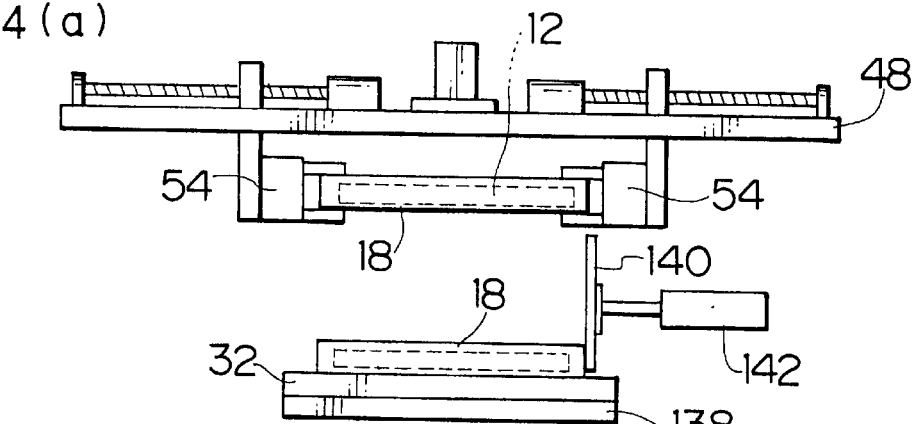
FIGS. 14(a), 14(b), 14(c) and 14(d) are views of assistance in explaining a process of collecting the cartridges.

FIGS. 14(a)–14(d) illustrate the steps for collecting the cartridge 18. The transfer head 48 picks up the cartridge 18 on the first conveyor 36A in the same manner as to pick up the package 14 on the pallet 32, and the transfer head 48 moves up to the delivering position while holding the cartridge 18. Then, the transfer robot 34 rotates 90° clockwise (see FIG. 1) and reaches a predetermined collecting position as shown in FIG. 14(a). The collecting position is set at a predetermined height from the center of the collecting base 138. When the transfer head 48 reaches the collecting position, the center of the transfer head 48 corresponds to that of the collecting base 138.

Figure 14B:
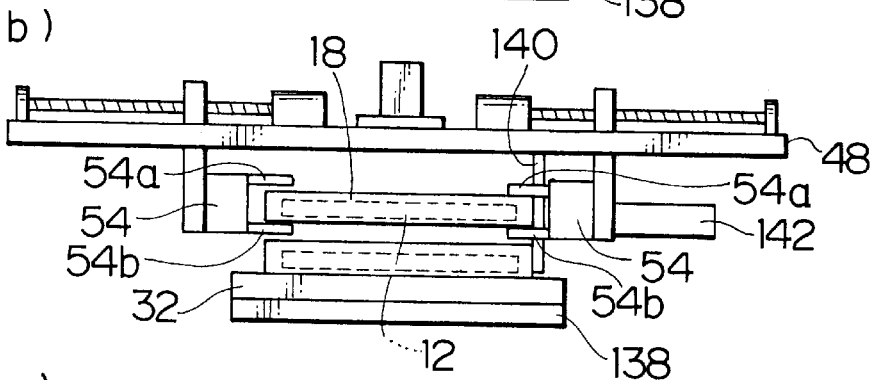

Then, the transfer head 48 moves down by a predetermined length from the collecting position toward the collecting base 138 as shown in FIG. 14(b). Thereby, the cartridge 18 which is held by the transfer head 48 is placed on the pallet 32 on the collecting base 138. The transfer head 48 moves downward so that the side of the cartridge 18 can be contact with the stopper plate 140.

When the cartridge 18 is placed on the pallet 32, the upper jaws 54a of the chucks 54 move up, thereby releasing the cartridge 18.

Figure 14C:
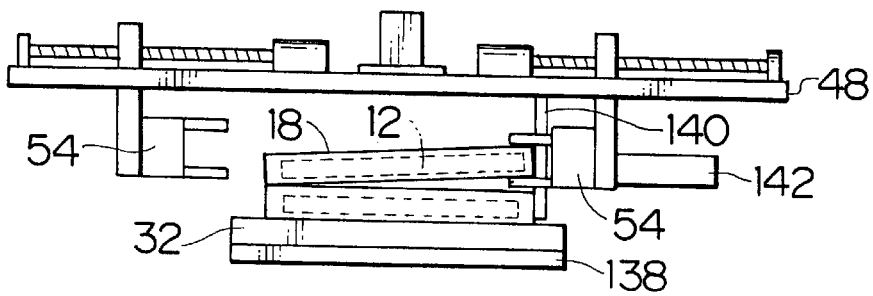
Figure 14D:
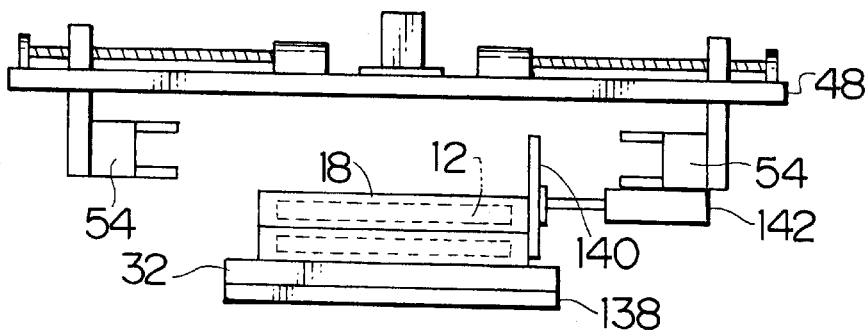

When the cartridge 18 is released, the left chuck 54 moves to the outside (to the left in the drawing) by a predetermined length as shown in FIG. 14(c), and then the right chuck 54 moves to the outside (to the right in the drawing) by a predetermined length as shown in FIG. 14(d). Thereby, the cartridge 18 is placed on the pallet 32, and the operation of collecting the cartridge 18 is completed.

Thus, one repacking process is completed. Thereafter, the transfer head 48 moves up to the collecting position, and rotates 90° clockwise to the position for receiving the package 14. Then, the next repacking process is started by repeating the above-mentioned steps.

Each time one repacking process is completed, the body stack table 108, which is stacked with the cartridge bodies 18A, is moved up by the height of the cartridge body 18A by the lifting mechanism 110. Likewise, each time one repacking process is completed, the lid stack table 112, which is stacked with the cartridge lids 18B, is moved up by the height of the cartridge lid 18B by the lifting mechanism 114.

Each time one repacking process is completed, the moving amount of the transfer head 48 from the package receiving position to a position where the package 14 stacked on the pallet 32 on the supply base 30 is picked up is increased by the thickness of the package 14. Each time one repacking process is completed, the moving amount of the transfer head 48 from the collecting position to a position where the cartridge 18 is released on the pallet 32 on the collecting base 138 is decreased by the thickness of the cartridge 18.

After the PS plates are repacked from all packages 14 which are supplied, the repacking apparatus stops its operation. The user transfers the pallet 32 on the collecting base 138 which is stacked with the cartridges 18 to a photoengraving department or a warehouse by means of a forklift truck, for example.

As stated above, according to the repacking apparatus of the first embodiment, the bundles 12 of the PS plates can be automatically repacked from the packages 14 into the cartridges 18.

In the first embodiment, the repacking apparatus 16 is placed in the darkroom, and the repacking operation is executed in the darkroom. If the repacking apparatus 16 as a whole is covered with a casing to perform the repacking inside the casing, the repacking apparatus 16 can be placed in a lighted room, and the repacking can be performed in the lighted room.

In the first embodiment, the cartridge body 18A, the cartridge lid 18B and the top piece 14A and the bottom piece 14B of the divided package 14 are all transferred by one lifter 106; however, it is possible to respectively provide a lifter for each to transfer them independently of one another.

Figure 15:
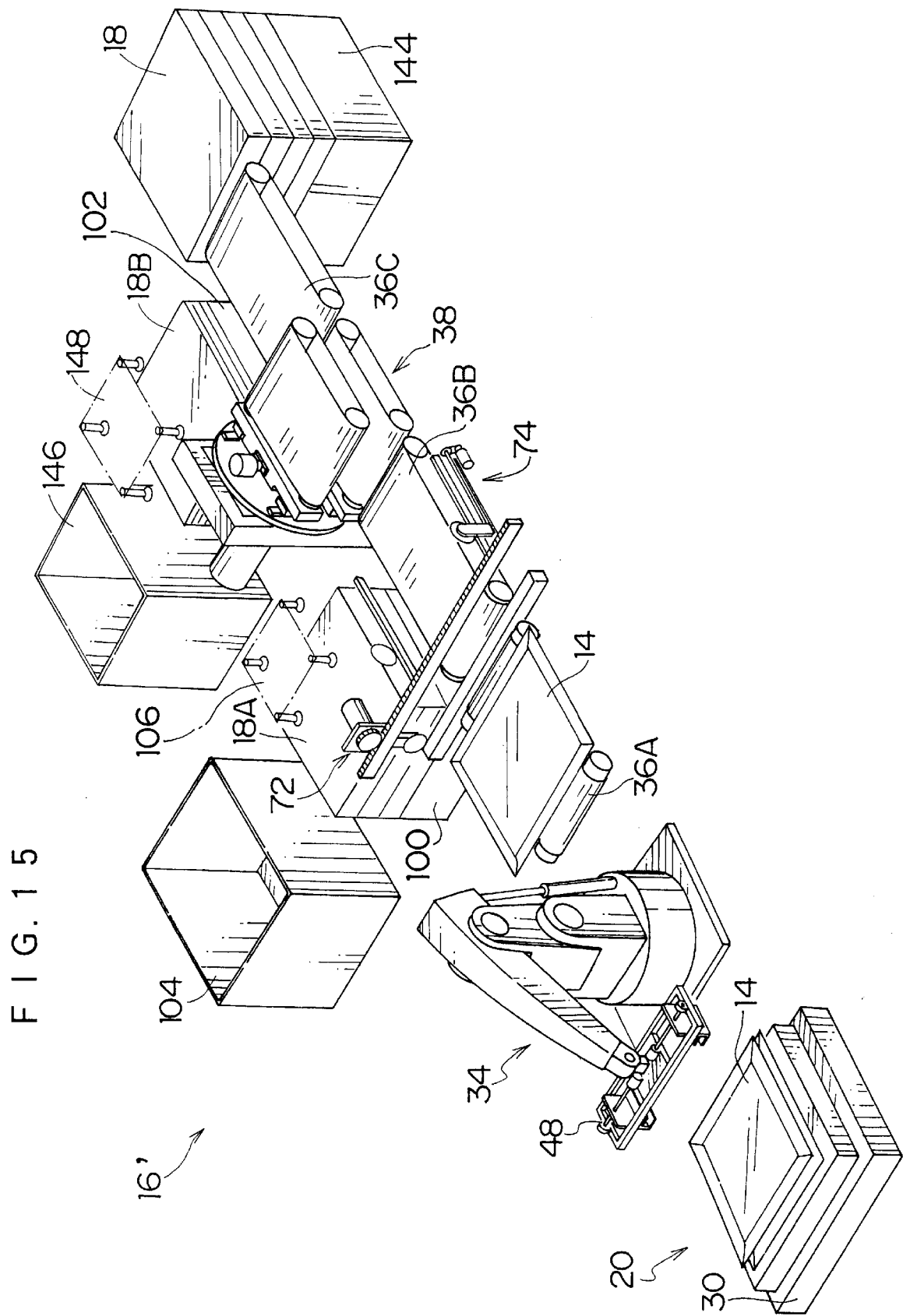
FIG. 15 is a perspective view illustrating the entire construction of another embodiment for the repacking apparatus.

The arrangement of the units in the repacking apparatus 16 is not restricted to this embodiment, and the units may be arranged as shown in FIG. 15 for example.

The repacking apparatus 16' is constructed in such a way that a third conveyor 36C is provided behind the inverter 38, and a collecting base 144 is provided behind the third conveyor 36C. The lid supply unit 102 and a second wastebasket 146 are arranged at the left side of the third conveyor 36C. A second lifter 148 transfers the cartridge lid 18B and the bottom piece 14B of the package 14.

According to the repacking apparatus 16', which is constructed in the above-mentioned manner, the package 14 placed on the supply base 30 is transferred onto the first conveyor 36A by the transfer robot 34. Then, the first conveyor 36A transfers the package 14 onto the second conveyor 36B. The first slitter 72 and the second slitter 74 cut the sides of the package 14 transferred on the second conveyor 36B, so that the package 14 can be opened.

The top piece 14A of the opened package 14 is put into the wastebasket 104 by the lifter 106, and the cartridge body 18A is transferred by the lifter 106 to cover the bundle 12 of the PS plates.

The bundle 12 of the PS plates which is covered with the cartridge body 18A is transferred to the inverter 38, where the bundle 12 is rotated 180° so that the top and bottom faces can be reversed. Then, the bundle 12 is transferred to the third conveyor 36C, and the bottom piece 14B of the package 14 is put into the second wastebasket 146 by the second lifter 148. The cartridge lid 18B is transferred by the second lifter 148 to cover the bundle 12 whose bottom piece 14B has been separated.

After the above-described repacking process, the filled cartridge 18 is transferred onto the collecting base 144 by the third conveyor 36C. The collecting base 144 is constructed in such a way as to move vertically. If one cartridge 18 is stacked, the collecting base 144 moves down by the thickness of the cartridge 18.

A description will be given of the second embodiment for the repacking apparatus according to the present invention. Parts similar to those in the repacking apparatus 16 described in the first embodiment will be denoted by the same reference numerals.

Figure 16:
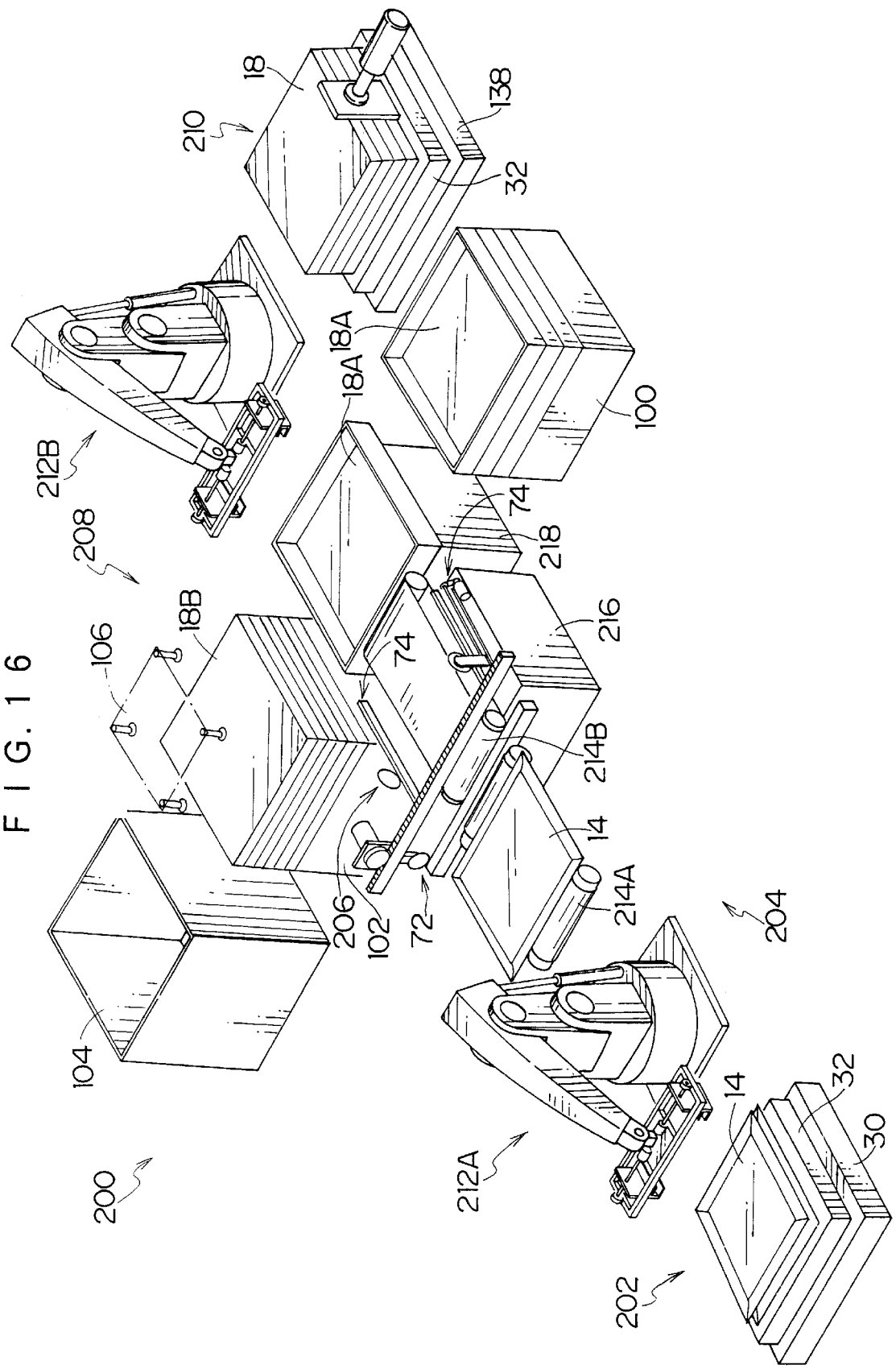
FIG. 16 is a perspective view illustrating the entire construction of the repacking apparatus according to the second embodiment.

FIG. 16 is a perspective view illustrating the entire construction of a repacking apparatus in the second embodiment. As shown in FIG. 16, the repacking apparatus 200 consists of a supply part 202 for supplying the package 14, a transfer part 204 for transferring the package 14 and the cartridge 18, an opening part 206 for opening the package 14, a repacking part 208 for repacking the PS plates, and a collecting part 210 for collecting the filled cartridges 18. The repacking apparatus 200 is placed in a darkroom.

The supply part 202 has the same construction as the supply part 20 of the repacking apparatus 16 described in the first embodiment. That is, the supply part 202 has the supply base 30, and the pallet 32 which is stacked with the packages 14 is placed on the supply base 30.

The transfer part 204 consists of a supply transfer robot 212A, a conveyor 214 and a collecting transfer robot 212B, which are arranged in a straight line.

The supply transfer robot 212A transfers the unopened package 14 from the supply part 202 to the conveyor 214, and the collecting transfer robot 212B transfers the filled cartridge 18 to the collecting part 210. The supply transfer robot 212A and the collecting transfer robot 212B are constructed in the same manner as the transfer robot 34 described in the first embodiment, and a detailed description will be omitted.

The conveyor 214 consists of a first conveyor 214A and a second conveyor 214B as is the case with the conveyor 36 described in the first embodiment. In the second embodiment, however, a vacuum conveyor is used as the second conveyor 214B. The conveyor 36 in the first embodiment is able to transfer the package 14 back and forth, whereas the conveyor 214 in the second embodiment transfers the package 14 in only one direction.

The opening part 206 has the same construction as the opening part 24 in the first embodiment. That is, the opening part 206 consists of the first slitter 72 for cutting the sides of the package 14 which are perpendicular to the transfer direction of the package 14, and the second slitter 74 for cutting the other sides of the package 14 which are parallel with the transfer direction.

The repacking part 208 consists of the body supply unit 100 for supplying the cartridge body 18A, the lid supply unit 102 for supplying the cartridge lid 18B, the first wastebasket 104 into which the top piece 14A of the package 14 separated by the opening part 206 is put, the lifter 106 for transferring the cartridge 18A, etc., the second wastebasket 216 into which the bottom piece 14B of the package 14 separated by the opening part 206 is put, and a body mount table 218, on which the cartridge body 18A is placed. The above-mentioned units are arranged in a straight line which is perpendicular to the transfer direction of the package 14.

Figure 17:
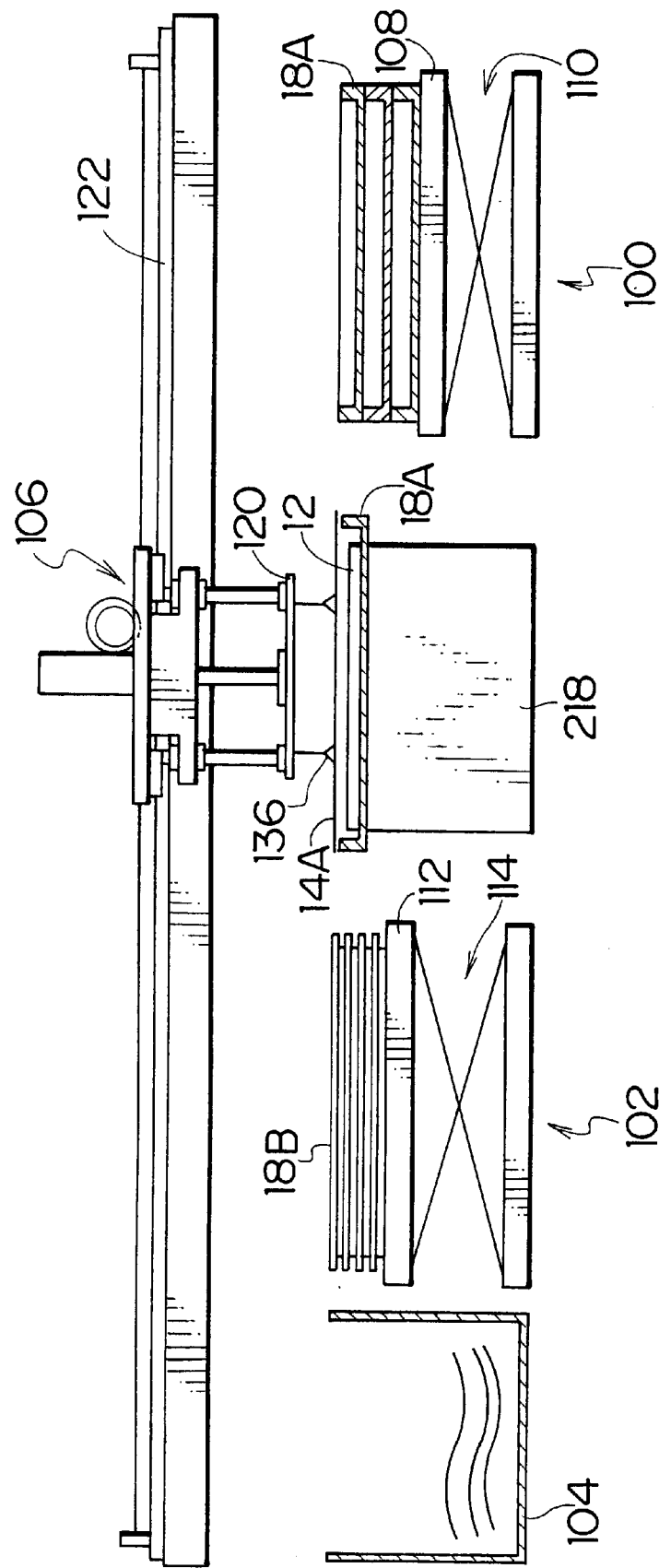
FIG. 17 is a front view illustrating the construction of the repacking part.

The body supply unit 100, the lid supply unit 102, the first wastebasket 104 and the lifter 106 in FIG. 17 are constructed in the same manner as them of the repacking part 26 described in the first embodiment, and a detailed explanation will be omitted.

Figure 18:
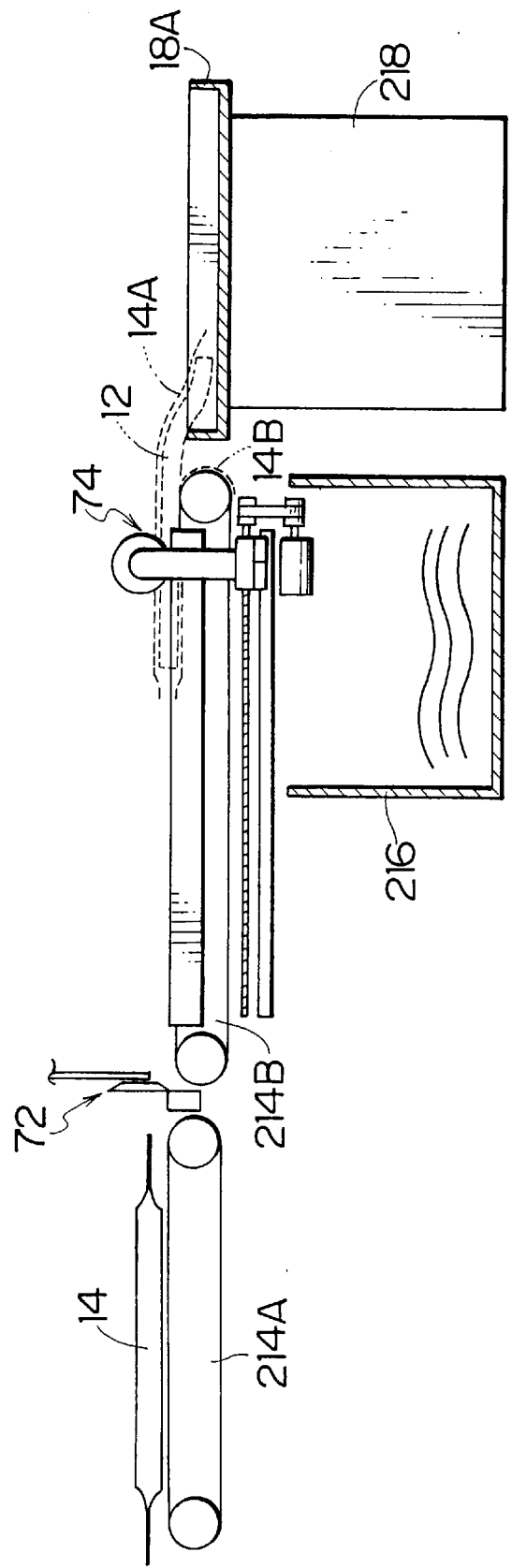
FIG. 18 is a side view illustrating the construction of the repacking part.

As shown in FIGS. 16 and 18, the second wastebasket 216 is provided below the second conveyor 214B. Then, the bottom piece 14B of the package 14, which has been separated by the opening part 206, is put into the second wastebasket 216.

The body mount table 218 is provided at the end of the second conveyor 214B. The cartridge body 18A stacked on the body supply unit 100 is transferred onto the body mount table 218 by the lifter 106. The cartridge body 18A which is placed on the body mount table 218 is substantially flush with the second conveyor 214B.

The collecting part 210 is constructed in the same manner as the collecting part 28 of the repacking unit 16 described in the first embodiment. That is, the collecting part 210 has the collecting base 138, on which the pallet 32 to be stacked with the filled cartridges 18 is placed.

A detailed description will be given of the operation of the second embodiment for the repacking apparatus according to the present invention.

As is the case with the first embodiment, the user of the photoengraving machine who has been supplied with the PS plates packed in the packages 14 from the manufacturer of printing materials, stacks a predetermine number of the packages 14 on the pallet 32. Then, the packages 14 on the pallet 32 are transferred to the repacking apparatus 200, and they are placed on the supply base 30 of the supply part 202.

At the same time, the user divides the cartridges 18 into the cartridge bodies 18A and the cartridge lids 18B. As shown in FIG. 16, the cartridge bodies 18A are stacked on the body stack table 108 of the body supply unit 100, and the cartridge lids 18B are stacked on the lid stack table 112 of the lid supply unit 102. In the second embodiment, the cartridge bodies 18A are stacked on the body stack table 108 so that the opening of the cartridge bodies 18A can face up, though the cartridge bodies 18A are placed upside down in the first embodiment.

The repacking apparatus is activated after the above-described preparations are completed.

Figure 19A:
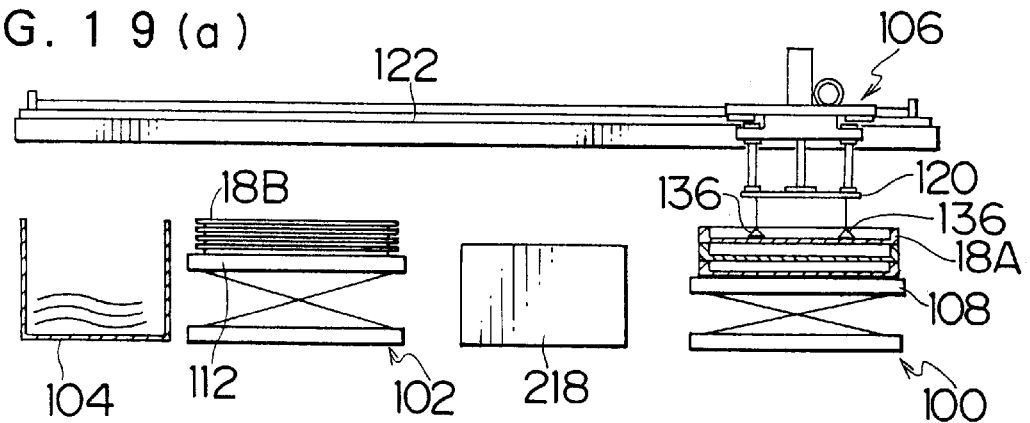
FIGS. 19(a), 19(b) and 19(c) are views of assistance in explaining a step of transferring the cartridge body onto a body mount base.
Figure 19B:
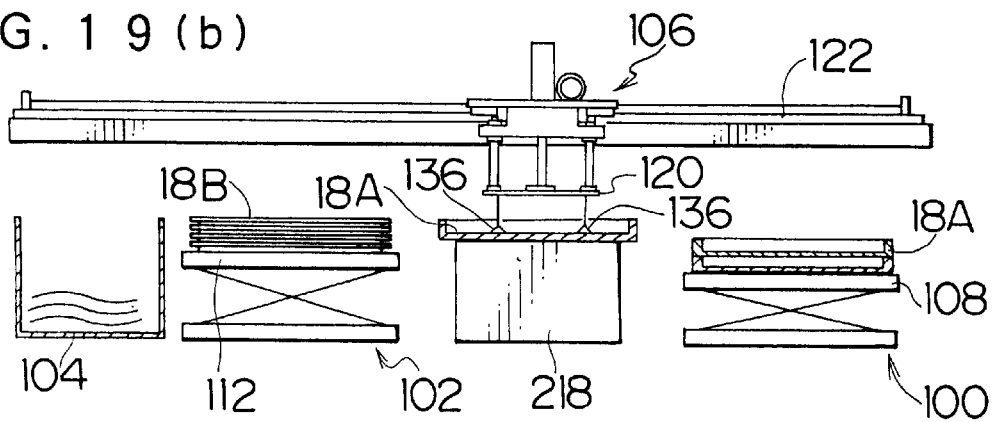
Figure 19C:
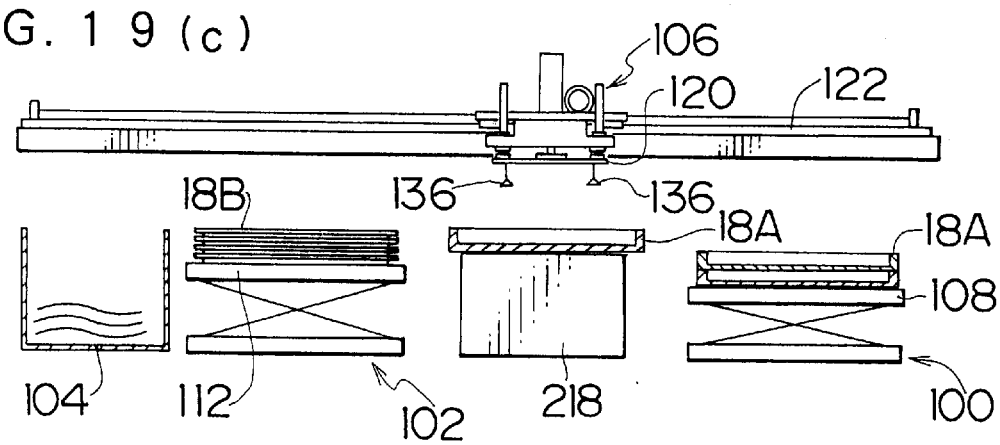

First, the lifter 106 transfers the cartridge body 18A to the body mount table 218 from the body supply unit 100. FIGS. 19(a)–19(c) illustrate a sequence of steps for transferring the cartridge body 18A.

As shown in FIG. 19(a), the lifter 106 moves to above the body supply unit 100. Then, the holding unit 120 of the lifter 106 moves down by a predetermined length. Thereby, the holding pads 136 of the holding unit 120 come in contact with the cartridge body 18A stacked on the body stack table 108 of the body supply unit 100. Then, the holding pads 136 are driven, and the holding pads 136 hold the cartridge body 18A.

When the holding pads 136 hold the cartridge body 18A, the holding unit 120 moves upward while holding the cartridge body 18A. When the holding unit 120 reaches a predetermined height, the lifter 106 moves to the left and stops above the body mount table 218.

When the lifter 106 stops above the body mount table 218, the holding unit 120 moves down by a predetermined length as shown in FIG. 19(b). Thereby, the cartridge body 18A held by the holding unit 120 is placed on the body mount table 218. Then, the driving of the holding pads 136 is stopped, thereby releasing the cartridge body 18A, and the holding unit 120 moves up by a predetermined length as shown in FIG. 19(c).

As stated above, the cartridge body 18A is transferred from the body supply unit 100 onto the body mount table 218.

Then, the transfer robot 212A transfers the package 14 on the top of the packages 14 stacked on the supply base 30 to the first conveyor 214A. In this case, the package 14 is transferred in the same manner as in the first embodiment, and a detailed explanation will be omitted.

The package 14 placed on the first conveyor 214A is transferred to the opening part 206, and then the package 14 is opened. In this case, the package 14 is opened in the same manner as in the first embodiment, and a detailed explanation will be omitted.

Then, the bundle 12 of the PS plates, which are packed in the package 14, is repacked into the cartridge 18 at the repacking part 26. FIGS. 20(a)–21(d) describe a sequence of steps for repacking the bundle 12 of the PS plates from the package 14 into the cartridge 18.

Figure 20A:
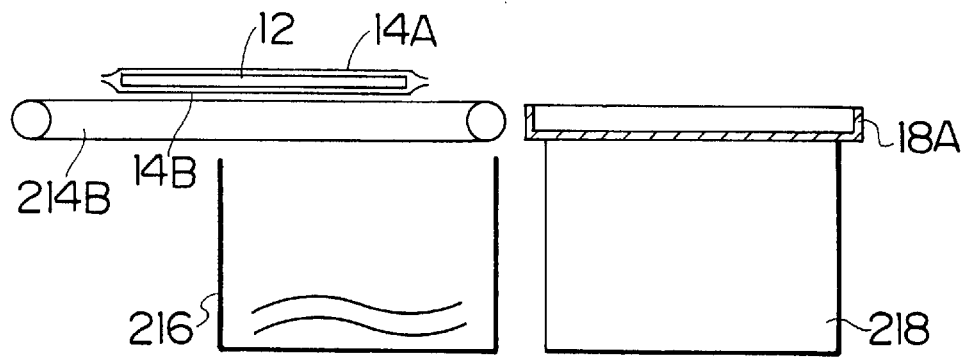
FIGS. 20(a), 20(b) and 20(c) are views of assistance in explaining a step of separating a bottom piece of the package.
Figure 20B:
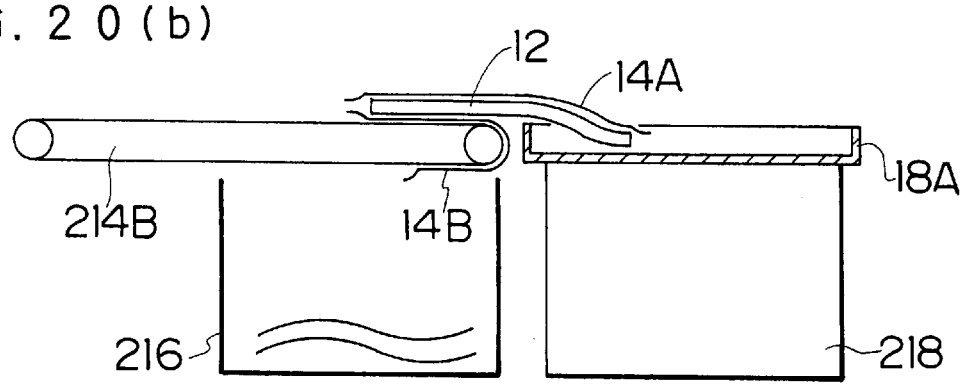

The repacking process will be explained with reference to FIGS. 20(a)–21(d). As shown in FIG. 20(a), after the package 14 is opened, the second conveyor 214B is driven, and thereby the bundle 12 is transferred to the right. As shown in FIG. 20(b), the cartridge body 18A which is placed on the body mount table 218 is positioned at the end of the second conveyor 214B. Thus, the bundle 12 is transferred to the right so as to be housed in the cartridge body 18A.

Figure 20C:
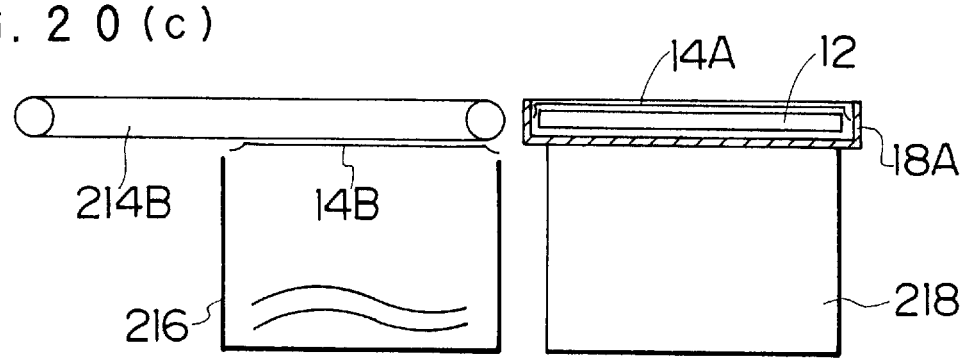

On the other hand, the second conveyor 214B is the vacuum conveyor, which transfers the bundle 12 in a state of holding the bottom piece 14B of the package 14 positioned at the bottom of the bundle 12. For this reason, the bottom piece 14B of the package 14 moves in association with the second conveyor 214B, and thus, the bottom piece 14B is separated from the bundle 12 when the bundle 12 of the PS plates is housed in the cartridge body 18A as shown in FIG. 20(c). Thus, only the bundle 12 and the top piece 14A of the package 14 are housed in the cartridge body 18A.

After the bundle 12 is housed in the cartridge body 18A, the driving of the second conveyor 214B is stopped. Thus, the bottom piece 14B of the package 14, which has moved in association with the second conveyor 214B, is released from the second conveyor 214B and falls into the second wastebasket 216.

As stated above, the bottom piece 14B of the package 14 is separated from the bundle 12, and the bundle 12 whose bottom piece 14B of the package 14 has been separated, is housed in the cartridge body 18A.

Figure 21A:
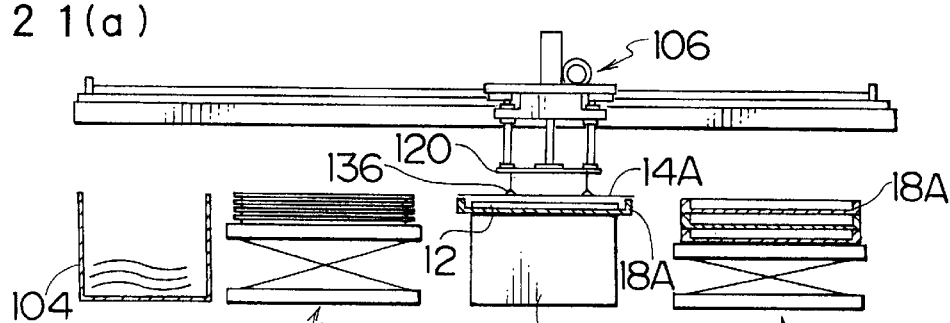
FIGS. 21(a), 21(b), 21(c) and 21(d) are views of assistance in explaining a step of putting the cartridge lid.
Figure 21B:
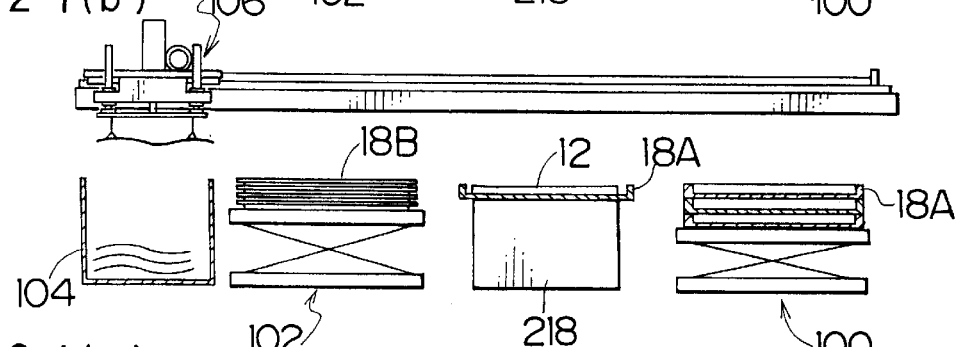

After the bundle 12 of the PS plates is housed in the cartridge body 18A, the holding unit 120 of the lifter 106 moves down by a predetermined length toward the bundle 12 as shown in FIG. 21(a). Thus, the holding pads 136 of the holding unit 120 come in contact with the top piece 14A of the package 14 placed on the top of the bundle 12. Then, the holding pads 136 are driven, and they hold the bottom piece 14A of the package 14. When the holding pads 136 hold the top piece 14A of the package 14, the holding unit 120 moves upward. When the holding unit 120 reaches a predetermined height, the lifter 106 moves to the left and stops above the first wastebasket 104 as shown in FIG. 21(b). When the lifter 106 stops above the wastebasket 104, the driving of the holding pads 136 are stopped. Thereby, the top piece 14A of the package 14 is released from the holding pads 136 and falls into the first wastebasket 104.

As stated above, the top piece 14A of the package 14 placed on the bundle 12 is separated from the bundle 12, and the separated top piece 14A is put into the first wastebasket 104.

Then, the lifter 106, which has put the top piece 14A of the package 14 into the wastebasket 104, moves to the right and stops above the lid supply unit 102. When the lifter 106 stops above the lid supply unit 102, the holding unit 120 of the lifter 106 moves down by a predetermined length.

Figure 21C:
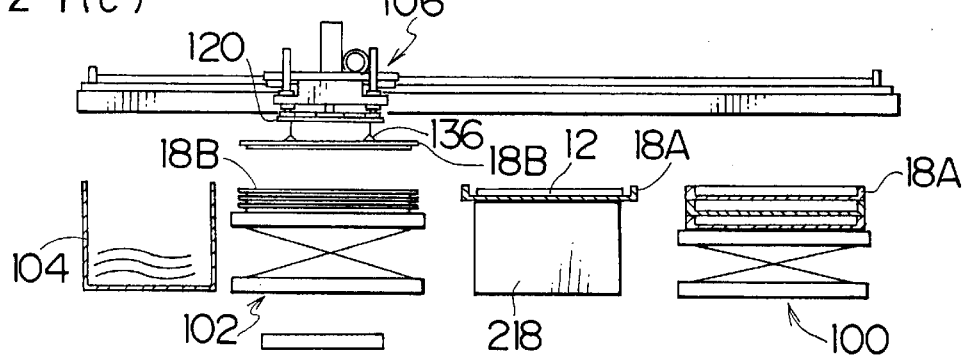
Figure 21D:
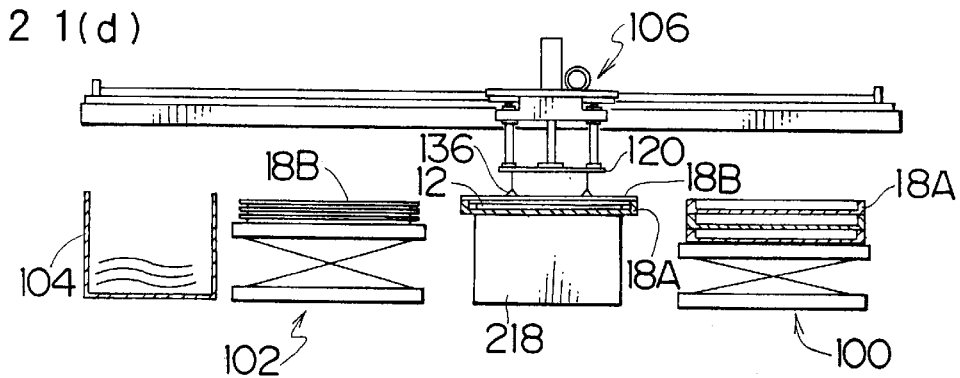

Thereby, the holding pads 136 of the holding unit 120 come in contact with the cartridge lid 18B placed on the lid stack table 112 of the lid supply unit 102. Then, the holding pads 136 are driven, and they hold the cartridge lid 18B. When the holding pads 136 hold the cartridge lid 18B, the holding unit 120 moves upward as shown in FIG. 21(c). When the holding unit 120 reaches a predetermined height, the lifter 106 moves to the right and stops above the body mount table 218. When the lifter 106 stops above the body mount table 218, the holding unit 120 moves down by a predetermined length as shown in FIG. 21(d). Thereby, the cartridge lid 18B held by the holding unit 120 is put on the cartridge body 18A which houses the bundle 12 of the PS plates.

Thus, the bundle 12 of the PS plates is housed in the cartridge 18, and the repacking process is completed. Thereafter, the driving of the holding pads 136 is stopped, and the holding unit 120 moves up by a predetermined length.

After the repacking process, the transfer robot 212B places the filled cartridge 18 on the pallet 32 on the collecting base 138. The cartridge 18 is placed on the pallet 32 in the same manner as in the first embodiment, and a detailed explanation will be omitted.

One repacking process is completed by the above-described sequence of steps. Thereafter, the above-described sequence of steps is repeated.

Each time one repacking process is completed, the body stack table 108, which is stacked with the cartridge bodies 18A, is moved up by the height of the cartridge body 18A by the lifting mechanism 110. Likewise, each time one repacking process is completed, the lid stack table 112, which is stacked with the cartridge lids 18B, is moved up by the height of the cartridge lid 18B by the lifting mechanism 114.

Each time one repacking process is completed, the moving amount of the transfer robot 212A from the package receiving position to a position where the package 14 stacked on the pallet 32 on the supply base 30 is picked up is increased by the thickness of the package 14. Each time one repacking process is completed, the moving amount of the transfer robot 212B from the collecting position to a position where the cartridge 18 is released on the pallet 32 on the collecting base 138 is decreased by the thickness of the cartridge 18.

After the PS plates are repacked from all packages 14 which are supplied, the repacking apparatus stops its operation. The user transfers the pallet 32 on the collecting base 138 which is stacked with the cartridges 18 to a photoengraving department or a warehouse by means of a forklift truck, for example.

As stated above, according to the repacking apparatus 200 of the second embodiment, the bundles 12 of the PS plates can be automatically repacked from the packages 14 into the cartridges 18.

In the second embodiment, the repacking apparatus 200 is placed in the darkroom, and the repacking operation is executed in the darkroom. If the repacking apparatus 200 as a whole is covered with a casing to perform the repacking inside the casing, the repacking apparatus 200 can be placed in a lighted room, and the repacking can be performed in the lighted room.

Moreover, in the second embodiment, the cartridge lid 18B and the top piece 14A of the package 14 are transferred by one lifter 106, but two lifters may be respectively provided to transfer them.

In the first and second embodiments, the repacking is performed on an assembly line, but a stage may be provided for repacking so that the repacking can be intensively performed at the stage.

A description will hereunder be given of the third embodiment for the repacking apparatus of the present invention.

FIG. 22 is a perspective view illustrating the entire construction of a repacking apparatus 300 according to the third embodiment. As shown in FIG. 22, the repacking apparatus 300 consists of a supply part 320 for supplying the package 14, an opening part 322 for opening a side of a package 14, a take-out part for taking out the bundle 12 of the PS plates from the opened package 14, a repacking part 326 for repacking the bundle 12 taken out from the package 14 into the cartridge 18, and a collecting part 328 for collecting the filled cartridges 18. The repacking apparatus 300 is placed in a darkroom.

An explanation will be given of the construction of the supply part 320. As stated above, the supply part 320 supplies the package 14, and it consists of a package supply base 330, a first transfer robot 332 and a first conveyor 334.

A pallet 336 which is stacked with the packages 14 is placed on the package supply base 330.

The first transfer robot 332 transfers the package 14 which is stacked on the package supply base 330, to the first conveyor 334. The first conveyor 334 is comprises mainly of a base 338, a rotary frame 340, a column 342, a first arm 344, a second arm 346 and a transfer head 348. The rotary frame 340 is rotatably supported on the base 338, and is rotated by a motor (not shown). The column 342 erects on the rotary frame 340. The first arm 344 is connected to the end of the column 342 by a shaft 345, and it is driven by a hydraulic cylinder (not shown) so as to rotate around the shaft 345. The second arm 346 is connected to the end of the first arm 344 by a shaft 347, and it is driven by a hydraulic cylinder 350 so as to rotate around the shaft 347. The transfer head 348 is connected to the end of the second arm 346 by a shaft 349, and it is driven by a hydraulic cylinder (not shown) so as to rotate around the shaft 349.

According to the above-described construction, the transfer head 348 of the first transfer robot 332 is able to freely rotate and move upward, downward, forward and backward. The transfer head 348 holds the package 14 and transfers it to the first conveyor 334.

Figure 23:
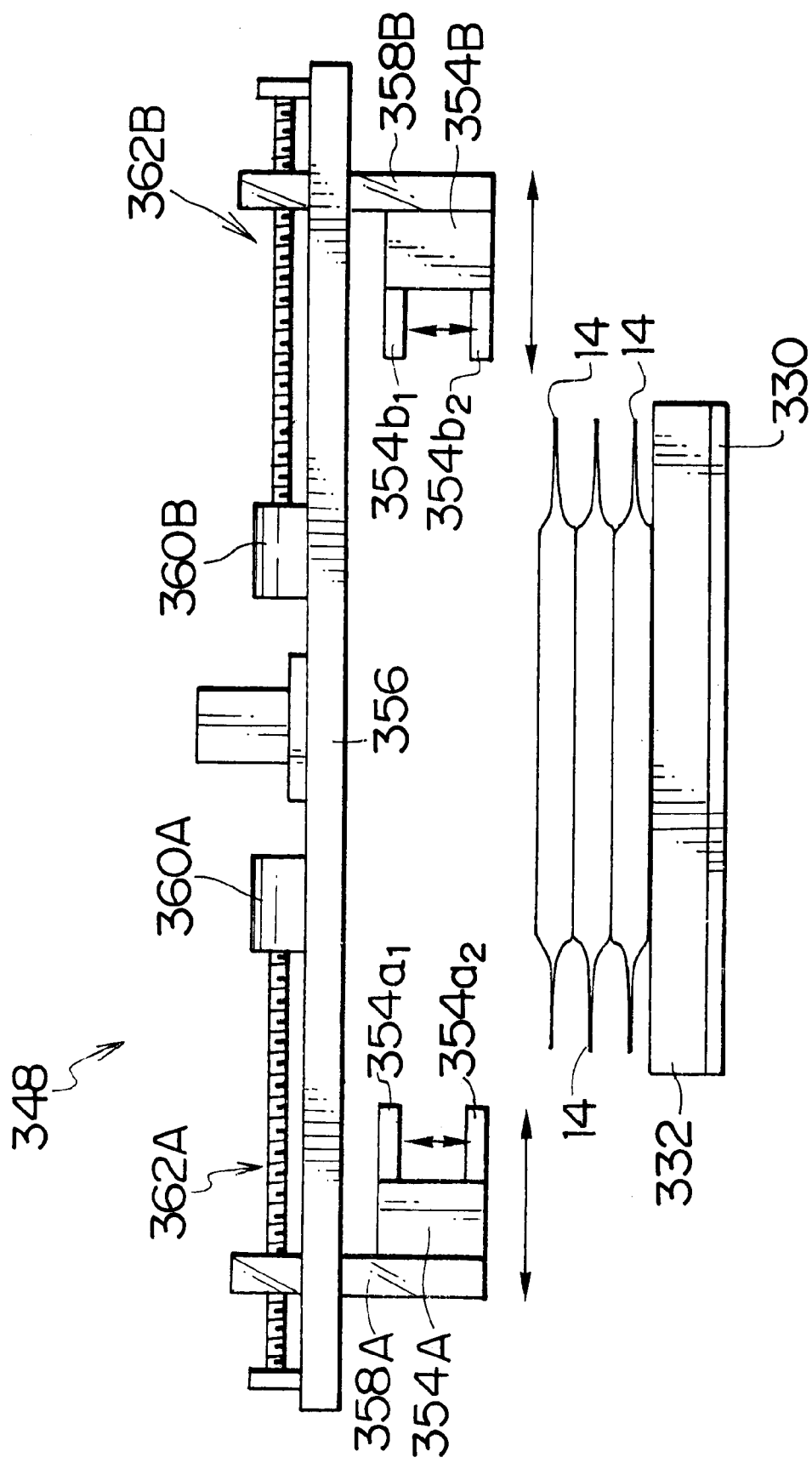
FIG. 23 is a front view illustrating the construction of a transfer head in a first transfer robot.

FIG. 23 illustrates the construction of the transfer head 348. As shown in FIG. 23, the transfer head 348 has chucks 354A, 354B at both ends thereof. The chuck 354A has a pair of jaws $354a_1$, $354a_2$, which pinch a side of the package 14, so that the transfer head 348 can hold the package 14. The jaws $354a_1$, $354a_2$ pinch the side of the package 14 in such a manner that the upper jaw $354a_1$ is driven by a driving means (not shown) to move vertically. The other chuck 354B is constructed in the same manner. The pair of chucks 354A, 354B are respectively attached on sliders 358A, 358B, which are slidably supported by a LM guide (not shown) provided at a body frame 356 of the transfer head 348. The sliders 358A, 358B are moved by feed screw mechanisms 362A, 362B, which are driven by motors 360A, 360B. Thus, a distance between the chucks 354A, 354B can be changed.

The first conveyor 334 transfers the package 14 which has been transferred from the package supply base 330 by the first transfer robot 332, to the opening part 322.

Figure 24:
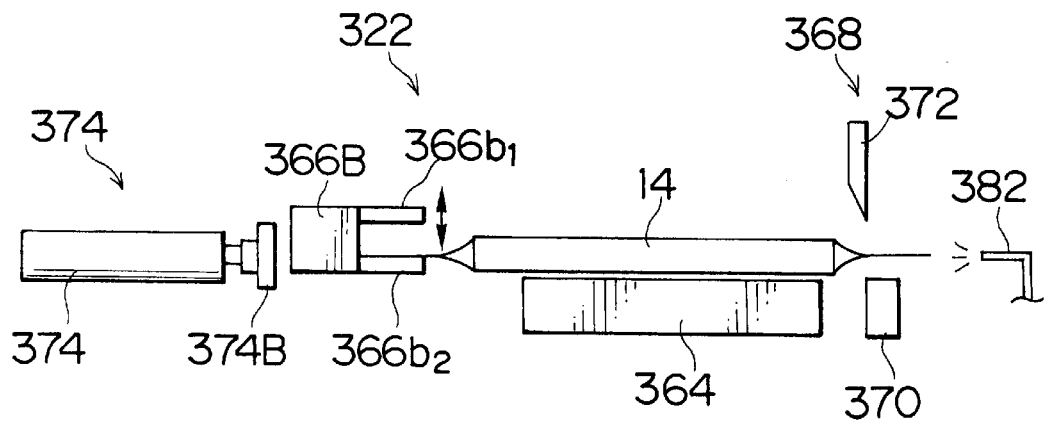
FIG. 24 is a side view illustrating the construction of the opening part.
Figure 25:
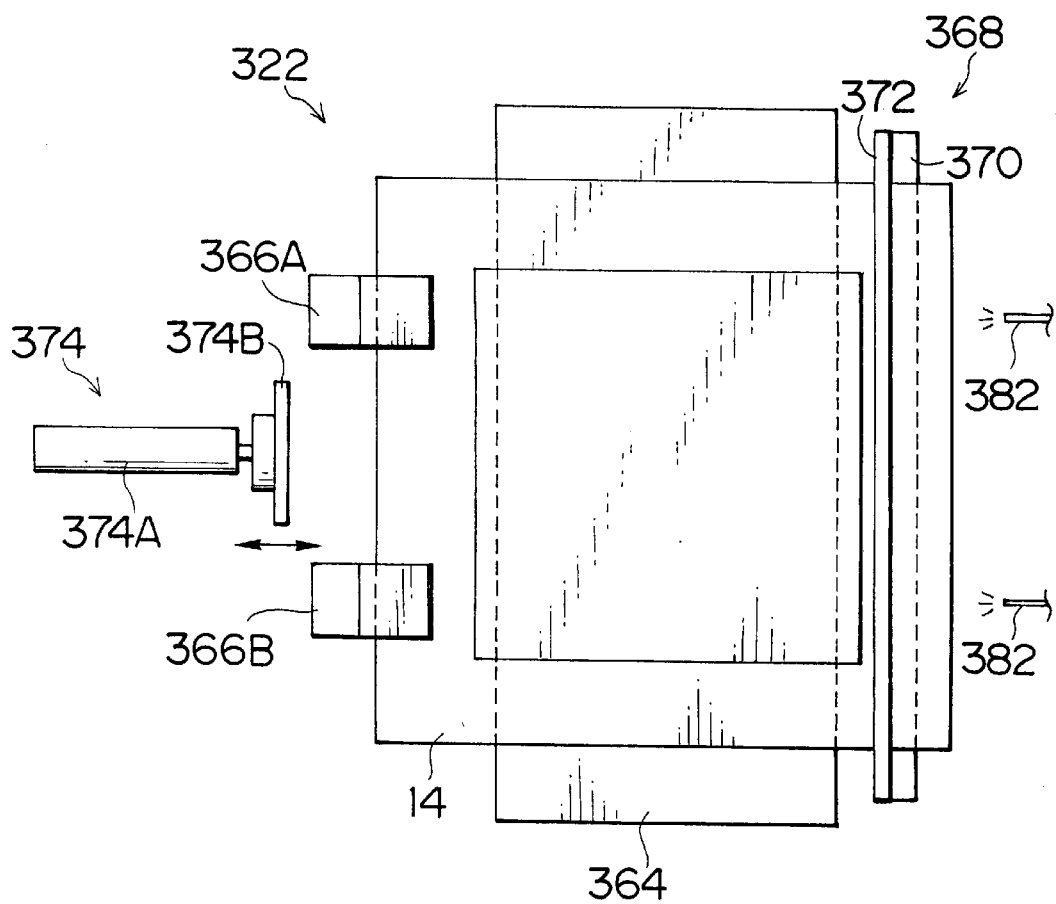
FIG. 25 is a plane view illustrating the construction of the opening part.

A description will be given of the construction of the opening part 322 for opening the package 14. The opening part 322 consists of a second conveyor 364, a pair of chucks 366A, 366B, and a cutting unit 368. The first conveyor 334 and the second conveyor 364 are arranged in series, and the second conveyor 364 transfers the package 14 from the first conveyor 334 to a predetermined cutting position. The pair of chucks 366A, 366B hold the package 14 when the later-described cutting unit 368 cuts a side of the package 14. As shown in FIGS. 24 and 25, the pair of chucks 366A, 366B are arranged close to the left side of the second conveyor 364. The pair of chucks 366A, 366B hold a side of the package 14, which has been transferred on the second conveyor 364, thereby holding the package 14. The chucks 366A, 366B have the same construction as the chucks 354A, 354B of the previously-described transfer head 348, and thus an explanation of them will be omitted.

As shown in FIGS. 24 and 25, the cutting unit 368 is arranged close to the right side of the second conveyor 364, and it is composed of a lower edge 370 and an upper edge 372. The lower edge 370 is arranged along the second conveyor 364, and the upper edge 372 is arranged above the lower edge 370. The upper edge 372 can be moved up and down by a driving means (not shown.) The upper edge 372 moves down toward the lower edge 370, thereby cutting one side of the package 14 between the two edges.

An explanation will be given of the construction of the take-out part 324. The take-out part 324 takes out the bundle 12 of the PS plates from the package 14 which has been opened by the opening part 322. As shown in FIG. 22, the take-out part 324 consists of a push-out unit 374, a third conveyor 376, a second transfer robot 378, and a wastebasket 380.

The push-out unit 374 pushes a side of the package 14 which is opposite to the opened side of the package 14, which was opened by the opening part 322, thereby protruding a part of the bundle 12 in the package 14 from the opened side. As shown in FIGS. 24 and 25, the push-out unit 374 is arranged substantially halfway between the chucks 366A and 366B, which are provided in proximity to the side of the second conveyor 364, and the push-out unit 374 is composed of a hydraulic cylinder 374A and a push plate 374B attached to the end of a rod of the hydraulic cylinder 374A. In order to protrude the bundle 12 from the package 14, the rod of the hydraulic cylinder 374A is extended while the pair of chucks 366A, 366B hold the side of the package 14, and the push plate 374B, which is provided at the end of the rod, pushes the side of the package 14. Thereby, the bundle 12 in the package 14 is thrust by the push plate 374B, and one side of the bundle 12 of the PS plates protrudes from the opened side of the package 14.

In order to smoothly thrust the bundle 12, the compressed air is jetted toward the opened side of the opened package 14. A pair of nozzles 382 are arranged close to the right side of the second conveyor 364, and they jet the compressed air toward the opened side of the package 14.

The third conveyor 376 and the second conveyor 364 are arranged in series, and the third conveyor 376 transfers the package 14 from the second conveyor 364 to a predetermined take-out position. An air jetting unit 376A is built in the third conveyor 376, and the compressed air is jetted from the air jetting unit 376A through a number of blowout holes 376b which are punched in a transfer belt 376B. The compressed air jetted through the blowout holes 376b helps to smoothly take-out the bundle 12 from the package 14. As described later, the jetted air makes the package 14 hover above the transfer belt 376B so as to reduce the friction between the package 14 and the transfer belt 376B.

Figure 26:
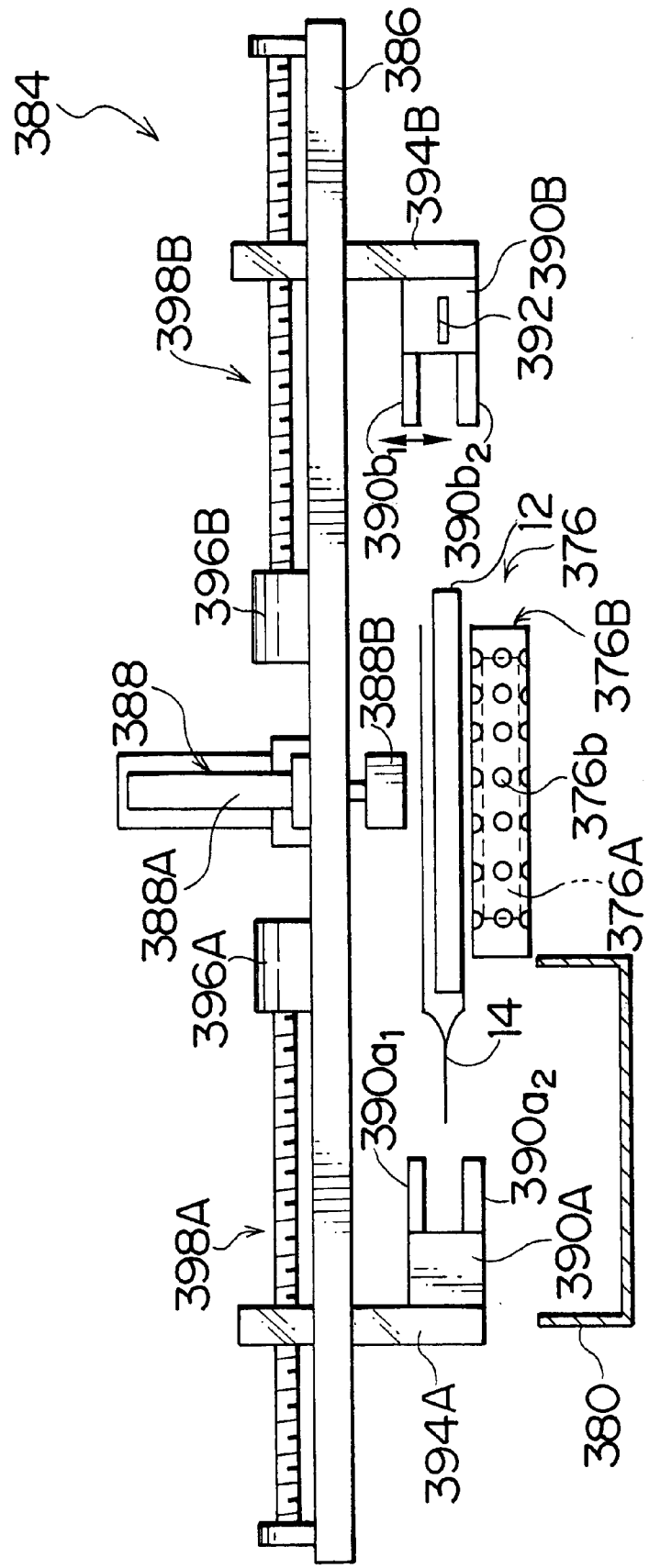
FIG. 26 is a side view illustrating the construction of the transfer head of a taking-out part and a second transfer robot.

The second transfer robot 378 takes out the bundle 12 from the package 14, and transfers the taken-out bundle 12 to a forth conveyor 400. The second transfer robot 378 is constructed in substantially the same manner as the above-mentioned first transfer robot 332, and a transfer head 384 of the second transfer robot 378 is able to freely rotate and move upward, downward, forward and backward. The construction of the transfer head 384, however, is a little different from the transfer head 348 of the first transfer robot 332. That is, as shown in FIG. 26, a push means 388 is provided at a body frame 386 of the transfer head 384, and air nozzles 392 are provided at a chuck 390B.

The push means 388 is arranged substantially at the center of the body frame 386, and it consists of a hydraulic cylinder 388A and a pushing piece 388B provided at the end of the rod of the hydraulic cylinder 388A. The rod of the hydraulic cylinder 388A vertically expands and retracts in the downward direction, and thereby, the pushing piece 388B vertically moves forward and backward with respect to the body frame 386.

The air nozzles 392 are provided at both sides (only one side is shown) of the chuck 390B (at the right side in the drawing), and they jet the compressed air toward the opened package 14 as is the case with the air nozzles 382 provided close to the side of the second conveyor 364. The bundle 12 can be smoothly taken out by jetting the compressed air.

The chucks 390A, 390B, and mechanisms for moving the chucks 390A, 390B which include sliders 394A, 394B, motors 396A, 396B, and feed screw mechanisms 398A, 398B are constructed in the same manner as those in the transfer head 348 of the first transfer robot 392.

As stated previously, the second transfer robot 378 takes out the bundle 12 of the PS plates from the package 14, and transfers the taken-out bundle 12 to the forth conveyor 400, which will be described later. A method of taking out the bundle 12 will be described later in detail.

Figure 27:
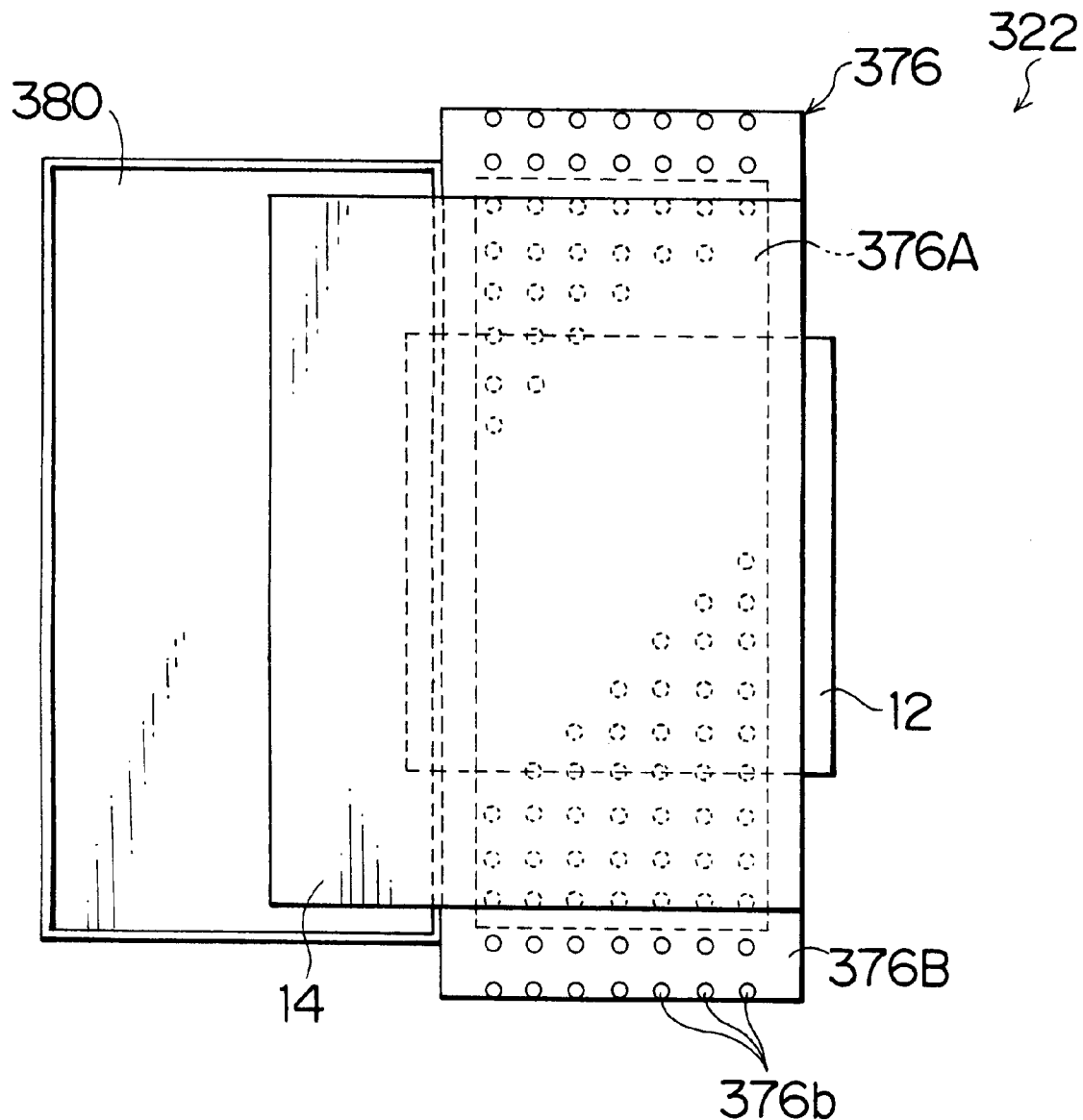
FIG. 27 is a plane view illustrating the construction of the taking-out part.

The package 14 from which the bundle 12 has been taken out is put into the wastebasket 380, and as shown in FIGS. 26 and 27, the wastebasket 380 is arranged on the left of the third conveyor 376.

An explanation will be given of the construction of the repacking part 326. The repacking part 326 repacks the bundle 12 which has been taken out from the package 14 by the take-out part 324, into a cartridge 18. As shown in FIG. 22, the repacking part 326 consists of the fourth conveyor 400, a fifth conveyor 402, a sixth conveyor 404, a body supply base 406, a lid supply base 408, and a third transfer robot 410.

The fourth conveyor 400 transfers the cartridge body 18A from the later-described fifth conveyor 402 to a predetermined housing position for housing the bundle 12 which has been taken out from the package 14 at the take-out part and has been transferred by the second transfer robot 378, into the cartridge body 18A. After repacking, the cartridge body 18A is transferred again to the fifth conveyor 402. As shown in FIG. 22, the transfer direction of the fourth conveyor 400 is perpendicular to that of the third conveyor 376.

The fifth conveyor 402 transfers the cartridge body 18A which has been transferred from the later-described third transfer robot 410, to the fourth conveyor 400. And the fifth conveyor 402 transfers the cartridge body 18A which has been filled with the bundle 12 and has been transferred from the fourth conveyor 400, to a predetermined lid closing position. Then, as described later, the cartridge lid 18B is put on the cartridge body 18A at the lid closing position, and the cartridge 18 is transferred to the sixth conveyor 404.

As shown in FIG. 22, the transfer direction of the fourth conveyor 400 is perpendicular to that of the sixth conveyor 404. Thus, the fifth conveyor 402 must turn the transfer direction of the cartridge 18 by 90° between the fourth conveyor 400 and the sixth conveyor 404. Accordingly, the fifth conveyor 402 is constructed in a manner described below.

Figure 28:
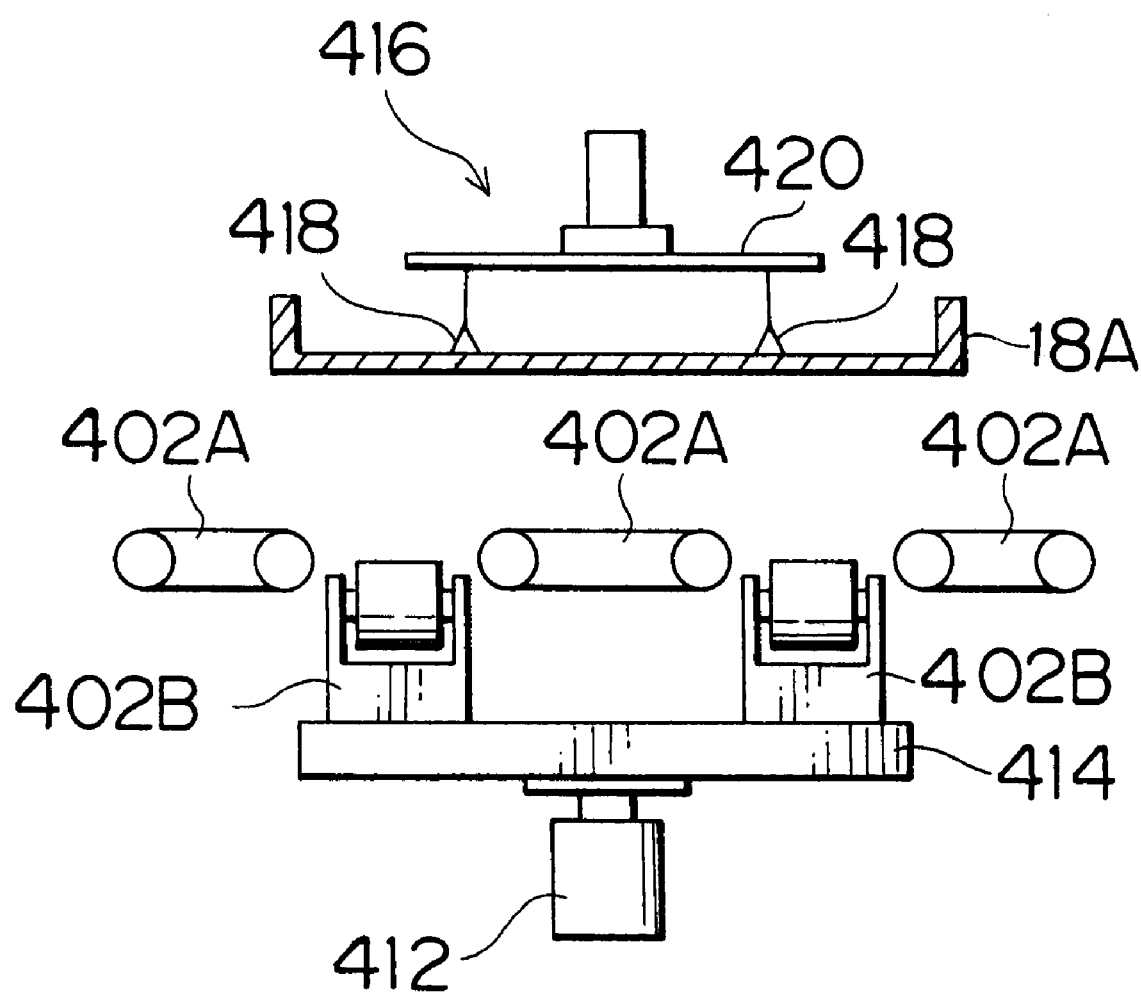
FIG. 28 is a side view illustrating a fifth conveyor and the transfer head of the third transfer robot.

As shown in FIGS. 22 and 28, the fifth conveyor 402 has a main conveyor 402A and a sub-conveyor 402B, which are arranged perpendicularly to one another. The main conveyor 402A and the fourth conveyor 404 are arranged in series, and the sub-conveyor 402B and the sixth conveyor 404 are arranged in series. The sub-conveyor 402B is provided on a lifting base 414, which is vertically moved by a hydraulic cylinder 412. When a rod of the hydraulic cylinder 412 is extended, the sub-conveyor 402B protrudes from a transfer face of the main conveyor 402A.

The transfer face of the main conveyor 402A is flush with that of the sixth conveyor 404. When the main conveyor 402A is driven, the cartridge 18 is transferred to the sixth conveyor 404. On the other hand, the sub-conveyor 402B protrudes from the transfer face of the main conveyor 402A so as to be flush with the transfer face of the fourth conveyor 400. Thereby, the cartridge 18 is transferred from the fourth conveyor 400 to the sub-conveyor 402B.

In the fifth conveyor 402 which is constructed in the above-mentioned manner, the transfer direction of the cartridge 18 is turned as described below. First, the sub-conveyor 402B protrudes from the transfer face of the main conveyor 402A to receive the cartridge body 18A which is transferred from the fourth conveyor 400, and transfers the cartridge body 18A to a predetermined lid closing position. The cartridge lid 18B is put on the cartridge body 18A (a step of putting the cartridge lid 18B will be described later in detail). Then, the sub-conveyor 402B moves below the transfer face of the main conveyor 402A. Thereby, the cartridge 18 is delivered from the sub-conveyor 402B to the main conveyor 402A, and then, the main conveyor 402A transfers the cartridge 18 to the sixth conveyor 404.

The sixth conveyor 404 transfers the cartridge 18 which has been transferred from the main conveyor 402A, to a seventh conveyor 422 of the collecting part 328, which will be described later.

The cartridge bodies 18A are stacked on the body supply base 406. The cartridge lids 18B are stacked on the lid supply base 408.

The third transfer robot 410 transfers the cartridge body 18A from the body supply base 406 to the fifth conveyor 402, and puts the cartridge lid 18B which has been transferred from the lid supply base 408, on the cartridge body 18A which has been transferred to the lid closing position of the fifth conveyor 402. The third transfer robot 410 is constructed in substantially the same manner as the first transfer robot 332, and thus, a transfer head 416 of the third transfer robot 410 is able to freely rotate and move upward, downward, forward and backward. As is the case with the second transfer robot 378, however, the construction of the transfer head 416 of the third transfer robot 410 is different from that of the transfer head 348 of the first transfer robot 332.

As shown in FIG. 28, the transfer head 416 of the third transfer robot 410 transfers the cartridge body 18A and the cartridge lid 18B by means of holding pads 418. As shown in FIG. 28, the holding pads 418 are provided at four corners of the bottom surface of a body frame 420 of the transfer head 416. The holding pads 418 hold the cartridge body 18A and the cartridge lid 18B so that they can transferred. A vacuum pump (not shown) is provided on the body frame 420 to drive the holding pads 418.

An explanation will be given of the construction of the collecting part 328. The collecting part 328 collects the filled cartridges 18. The collecting part 328 consists of a seventh conveyor 422 and a cartridge collecting base 424.

The seventh conveyor 422 and the sixth conveyor 404 are arranged in series, and the seventh conveyor 422 transfers the cartridge 18 which has been transferred from the sixth conveyor 404, to a predetermined collecting position.

A pallet 426 to be stacked with the filled cartridges 18 is placed on the cartridge collecting base 424.

The first transfer robot 332 of the supply part 320 transfers the cartridge 18 which has been transferred to the collecting position of the seventh conveyor 422, onto the cartridge collecting base 424. That is, the first transfer robot 332 is used by both the supply part 320 and the collecting part 328.

A stopper plate 428 is provided close to the cartridge collecting base 424 so that the collected cartridges 18 can be stacked on the pallet 426 without shifting. When the cartridge 18 is stacked, the side of the cartridge 18 is abutted against the stopper plate 428 so as to prevent the cartridge 18 from shifting. The stopper plate 428 is connected to a hydraulic cylinder 430 in a manner that is movable forward and backward. When the pallet 426 is carried out, the stopper plate 428 retracts.

A description will be given of the operation of the repacking apparatus 300 according to the third embodiment.

The user of the photoengraving machine who has been supplied with the PS plates packed in the packages 14 from a manufacturer of printing materials, stacks a predetermined number of the packages 14 on the pallet 336. Then, the user transfers the pallet 336 which is stacked with the packages 14 to the repacking apparatus 300, and places the pallet 336 on the supply base 330 of the supply part 320.

At the same time, the user divides the cartridges 18 into the cartridge bodies 18A and the cartridge lids 18B. The cartridge bodies 18A are stacked on the body supply base 406 of the repacking part 326, and the cartridge lids 18B are stacked on the lid supply base 408.

After the above-described preparations are completed, the repacking apparatus 300 is activated.

First, the package 14 on the top of the packages 14 stacked on the package supply base 330 is transferred onto the first conveyor 334 by the first transfer robot 332. FIGS. 29(a)–30(c) illustrate a sequence of steps for the first transfer robot 332 to transfer the package 14 from the package supply base 330 onto the first conveyor 334.

As shown in FIG. 29(a), the transfer head 348 of the first transfer robot 332 is positioned at a predetermined package receiving position. The package receiving position is set at a predetermined height from the center of the package supply base 330. When the transfer head 348 reaches the package receiving position, the center of the transfer head 348 corresponds to that of the package supply base 330.

Then, the transfer head 348 moves down by a predetermined length from the package receiving position toward the package 14 which is placed on the package supply base 330. As shown in FIG. 29(b), when lower jaws $354a_2$, $354b_2$ of the chucks 354A, 354B are positioned between the package 14 on the top of the packages 14 stacked on the package supply base 330 and the package 14 at the next to the top, the pair of chucks 354A, 354B move inward by a predetermined length. Thereby, as shown in FIG. 29(c), the lower jaws $354a_2$, $354b_2$ of the chucks 354A, 354B enter a space between the package 14 on the top and the package 14 next to the top.

When the lower jaws $354a_2$, $354b_2$ enter the space between the top package 14 and the next package 14, the upper jaws $354a_1$, $354b_1$ of the chucks 354A, 354B move toward the lower jaws $354a_2$, $354b_2$. Thereby, as shown in FIG. 29(d), the sides of the top package 14 are pinched between the upper jaws $354a_1$, $354b_1$ and the lower jaws $354a_2$, $354b_2$ of the chucks 354A, 354B.

Thus, the transfer head 348 holds the package 14 which is placed on the top of the packages 14 stacked on the package supply base 330. Thereafter, the transfer head 348 moves up to the package receiving position while holding the package 14 as shown in FIG. 29(e).

Figure 30A:
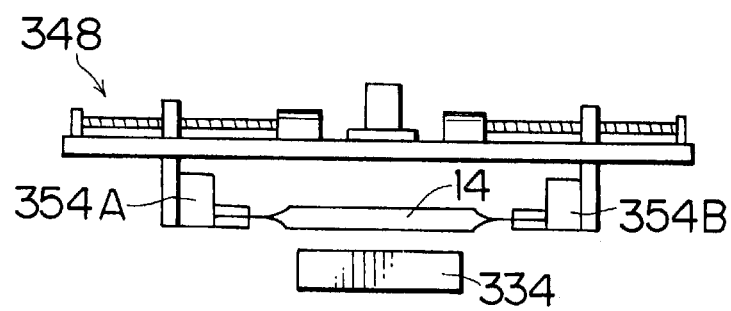
FIGS. 30(a), 30(b) and 30(c) are views of assistance in explaining a step of transferring the package to the first conveyor.

Then, the transfer head 348 rotates 90° to a predetermined package delivering position (see FIG. 22). As shown in FIG. 30(a), the package receiving position is set at a predetermined height from the first conveyor 334. When the transfer head 348 reaches the package delivering position, the center of the transfer head 348 corresponds to that of the first conveyor 334.

When the transfer head 348 reaches the package delivering position, the transfer head 348 moves down to the first conveyor 334 by a predetermined length. Thereby, the package 14 which is held by the transfer head 348 is placed on the first conveyor 334.

Figure 30B:
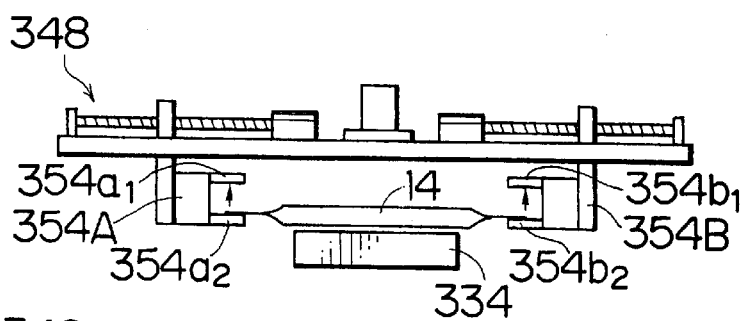
Figure 30C:
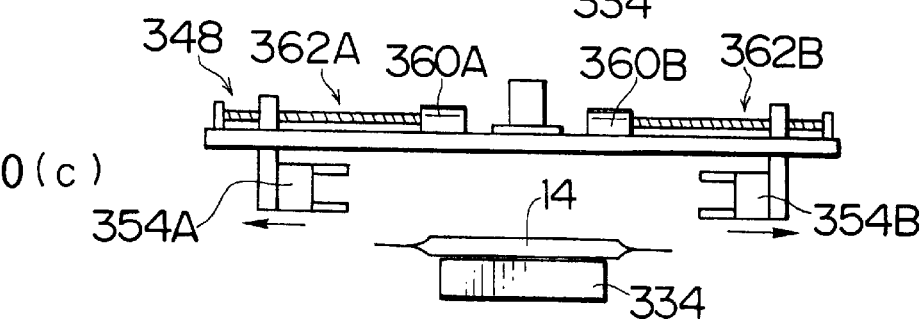

When the package 14 is placed on the first conveyor 334, the chucks 354A, 354B release the package 14 as shown in FIG. 30(b). That is, the upper jaws $354a_1$, $354b_1$ of the chucks 354A, 354B move upward, and the jaws $354a_1$, $354a_2$, $354b_1$, $354b_2$ release the package 14.

Thereafter, the package 14 is transferred by the first conveyor 334, and the process goes on to the next. On the other hand, the chucks 354A, 354B of the transfer head 348, which release the package 14, move outward by a predetermined length, and the transfer head 348 moves up to the package delivering position.

In the above-mentioned sequence of steps, the package 14 which was stacked on the package supply base 330 is transferred onto the first conveyor 334. The package 14 which is placed on the first conveyor 334 is transferred to the opening part 322 by the first conveyor 334, and one side (lower right side in FIG. 22) of the package 14 is opened at the opening part 32. FIGS. 31(a)–31(e) illustrate a sequence of steps for opening the side of the package 14.

When the package 14 is placed on the first conveyor 334, the first conveyor 334 and the second conveyor 364 of the opening part 322 are driven. If the package 14 is transferred to a predetermined cutting position on the second conveyor 364, the first conveyor 334 and the second conveyor 364 stop.

The cutting position of the package 14 is determined so that the center of the package 14 can correspond to that of the second conveyor 364 as shown in FIGS. 25 and 31(a). In this case, the right side of the package 14 is positioned between the lower edge 370 and the upper edge 372 of the cutting unit 368, and the left side of the package 14 is positioned between the upper jaws $366a_1$, $366b_1$ and the lower jaws $366a_2$, $366b_2$ of the chucks 366A, 366B.

When the package 14 reaches the cutting position, the chucks 366A, 366B hold the left side of the package 14. That is, as shown in FIG. 31(b), the upper jaws $366a_1$, $366b_1$ move down toward the lower jaws $366a_2$, $366b_2$, and the left side of the package 14 is pinched between the upper jaws $366a_1$, $366b_1$ and the lower jaws $366a_2$, $366b_2$.

After the pair of chucks 366A, 366B hold the left side of the package 14, the cutting unit 368 cuts the right side of the package 14. That is, as shown in FIG. 31(c), the upper edge 372 of the cutting unit 368 moves down toward the lower edge 370 so as to cut the right side of the package 14.

In accordance with the above-mentioned sequence of steps, the right side of the package 14 is opened, and on completion of the opening step, the next take-out step starts.

As shown in FIG. 31(d), after the right side of the package 14 is cut and the upper edge 372 of the cutting unit 368 moves upward, the hydraulic cylinder 374A of the push-out unit 374 is driven so that the push plate 374B pushes the left side of the package 14. Thus, as shown in FIG. 31(d), the bundle 12 of the PS plates is pushed out from the package 14, and a part of the bundle 12 protrudes from the right side of the opened package 14.

As shown in FIG. 31(d), the bundle 12 is pushed out in such a state that the pair of chucks 366A, 366B hold the left side of the package 14. In order to help the pushing out of the bundle 12, the air nozzles 382 provided at the right side of the second conveyor 364 jet the compressed air to the opened side of the package 14. By jetting the compressed air, the package 14 is separated from the surface of the bundle 12, so that the bundle 12 can be smoothly pushed out.

After the part of the bundle 12 protrudes from the right side of the opened package 14, the chucks 366A, 366B release the package 14 as shown in FIG. 31(e). That is, the jaws $366a_1$, $366b_1$ of the chucks 366A, 366B move upward.

When the package 14 is released from the chucks 366A, 366B, the second conveyor 364 and the third conveyor 376 are driven to transfer the package 14 to the third conveyor 376 (see FIG. 22). When the package 14 reaches a predetermined take-out position on the third conveyor 376, the second conveyor 364 and the third conveyor 376 stop.

As shown in FIGS. 27 and 32(a), the take-out position of the package 14 is determined so that the center of the package 14 can correspond to that of the third conveyor 376.

When the package 14 is positioned at the take-out position, the transfer head 384 of the second transfer robot 378 is also positioned at a predetermined take-out position. As shown in FIG. 32(a), the take-out position of the transfer head 384 is determined so that the center of the transfer head 384 can correspond to that of the package 14 (that is, the center of the third conveyor 376), and the package 14 on the third conveyor 376 can be positioned between the upper jaws $390a_1$, $390b_1$ and the lower jaws $390a_2$, $390b_2$ of the chucks 390A, 390B of the transfer head 384. When the transfer head 384 of the second transfer robot 378 reaches the take-out position, the pair of chucks 390A, 390B move inward by a predetermined length. Thereby, the left side of the package 14 enters a space between the upper jaw $390a_1$ and the lower jaw $390a_2$ of the chuck 390A, and the right side of the bundle 12 of the PS plates which protrudes from the package 14, enters a space between the upper jaw $390b_1$ and the lower jaw $390b_2$ of the chuck 390B.

Then, as shown in FIG. 32(b), the upper jaws $390a_1$, $390b_1$ of the chucks 390A, 390B move down toward the lower jaws $390a_2$, $390b_2$, and thereby, the left side of the package 14 and the right side of the bundle 12 are pinched between the upper jaws $390a_1$, $390b_1$ and the lower jaws $390a_2$, $390b_2$. Thus, the chuck 390A holds the left side of the package 14, and the chuck 390B holds the right side of the bundle 12 which protrude from the package 14.

When the chucks 390A, 390B of the transfer head 384 hold the left side of the package 14 and the bundle 12, the chuck 390A moves to the left while holding the left side of the package 14 as shown in FIG. 32(c). Thereby, as shown in FIG. 32(c), the package 14 is separated from the bundle 12 held by the chuck 390B.

During the separating of the package 14, the air jetting unit 376A, which is built in the third conveyor 376, jets the compressed air to the package 14 placed on the third conveyor 376. The compressed air is jetted through the blowout holes 376b (see FIGS. 26 and 27), which are punched in the transfer belt of the third conveyor 376, and the air is jetted to the package 14 placed on the third conveyor 376. Thereby, the package 14 is made to hover above the third conveyor 376, and when the package 14 is separated, the contact between the package 14 and the transfer belt 376B can be reduced. Thus, the package 14 can be smoothly separated because the frictional resistance resulting from the contact can be reduced.

Likewise, during the separating of the package 14, the compressed air is jetted through the air nozzles 392 of the chuck 390B at the right side in the drawing. Thus, the package 14 can be smoothly separated. That is, the compressed air is jetted through the air nozzles 392 to the opened side of the package 14, and is supplied to the interior of the package 14. Thereby, the package 14 is inflated. Thus, the contact between the surface of the bundle 12 and the inner surface of the package 14 is reduced, and thereby, the frictional resistance can also be reduced.

The chuck 390A, which has pulled the package 14, moves a predetermined distance to the left in the drawing, and stops. Thus, as shown in FIG. 32(c), the right side (the side which is opened but not held) of the empty package 14 held by the chuck 376A falls into the wastebasket 380, which is provided on the left of the third conveyor 376. Then, the left side of the package 14 is released from the chuck 390A. Thus, the package 14 separated from the bundle 12 is put into the wastebasket 380.

The chuck 390A, which has put the package 14 into the wastebasket 380, moves a predetermined distance to the right in the drawing while the jaws 390a₁, 390a₂ are opened, and holds the left side of the bundle 12 as shown in FIG. 32(d).

Thus, the process of taking out the bundle 12 of the PS plates is completed, and as shown in FIG. 32(e), the taken-out bundle 12 is picked up from the third conveyor 376, and it is transferred to the repacking part 326 by the second transfer robot 378.

The bundle 12 is repacked into the cartridge 18 on the fourth conveyor 400 of the repacking part 326 (see FIG. 22). Then, the bundle 12 which has been transferred from the third conveyor 376 by the second transfer robot 378 is continuously processed by means of the second transfer robot 378. Thus, the cartridge body 18A for repacking must be prepared on the fourth conveyor 400. An explanation will be given of a process of setting the cartridge body 18A. As shown in FIG. 22, the transfer head 416 of the third transfer robot 410 of the repacking part 326 is positioned at a predetermined body receiving position. The body receiving position is set at a predetermined height from the body supply base 406. When the transfer head 416 is positioned at the body receiving position, the center of the transfer head 416 corresponds to that of the cartridge body 18A which is stacked on the body supply base 406.

The transfer head 416 moves down by a predetermined length from the body receiving position. Thereby, the holding pads 418 of the transfer head 416 come in contact with the cartridge body 18A which is placed on the top of the cartridge bodies 18A stacked on the body supply base 406. Then, the holding pads 418 are driven to hold the cartridge body 18A.

The transfer head 416 moves up to the body receiving position while holding the cartridge body 18A with the holding pads 418, and then the transfer head 416 rotates to a predetermined body delivering position set on the fifth conveyor 402.

The body delivering position is set at a predetermined height from the fifth conveyor 402. When the transfer head 416 is positioned at the body delivering position, the center of the transfer head 416 corresponds to that of the fifth conveyor 402. FIG. 33(a) illustrates the transfer head 416 which has moved to the body delivering position in a state of holding the cartridge body 18A.

When the transfer head 416 is positioned at the body delivering position, the hydraulic cylinder 412 is driven at the same time, and the sub-conveyor 402B of the fifth conveyor 402 moves upward as shown in FIG. 33(b). Thus, the sub-conveyor 402B protrudes from the transfer face of the main conveyor 402A of the fifth conveyor 402.

When the sub-conveyor 402B protrudes from the transfer face of the main conveyor 402A, the transfer head 416 moves down by a predetermined length from the body delivering position to the sub-conveyor 402B. Then, the cartridge body 18A transferred by the transfer head 416 abuts on the sub-conveyor 402B.

When the cartridge body 18A abuts on the sub-conveyor 402B, the driving of the holding pads 418 is stopped. Thus, the cartridge body 18A is released from the holding pads 418, and it is placed on the sub-conveyor 402B. Then, as shown in FIG. 33(c), the transfer head 416, in which the driving of the holding pads 418 has been stopped, moves up to the body delivering position.

When the sub-conveyor 402B protrudes from the transfer face of the main conveyor 402A, the height of the transfer face of the sub-conveyor 402B corresponds to the height of the transfer face of the fourth conveyor 400. When the transfer head 416 moves up to the body delivering position, the fourth conveyor 400 and the sub-conveyor 402B are driven and the cartridge body 18A is transferred to the fourth conveyor 400.

The cartridge body 18A is transferred by the fourth conveyor 400A and the sub-conveyor 402B as stated above, and if the cartridge body 18A reaches a predetermined housing position, the fourth conveyor 400 and the sub-conveyor 402B stop.

The above-mentioned housing position is set on the fourth conveyor 400, and when the cartridge body 18A is positioned at the housing position, the center of the cartridge body 18A corresponds to that of the fourth conveyor 400.

Thus, the process of setting the cartridge body 18A is completed. The setting process is previously executed during the above-mentioned process of opening the package 14, or the step of taking out the bundle 12 of the PS plates.

As stated previously, the bundle 12 taken out from the package 14 is transferred to the repacking part 326 by the second transfer robot 378. As shown in FIG. 22, the transfer head 384 of the second transfer robot 378 picks up the bundle 12 from the third conveyor 376, and rotates to a predetermined PS plate delivering position.

The PS plate delivering position is set at a predetermined height from the fourth conveyor 400. When the transfer head 384 is positioned at the PS plate delivering position, the center of the transfer head 384 corresponds to that of the fourth conveyor 400. Thus, the PS plate delivering position is set just above the above-mentioned housing position.

If the transfer head 384 of the second transfer robot 378 which holds the bundle 12 reaches the PS plate delivering position, the held bundle 12 is positioned just above the cartridge body 18A which is set on the fourth conveyor 400. FIG. 34(a) illustrates the transfer head 384 which is positioned at the PS plate delivering position. The transfer head 384 moves down toward the cartridge body 18A set on the fourth conveyor 400, and then the transfer head 384 stops at a predetermined PS plate repacking position.

When the transfer head 384 is positioned at the PS plate repacking position, the hydraulic cylinder 388A of the push means 388, which is provided at the transfer head 384, is driven. Thereby, the rod of the hydraulic cylinder 388A extends downward, and the pushing piece 388B provided at the end of the rod pushes the bundle 12 held by the chucks 390A, 390B of the transfer head 384.

When the pushing piece 388B pushes the bundle 12, the bundle 12 above the cartridge body 18A is bent downward by the pushing piece 388B. Thereby, as shown in FIG. 34(b), the center of the bundle 12 is pressed against the cartridge body 18A.

When the pushing piece 388B presses the bundle 12 against the cartridge body 18A, the right side of the bundle 12 is released from the chuck 390B as shown in FIG. 34(c). At the same time, the chuck 390B moves to the right by a predetermined length. Thus, the right side of the bundle 12 falls into the cartridge body 18A, and the right half of the bundle 12 is housed in the cartridge body 18A.

Then, the left half of the bundle 12 is housed in the cartridge 18A in the same manner. That is, as shown in FIG. 34(d), the bundle 12 is released from the chuck 390A, and the chuck 390A moves to the left in the drawing by a predetermined length. Thus, the left half of the bundle 12 is housed in the cartridge body 18A.

After the whole of the bundle 12 is housed in the cartridge body 18A, the hydraulic cylinder 388A is driven so that the pushing piece 388B moves upward as shown in FIG. 34(e). Thereby, the bundle 12 is released from the pushing piece 388B.

Thus, the process of housing the bundle 12 in the cartridge body 18A is completed. The cartridge body 18A which contains the bundle 12 is transferred to the sub-conveyor 402B by the fourth conveyor 400 and the sub-conveyor 402B so that the cartridge lid 18B can be put on the cartridge body 18A (see FIG. 22).

The fourth conveyor 400 and the sub-conveyor 402B which transfer the cartridge body 18A stop when the cartridge body 18A reaches the predetermined lid closing position.

The lid closing position is set on the sub-conveyor 402B, and when the cartridge body 18A is positioned at the lid closing position, the center of the cartridge body 18A corresponds to that of the sub-conveyor 402B.

While the cartridge body 18A is transferred to the lid closing position, the third transfer robot 410 transfers the cartridge lid 18B to above the lid closing position. The cartridge lid 18B is transferred in a manner described below.

The transfer head 416 of the third transfer robot 410 is positioned at a predetermined lid receiving position. The lid receiving position is set at a predetermined height from the lid supply base 408. When the transfer head 416 is positioned at the lid receiving position, the center of the transfer head 416 corresponds to that of the cartridge lid 18B which is stacked on the lid supply base 408.

The transfer head 416 moves down by a predetermined length from the lid receiving position. Thereby, the holding pads 418 of the transfer head 416 come in contact with the cartridge lid 18B which is placed on the top of the cartridge lids 18B stacked on the lid supply base 408. Then, the holding pads 418 are driven to hold the cartridge lid 18B.

The transfer head 416 moves up to the lid receiving position while holding the cartridge lid 18B with the holding pads 418, and then the transfer head 416 rotates to the predetermined lid closing position set on the sub-conveyor 402B.

As stated above, the lid closing position is at a predetermined height from the sub-conveyor 402B, and when the transfer head 416 is positioned at the lid closing position, the center of the transfer head 416 corresponds to that of the sub-conveyor 402B. Thus, if the cartridge body 18A which contains the bundle 12 of the PS plates is positioned at the lid closing position, and if the transfer head 416 which holds the cartridge lid 18B is positioned at the lid closing position, the center of the cartridge body 18A corresponds to that of the cartridge lid 18B. In FIG. 35(a), the cartridge 18A which contains the bundle 12 is positioned at the lid closing position, and the transfer head 416 which holds the cartridge lid 18B is positioned at the lid closing position.

When the cartridge 18A which contains the bundle 12 is positioned at the lid closing position, and when the transfer head 416 which holds the cartridge lid 18B is positioned at the lid closing position, the transfer head 416 vertically moves down by a predetermined length toward the cartridge body 18A on the sub-conveyor 402B. Thereby, as shown in FIG. 35(b), the cartridge lid 18B is put on the cartridge body 18A on the sub-conveyor 402B.

After the cartridge lid 18B is put on the cartridge 18A, the driving of the holding pads 418 is stopped, and thus, the cartridge lid 18B is released from the holding pads 418. Then, the transfer head 416 moves upward to the lid closing position as shown in FIG. 35(c).

On the other hand, as shown in FIG. 35(c), when the cartridge lid 18B is put on the cartridge body 18A, the hydraulic cylinder 412 is driven so that the sub-conveyor 402B moves downward. Thereby, the sub-conveyor 402B moves below the transfer face of the main conveyor 402A, and the cartridge body 18A on the sub-conveyor 402B is delivered to the main conveyor 402A.

When the sub-conveyor 402B moves downward and the cartridge body 18A is delivered to the main conveyor 402A, the main conveyor 402A and the sixth conveyor 404 are driven as shown in FIG. 35(d), and the cartridge body 18A is transferred to the sixth conveyor 404.

Thus, the process of repacking the bundle 12 of the PS plates in the cartridge 18 is completed, and thereafter, the filled cartridge 18 is transferred to the collecting part 328 by the sixth conveyor 404.

At the collecting part 328, the sixth conveyor 404 and the seventh conveyor 422 are driven at the same time, and the seventh conveyor 422 receives the cartridge 18 from the sixth conveyor 404. The seventh conveyor 422 stops, when the cartridge 18 is transferred to the predetermined collecting position.

The collecting position for the cartridge 18 is set on the seventh conveyor 422. When the cartridge 18 is positioned at the collecting position, the center of the cartridge 18 corresponds to that of the seventh conveyor 422.

On the other hand, when the cartridge 18 is positioned at the collecting position, the transfer head 348 of the first transfer robot 332 is waiting above the collecting position. The cartridge 18 is transferred onto the cartridge collecting base 424 by the first transfer robot 332. The collecting steps will hereunder be described with reference to FIGS. 36(a)–37(d).

As stated above, when the cartridge 18 is positioned at the collecting position, the transfer head 348 of the first transfer robot 332 is waiting above the collecting position. As shown in FIG. 36(*a*), the transfer head 348 is waiting at the cartridge receiving position which is set at a predetermined height from the seventh conveyor 422. When the transfer head 348 is positioned at the cartridge receiving position, the center of the transfer head 348 corresponds to that of the seventh conveyor 422. Thus, the transfer head 348 is positioned just above the cartridge 18.

Then, the transfer head 348 moves down by a predetermined length from the cartridge receiving position toward the cartridge 18 placed on the seventh conveyor 422. Thereby, the cartridge 18 on the seventh conveyor 422 is positioned between the upper jaws $354a_1$, $354b_1$ and the lower jaws $354a_2$, $354b_2$ of the chucks 354A, 354B provided at the transfer head 348. Then, the chucks 354A, 354B move inward by a predetermined length. Thus, as shown in FIG. 36(*b*), the sides of the cartridge 18 on the seventh conveyor 422 enter spaces between the jaws of the chucks 354A, 354B.

The upper jaws $354a_1$, $354b_1$ of the chucks 354A, 354B move down toward the lower jaws $354a_2$, $354b_2$ when the chucks 354A, 354B stop and the sides of the cartridge 18 enter the spaces between the jaws of the chucks 354A, 354B. Thereby, the sides of the cartridge 18 are pinched between the upper jaws $354a_1$, $354b_1$ and the lower jaws $354a_2$, $354b_2$ of the chucks 354A, 354B.

Thus, the transfer head 348 holds the cartridge 18 which has been placed on the seventh conveyor 422, and then the transfer head 348 moves up to the cartridge receiving position while holding the cartridge 18 as shown in FIG. 36(*c*).

The transfer head 348 which has moved to the cartridge receiving position rotates 90° to be positioned at the cartridge delivering position (see FIG. 22). The cartridge delivering position is set at a predetermined height from the cartridge collecting base 424 as shown in FIG. 37(*a*). When the transfer head 348 is positioned at the cartridge delivering position, the center of the transfer head 348 corresponds to that of the cartridge collecting base 424. Thus, the cartridge 18 is positioned just above the cartridge collecting base 424.

When the transfer head 348 is positioned at the cartridge delivering position, the transfer head 348 moves down toward the cartridge collecting base 424 and stops just before the cartridge 18 which is stacked on the pallet 426 placed on the cartridge collecting base 424 as shown in FIG. 37(*b*) (in the case of the first repacking, the transfer head 348 stops just before the pallet 426.)

In this case, the transfer head 348 moves down in such a way that the side of the cartridge 18 which is held by the transfer head 348 abuts on the stopper plate 428, and thereby, the cartridge 18 which is held by transfer head 348 can be placed without shifting from the cartridge 18 which was previously placed on the pallet 426.

As shown in FIG. 37(*b*), when the transfer head 348 stops moving down, the side of the cartridge 18 is released from the chuck 354A. That is, the upper jaw $354a_1$ of the chuck 354A moves up. When the side of the package 18 is released from the chuck 354A, the chuck 354A moves to the left in the drawing by a predetermined length as shown in FIG. 37(*c*). Thus, as shown in FIG. 37(*c*), the left side of the cartridge 18 is released from the chuck 354A, and falls onto the cartridge 18 which was previously placed on the pallet 426.

When the chuck 354A stops, the jaw $354b_1$ of the chuck 354B moves up by a predetermined length, thus reducing the force of the chuck 354B pinching the side of the cartridge 18. Then, the chuck 354B moves to the right while lightly pinching the cartridge 18, and the cartridge 18 is released from the chuck 354B while the right side thereof is pressed against the stopper plate 428.

Then, the right side of the cartridge 18 falls onto the cartridge 18 which was previously placed on the pallet 426. As stated previously, the cartridge 18 is released in a state of being pressed against the stopper plate 428. As shown in FIG. 37(*d*), the cartridge 18 can be stacked without shifting from the cartridge 18 which was previously placed on the pallet 426.

Thus, the first repacking process is completed. Thereafter, the transfer head 348 moves up to the cartridge delivering position (see FIG. 37(*d*)), and rotates 90° clockwise to the receiving position of the package 14.

The above-mentioned process is repeated to perform the next repacking operation.

Each time one repacking process is completed, the moving amount of the transfer head 348 of the first transfer robot 332 from the receiving position to a position where the package 14 stacked on the pallet 336 on the supply base 330 is picked up is increased by the thickness of the package 14. Each time one repacking process is completed, the moving amount of the transfer head 348 from the cartridge delivering position to a position where the cartridge 18 is released is decreased by the thickness of the cartridge 18. Likewise, each time one repacking process is completed, the moving amount of the transfer head 416 of the third transfer robot 410 from the body receiving position to a position where the cartridge body 18A stacked on the body supply base 406 is picked up is increased by the height of the cartridge body 18A, and the moving amount of the transfer head 416 from the lid receiving position to a position where the cartridge lid 18B stacked on the lid supply base 406 is picked up is increased by the thickness of the cartridge lid 18B.

After the PS plates are repacked from all packages 14 which are supplied, the repacking apparatus stops its operation. The user transfers the pallet 32 on the collecting base 424 which is stacked with the cartridges 18 to a photoengraving department or a warehouse by means of a forklift truck, for example.

As stated above, according to the repacking apparatus 300 of the third embodiment, the bundles 12 of the PS plates can be automatically repacked from the packages 14 into the cartridges 18.

In the third embodiment, the repacking apparatus 300 is placed in the darkroom, and the repacking operation is executed in the darkroom. If the repacking apparatus 300 as a whole is covered with a casing to perform the repacking inside the casing, the repacking apparatus 300 can be placed in a lighted room, and the repacking can be performed in the lighted room.

Figure 38:
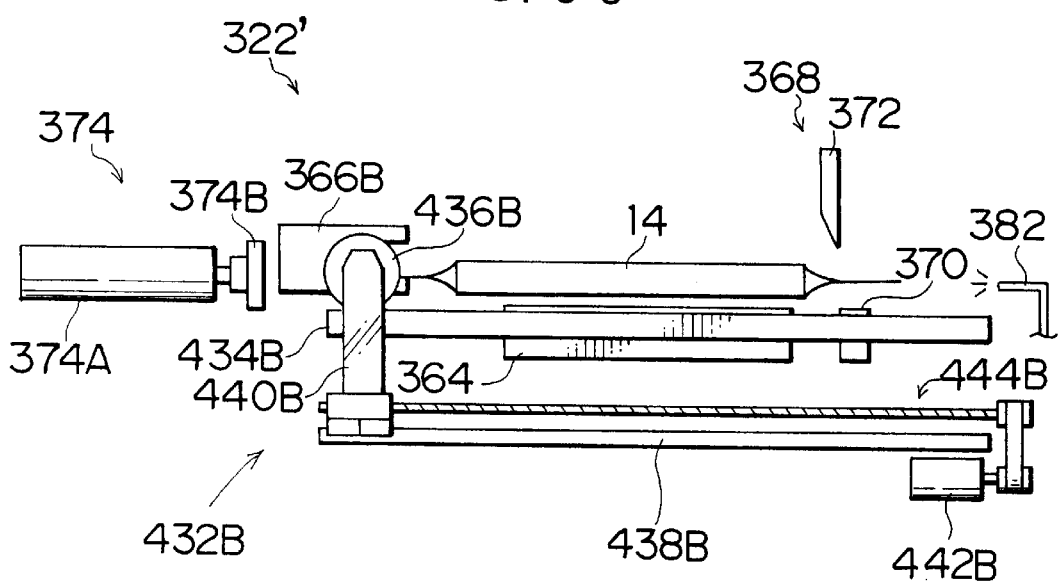
FIG. 38 is a side view illustrating the construction of another embodiment of the opening part.
Figure 39:
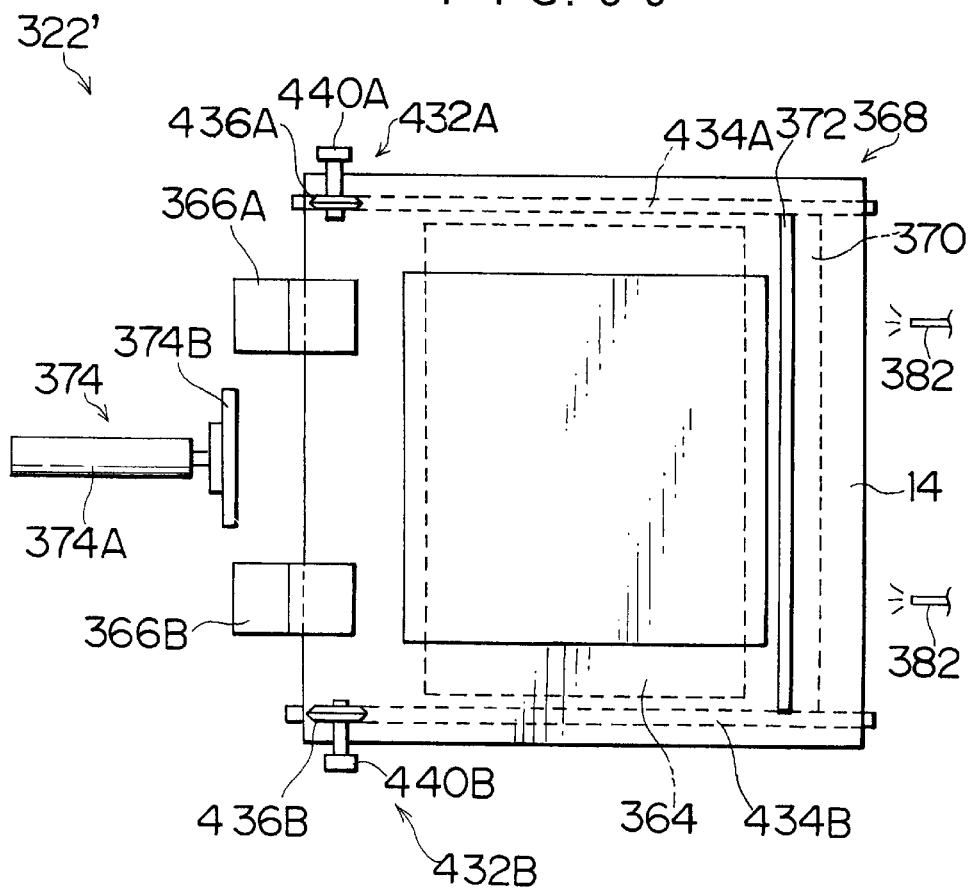
FIG. 39 is a plane view illustrating the construction of another embodiment of the opening part.

According to the repacking apparatus 300 of the third embodiment, the package 14 is opened by cutting only one side thereof, but plural sides of the package 14 may also be cut. FIGS. 38 and 39 illustrate the construction of an opening part 322' in the case of cutting three sides of the package 14.

The opening part 322 of the repacking apparatus 300 according to the third embodiment consists of the second conveyor 364, the pair of chucks 366A, 366B and the cutting unit 368 (see FIGS. 24 and 25), but the opening part 322' in FIGS. 38 and 39 is further provided with a pair of side slitters 432A, 432B. Similar parts are denoted by the same reference numerals.

As shown in FIGS. 38 and 39, the side slitters 432A, 432B are arranged at the upstream and the downstream, respectively, of the second conveyor 364, and the side slitters 432A, 432B are arranged in a direction perpendicular to the transfer direction of the package 14. The pair of the side slitters 432A, 432B are constructed in the same manner. The side slitter 432B consists of a rod-shaped lower edge 434B and a disk-shaped upper edge 436B which moves along the lower edge 434B.

The lower edge 434B is arranged in proximity to the downstream side of the second conveyor 364 in a direction perpendicular to the transfer direction of the package 14. Below the lower edge 434B, a guide rail 438B is arranged along the lower edge 434B, and a slider 440B is slidably supported on the guide rail 438B.

The upper edge 436B is rotatably supported at the end of the slider 440B, and the upper edge 436B is moved along the lower edge 434B by moving the slider 440B.

The slider 440B is moved by a feed screw mechanism 444B which is driven by a motor 442B. By driving the feed screw mechanism 444B by the motor 442B, the slider 440B is moved along the guide rail 438B.

The pair of the side slitters 432A, 432B cut two sides of the package 14 which are perpendicular to the transfer direction of the package 14. The cutting process will hereunder be described with reference to FIGS. 40(a)–40(f).

As described in the third embodiment, when the package 14 is transferred from the package supply base 330 onto the first conveyor 334, the first conveyor 334 and the second conveyor 364 of the opening part 322 are driven to transfer the package 14 to a predetermined cutting position on the second conveyor 364.

As shown in FIGS. 39 and 40(a), when the package 14 is positioned at the cutting position, the right side of the package 14 is positioned between the lower edge 370 and the upper edge 372 of the cutting unit 368, and the left side of the package 14 is positioned between the upper jaws 366$a_1$, 366$b_1$ and the lower jaws 366$a_2$, 366$b_2$ of the chucks 366A, 366B. The upper and lower sides of the package 14 are positioned on the lower edges 434A, 434B of the side slitters 432A, 432B.

When the package 14 is positioned at the cutting position, the chucks 366A, 366B hold the left side of the package 14 as shown in FIG. 40(b).

When the chucks 366A, 366B hold the left side of the package 14, the cutting unit 368 cuts the right side of the package 14. That is, as shown in FIG. 40(c), the upper edge 372 of the cutting unit 368 moves down toward the lower edge 370 so as to cut the right side of the package 14.

After the right side of the package 14 is cut, the pair of the side slitters 432A, 432B move to the right as shown in FIG. 40(d), thereby cutting two sides of the package 14 at the upstream and downstream in the transfer direction thereof.

Thus, the package 14 is opened by cutting three sides thereof except for the side held by the chucks 366A, 366B. After the step of opening the package 14, the package 14 is taken out as is the case with the repacking apparatus 300 of the third embodiment. A description will hereunder be given of the process of pushing out the bundle 12 of the PS plates from the package 14. As shown in FIG. 40(e), the upper edges 436A, 436B of the side slitters 432A, 432A, which moved to the right in order to cut two sides of the package 14 at the upstream and downstream in the transfer direction thereof, move to the left on completion of cutting to thereby return to positions before cutting.

When the upper edges 436A, 436B of the side slitters 432A, 432B return to the positions before cutting, the hydraulic cylinder 374A of the push-out unit 374 is driven as shown in FIG. 40(e), and the push plate 374B pushes the left side of the package 14. Thus, as shown in FIG. 40(e), the bundle 12 of the PS plates is pushed out from the package 14, and a part of the bundle 12 protrudes from the right side of the opened package 14.

As is the case with the third embodiment, the bundle 12 of the PS plates is pushed out while the pair of chucks 366A, 366B hold the left side of the package 14. In order to help the pushing out of the bundle 12, the compressed air is jetted to the opened side of the package 14 through the air nozzles 382 provided at the right side of the second conveyor 364. The compressed air separates the package 14 from the surface of the bundle 12, so that the bundle 12 can be smoothly pushed out.

After the part of the bundle 12 protrudes from the right side of the opened package 14, the chucks 366A, 366B release the package 14 as shown in FIG. 40(f). Then, the second conveyor 364 and the third conveyor 376 are driven so as to transfer the package 14 to the third conveyor 376. The process of repacking the bundle 12 proceeds in the same manner as in the repacking apparatus 300 of the third embodiment.

As stated above, since three sides of the package 14 are cut, the process of pushing out the bundle 12 of the PS plates is much easier than in the repacking apparatus 300 of the third embodiment.

That is, as stated above, a bag made of a single material such as a synthetic resin, aluminum foil and paper or a composite material of them is used as the package 14, and the package 14 is formed to be thick. For this reason, if only one side of the package 14 is opened, the bundle 12 of the PS plates may not be smoothly pushed out. Moreover, a catch may appear in the package 14 or the bundle 12 can be pushed out in pieces by an unreasonable force.

If three sides of the package 14 are opened, the bundle 12 of the PS plates can be taken out from the package 14 without applying an unreasonable force.

As set forth hereinabove, according to the repacking apparatus of the present invention, the bundle of the PS plates can be automatically repacked from the package into the cartridge.

The present invention should not be restricted to the repacking apparatus 300 of the third embodiment in FIG. 22. The repacking apparatus 300 in FIG. 22 is constructed so that the apparatus as a whole can be compact (for example, the first transfer robot 332 is used for both supplying the package 14 and collecting the cartridge 18, and the fifth conveyor 402 has a function of changing directions.) If the size of an apparatus is not restricted, the arrangement of components in the apparatus may be changed, and the apparatus may be provided with components each of which has a single function instead of a component of multiple functions.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A method of repacking, in a darkroom, a photosensitive tabular printing plate from a package into a cartridge composed of a body and a lid, said method comprising the steps of:

cutting a periphery of the package to divide the package into a top piece and a bottom piece;

holding and separating the top piece of the package from the photosensitive tabular printing plate;

putting the cartridge body on the photosensitive tabular printing plate;

inverting top and bottom faces of the photosensitive tabular printing plate covered with the cartridge body;

holding and separating the bottom piece of the package from the inverted photosensitive tabular printing plate; and putting the cartridge lid on the cartridge body containing the photosensitive tabular printing plate.

2. A repacking apparatus for repacking, in a darkroom, a photosensitive tabular printing plate from a package into a cartridge composed of a body and a lid, said repacking apparatus comprising:

a body stacking part where a plurality of the cartridge bodies are stacked;

a lid stacking part where a plurality of the cartridge lids are stacked;

cutting means for cutting a periphery of the package to divide the package into a top piece and a bottom piece;

first separating means for holding and separating the top piece of the package from the photosensitive tabular printing plate;

body transferring means for transferring the cartridge body from said body stacking part, and for putting the body on the photosensitive tabular printing plate from which the top piece of the package has been separated;

inverting means for inverting top and bottom faces of the photosensitive tabular printing plate which is covered with the cartridge body;

second separating means for holding and separating the bottom piece of the package, which is positioned on the top of the photosensitive tabular printing plate by said inverting means, from the photosensitive tabular printing plate; and lid transferring means for transferring the cartridge lid from said lid stacking part and for putting the cartridge lid on the photosensitive tabular printing plate from which the bottom piece of the package has been separated.

3. The repacking apparatus as defined in claim 2, wherein said first separating means also serves as said body transferring means, said second separating means and said lid transferring means.

* * * * *